United States Patent
Peng et al.

(10) Patent No.: US 11,392,685 B2
(45) Date of Patent: Jul. 19, 2022

(54) DEVICE AUTHENTICATION METHOD AND APPARATUS

(71) Applicant: HUAWEI TECHNOLOGIES CO., LTD., Guangdong (CN)

(72) Inventors: Jianfen Peng, Shenzhen (CN); Zhipeng Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/368,382

(22) Filed: Jul. 6, 2021

(65) Prior Publication Data

US 2021/0334353 A1 Oct. 28, 2021

Related U.S. Application Data

(63) Continuation of application No. PCT/CN2020/092176, filed on May 25, 2020.

(30) Foreign Application Priority Data

Sep. 19, 2019 (CN) .......................... 201910886787.9

(51) Int. Cl.
*H04L 29/06* (2006.01)
*G06F 21/44* (2013.01)
*H04W 12/069* (2021.01)

(52) U.S. Cl.
CPC .......... *G06F 21/44* (2013.01); *H04W 12/069* (2021.01); *G06F 2221/2129* (2013.01)

(58) Field of Classification Search
CPC ............ G06F 21/44; G06F 2221/2129; H04W 12/069

(Continued)

(56) References Cited

U.S. PATENT DOCUMENTS

| 2008/0134281 A1* | 6/2008 | Shinde | H04W 12/06 726/1 |
| 2016/0164855 A1* | 6/2016 | Johansson | G09C 1/00 726/3 |
| 2018/0205560 A1 | 7/2018 | Park et al. | |

FOREIGN PATENT DOCUMENTS

| CN | 101051898 A | 10/2007 |
| CN | 101136915 A | 3/2008 |

(Continued)

OTHER PUBLICATIONS

Anonymous: "Transport Layer Security—Wikipedia", Sep. 16, 2019 (Sep. 16, 2019), XP055915335, total 39 pages.

(Continued)

*Primary Examiner* — Evans Desrosiers

(57) ABSTRACT

This application relates to an apparatus and a non-transitory computer readable medium applying to the internet of vehicles. Embodiments of this application implement a distributed authentication process, which including sending information used to indicate a to-be-authenticated device to the to-be-authenticated device. Compared with a centralized authentication mechanism, the authentication manner in the embodiments of this application reduces load of a device because one intermediate node does not need to perform authentication on a plurality of nodes. If the to-be-authenticated device fails to be authenticated, because the authentication is an authentication process related to a first service, the determined execution policy is an execution policy related to the first service, and the determined execution policy better meets a service requirement.

8 Claims, 18 Drawing Sheets

(58) Field of Classification Search
USPC .............................................................. 726/3
See application file for complete search history.

(56) References Cited

FOREIGN PATENT DOCUMENTS

| | | | |
|---|---|---|---|
| CN | 105083218 A | 11/2015 | |
| CN | 105282179 A | 1/2016 | |
| CN | 105292020 A | 2/2016 | |
| CN | 107182052 A | 9/2017 | |
| CN | 107919955 A | 4/2018 | |
| CN | 108377184 A | 8/2018 | |
| CN | 109495441 A | 3/2019 | |
| CN | 109617698 A | 4/2019 | |
| CN | 109808697 A | 5/2019 | |
| CN | 110177001 A | 8/2019 | |
| FR | 3032293 A1 | 8/2016 | |
| WO | 2017201753 A1 | 11/2017 | |

OTHER PUBLICATIONS

Anonymous: "X.509—Wikipedia", Sep. 18, 2019 (Sep. 18, 2019), XP055915336, total 15 pages.
Daniel Zelle et al.: "On Using TLS to Secure In-Vehicle Networks", Availability, Reliability and Security, ACM, 2 Penn Plaza, Suite 701 New YorkNY10121-0701 USA, Aug. 29, 2017, total 10 pages.

\* cited by examiner

DEVICE AUTHENTICATION METHOD AND APPARATUS

CROSS-REFERENCE TO RELATED APPLICATIONS

This application is a continuation of International Application No. PCT/CN2020/092176, filed on May 25, 2020, which claims priority to Chinese Patent Application No. 201910886787.9, filed on Sep. 19, 2019. The disclosures of the aforementioned applications are hereby incorporated by reference in their entireties.

TECHNICAL FIELD

This application relates to the field of communications technologies, and in particular, to a device authentication method and an apparatus.

BACKGROUND

With the development of intelligent and networked vehicles, functions of the vehicles are increasing. Networking of vehicles not only enables a vehicle factory to learn of and track a status of a vehicle, but also brings more convenience to daily life of a user. However, an unauthorized user may access a vehicle networking system through a network, to operate and control a vehicle, which poses great threats to vehicle security. Therefore, some measures need to be taken to ensure that a terminal device installed on a vehicle is an authorized device, and prevent an unauthorized device from listening to vehicle-mounted data and sending malicious and false instructions and data, to avoid interference and damage to a vehicle function.

A current measure may be to perform authentication on a vehicle-mounted device. Currently, vehicle-mounted devices are grouped into a plurality of levels, to implement a hierarchical authentication mechanism. For example, a level-1 vehicle-mounted device may perform authentication on a level-2 vehicle-mounted device. If the authentication on the level-2 vehicle-mounted device succeeds, the level-2 vehicle-mounted device may perform authentication on a level-3 vehicle-mounted device. In such an authentication measure, authentication largely depends on an intermediate node. For example, the level-2 vehicle-mounted device may be considered as an intermediate node. If the authentication on the level-2 vehicle-mounted device fails, the level-2 vehicle-mounted device cannot perform authentication on the level-3 vehicle-mounted device. Consequently, a large quantity of vehicle-mounted devices cannot undergo authentication.

It can be learned that in this authentication mechanism, some vehicle-mounted devices cannot undergo authentication, and a security risk is relatively high.

SUMMARY

Embodiments of this application provide a device authentication method and an apparatus, to increase a probability that a vehicle-mounted device can undergo authentication, and reduce a security risk.

According to a first aspect, a first device authentication method is provided. The method includes: A first device sends first information and a first certificate to a second device, where the first information is used to indicate the second device, and the first certificate is a device certificate of the first device. The first device receives a first random number from the second device. The first device obtains a first signature based on the first random number and a first identifier by using a first private key, where the first identifier is an identifier of the first device. The first device sends the first signature to the second device, where the first signature is used for authentication on the first device.

The method in the first aspect may be performed by a first communications apparatus. The first communications apparatus may be a communications device or an apparatus, for example, a chip system, that can support a communications device in implementing a function described in the method. For example, the communications device is a vehicle-mounted apparatus. In the following description, an example in which the first communications apparatus is the first device is used.

In this embodiment of this application, the first information is used to indicate the second device. For example, the first information may be an identifier of a first service, or an address of the second device. As long as the first device sends the first information to the second device, the second device can perform authentication on the first device without depending on a hierarchy relationship between devices. For example, even if the first device is a level-1 device, and the second device is a level-3 device, authentication can be performed between the first device and the second device. In this way, a distributed authentication process is implemented. Compared with a centralized authentication mechanism, the authentication manner in this embodiment of this application reduces load of a device because one intermediate node does not need to perform authentication on a plurality of nodes. According to the technical solution in this embodiment of this application, end-to-end authentication between devices is implemented, and dependence on an intermediate node is reduced, so that more vehicle-mounted devices can undergo authentication, and security of the vehicle-mounted devices is improved. The authentication solution provided in this embodiment of this application has particular resilience. In addition, the end-to-end authentication solution provided in this embodiment of this application is unrelated to an architecture of an entire vehicle, has relatively good compatibility, and may be applied to an existing vehicle architecture, and may also be applied to a future vehicle architecture.

With reference to the first aspect, in a possible implementation of the first aspect, the first information includes the identifier of the first service.

For example, the first information may include the identifier of the first service, and the identifier of the first service may indicate a target authentication device. The target authentication device is, for example, the second device. Therefore, the first information may indicate the second device. In other words, the authentication process may be related to the first service. Therefore, different services may correspond to different second devices, so that an authentication process can be related to a service, to serve the service, thereby improving security of the service. For example, before the first device and the second device perform the first service, the second device first needs to perform authentication on the first device. In this scenario, the first information may include the identifier of the service. For example, if a self-driving function is to be performed, and the self-driving function relates to the first device and the second device, the second device and the first device may perform authentication before performing the self-driving function. In this case, the first information sent by the first device to the second device may include an identifier of a service of the self-driving function, so that the second device can determine that current authentication corresponds to the self-driving service. In an optional implementation, the first information may be the identifier of the first service, or the first information may include other information in addition to the identifier of the first service.

Alternatively, the first information may further include other content. For example, the first information may include information about the second device, and the information about the second device includes, for example, an identifier (for example, an ID of the second device) of the second device, or an IP address of the second device, or an IP address of the second device and an identifier of the second device, or other information about the second device. Therefore, the first information may indicate the second device. For example, when the first device and the second device perform authentication, both the first device and the second device have determined that the authentication corresponds to a service. In this case, the first information sent by the first device to the second device may not include the identifier of the first service. To enable the second device to determine that the information sent by the first device corresponds to the second device, the first information sent by the first device may include the information about the second device, for example, include the ID of the second device, or include the IP address of the second device. Therefore, the second device can determine that the information from the first device corresponds to the second device, so that the authentication process can be performed.

Alternatively, the first information may further include other information, and information specifically included in the first information is not limited.

With reference to the first aspect, in a possible implementation of the first aspect, the method further includes: The first device generates a second random number, and the first device sends the second random number to the second device.

In this embodiment of this application, not only the second device may perform authentication on the first device, but also the first device may perform authentication on the second device, to further improve security of a communication process. To perform authentication on the second device, the first device may generate the second random number. For example, the second device may obtain a signature based on the second random number, so that the first device can perform authentication on the second device based on the second random number and the signature. Authentication is performed by using a random number, so that a success rate of recognizing a case in which an authorized device is replaced with an unauthorized device is improved, and reliability of a vehicle system is improved.

With reference to the first aspect, in a possible implementation of the first aspect, the method further includes: The first device receives a second signature and a second identifier from the second device, where the second identifier is an identifier of the second device. The first device performs authentication on the second device based on the second signature, the second random number, and the second identifier.

For example, the second device may obtain a signature based on the second random number, so that the first device can perform authentication on the second device based on the second random number and the signature. Authentication is performed by using a random number, so that a success rate of recognizing a case in which an authorized device is replaced with an unauthorized device is improved, and reliability of a vehicle system is improved. In addition, authentication between the first device and the second device may be performed in an asymmetric authentication manner. Compared with a symmetric authentication manner, the asymmetric authentication manner can further improve authentication reliability.

With reference to the first aspect, in a possible implementation of the first aspect, that the first device performs authentication on the second device based on the second signature, the second random number, and the second identifier includes:

The first device performs signature verification on the second signature, the second random number, and the second identifier by using a second public key, to obtain a returned result. When the returned result indicates that the signature verification succeeds, the first device determines that the authentication on the second device succeeds; or otherwise, when the returned result indicates that the signature verification fails, the first device determines that the authentication on the second device fails.

For example, the first device may perform authentication on the second device based on the second random number, the second signature, and the second identifier by using the second public key. The second public key and a second private key that is used to obtain the second signature are a pair of asymmetric keys. For example, the first device may perform signature verification on the second signature, the second random number, and the second identifier by using the second public key, and determine, based on a returned result, whether the signature verification succeeds. If the signature verification succeeds, it indicates that the authentication on the second device succeeds; or if the signature verification fails, it indicates that the authentication on the second device fails. A signature verification manner is, for example, that the first device obtains a hash value, for example, referred to as a third hash value, based on the second random number and the second identifier according to a hash algorithm. The first device inputs the second public key, the third hash value, and the second signature into a signature verification function (for example, referred to as a second function) to perform signature verification, and determines, based on a returned result, whether the signature verification succeeds.

With reference to the first aspect, in a possible implementation of the first aspect, the first certificate does not include subject attribute information.

The first certificate may not include the subject attribute information, and the subject attribute information may be subject attribute information of the first certificate. Alternatively, the subject attribute information may be referred to as application scenario information. A device certificate can be used only for authentication between devices, and is not used for authentication in another scenario. This reflects exclusiveness of the device certificate and helps ensure system security. In addition, according to the solution provided in this embodiment of this application, a size of the device certificate can also be reduced. The first certificate may not include the subject attribute information of the first certificate, and the first certificate is used for authentication related to a service. For example, when the first device and the second device perform authentication related to the first service, the used first certificate may not include the subject attribute information of the first certificate. Alternatively, the first certificate does not include the subject attribute information of the first certificate, and may be unrelated to whether an authentication process is related to a service. For example, authentication is performed between the first device and the second device, but the authentication is unrelated to a service, and the used first certificate may not include the subject attribute information of the first certificate.

With reference to the first aspect, in a possible implementation of the first aspect, the first certificate includes one or any combination of the following information: version information of the first certificate, signer information of the first certificate, subject information of the first certificate, validity information of the first certificate, or signature information of the first certificate.

For example, the first certificate includes the version information of the first certificate; or the first certificate includes the signer information of the first certificate and the subject information of the first certificate; or the first certificate includes the subject information of the first certificate, the validity information of the first certificate, and the signature information of the first certificate; or the first certificate includes the version information of the first certificate, the signer information of the first certificate, the subject information of the first certificate, the validity information of the first certificate, and the signature information of the first certificate.

With reference to the first aspect, in a possible implementation of the first aspect, the method further includes: The first device receives indication information from the second device, where the indication information is used to indicate that the authentication on the first device fails, or indicate the first device to stop working or stop using part of functions of the first device. The first device stops working, or stops using the part of functions of the first device.

If the second device fails to authenticate the first device, the second device may determine a first execution policy. For example, the first execution policy includes: a device stops working, or a device stops using part of functions of the device. For example, the first execution policy is determined by the second device based on the first service, so that an execution policy of a device better meets a requirement of the service. The first execution policy may be executed by the second device or the first device. If the first execution policy should be executed by the first device, the second device may send the indication information to the first device, and the first device receives the indication information from the second device, where the indication information is used to indicate the first execution policy. For example, if the second device is a device such as a gateway or a router, or is an entity having a routing and forwarding function, the first execution policy may be executed by the first device, and the second device may send the indication information to the first device. Alternatively, if the second device is a device other than a gateway and a router, or is an entity other than an entity having a routing and forwarding function, the first execution policy may be executed by the second device. In this case, the second device may not send the indication information to the first device, but executes the first execution policy.

According to a second aspect, a second device authentication method is provided. The method includes: A second device receives first information and a first certificate from a first device, where the first information is used to indicate the second device, and the first certificate is a device certificate of the first device. The second device verifies, based on a root certificate or a level-2 certificate of the first device, whether the first certificate is correct. The second device generates a first random number when the first certificate is correct. The second device sends the first random number to the first device. The second device receives a first signature from the first device. The second device performs authentication on the first device based on the first signature, the first random number, and a first identifier, where the first identifier is an identifier of the first device.

The method in the second aspect may be performed by a second communications apparatus. The second communications apparatus may be a communications device or an apparatus, for example, a chip system, that can support a communications device in implementing a function described in the method. For example, the communications device is a vehicle-mounted apparatus. In the following description, an example in which the second communications apparatus is the second device is used.

In this embodiment of this application, the first information is used to indicate the second device. For example, the first information may be an identifier of a first service, or an address of the second device. As long as the first device sends the first information to the second device, the second device can perform authentication on the first device without depending on a hierarchy relationship between devices. For example, even if the first device is a level-1 device, and the second device is a level-3 device, authentication can be performed between the first device and the second device. In this way, a distributed authentication process is implemented. Compared with a centralized authentication mechanism, the authentication manner in this embodiment of this application reduces load of a device because one intermediate node does not need to perform authentication on a plurality of nodes. According to the technical solution in this embodiment of this application, end-to-end authentication between devices is implemented, and dependence on an intermediate node is reduced, so that more vehicle-mounted devices can undergo authentication, and security of the vehicle-mounted devices is improved. The authentication solution provided in this embodiment of this application has particular resilience. In addition, the end-to-end authentication solution provided in this embodiment of this application is unrelated to an architecture of an entire vehicle, has relatively good compatibility, and may be applied to an existing vehicle architecture, and may also be applied to a future vehicle architecture.

With reference to the second aspect, in a possible implementation of the second aspect, the first information includes the identifier of the first service.

For example, the first information may include the identifier of the first service. In other words, the authentication process may be related to the first service. Therefore, different services may correspond to different second devices, so that an authentication process can be related to a service, to serve the service, thereby improving security of the service. Alternatively, the first information may further include other content. For example, the first information may include information about the second device, and the information about the second device includes, for example, an identifier (for example, an ID of the second device) of the second device, or includes an IP address of the second device. Alternatively, the first information may further include other information.

With reference to the second aspect, in a possible implementation of the second aspect, that the second device performs authentication on the first device based on the first signature, the first random number, and the first identifier includes:

The second device performs signature verification on the first signature, the first random number, and the first identifier by using a first public key, to obtain a returned result. When the returned result indicates that the signature verification succeeds, the second device determines that the authentication on the first device succeeds; or otherwise, when the returned result indicates that the signature verification fails, the second device determines that the authentication on the first device fails.

For example, the second device may perform authentication on the first device based on the first random number, the first signature, and the first identifier by using the first public key. The first public key and a first private key that is used to obtain the first signature are a pair of asymmetric keys. For example, the second device may perform signature verification on the first signature, the first random number, and the first identifier by using the first public key, and determine, based on a returned result, whether the signature verification succeeds. If the signature verification succeeds, it indicates that the authentication on the first device succeeds; or if the signature verification fails, it indicates that the authentication on the first device fails. A signature verification manner is, for example, that the second device obtains a hash value, for example, referred to as a fourth hash value, based on the first random number and the first identifier according to a hash algorithm. The second device inputs the first public key, the fourth hash value, and the first signature into a signature verification function (for example, referred to as a first function) to perform signature verification, and determines, based on a returned result, whether the signature verification succeeds.

With reference to the second aspect, in a possible implementation of the second aspect, the method further includes: The second device receives a second random number from the first device. When the authentication on the first device succeeds, the second device generates a second signature based on the second random number and the second identifier by using a second private key. The second device sends the second signature and the second identifier to the first device, where the second signature is used for authentication on the second device, and the second identifier is an identifier of the second device.

For example, the second device may obtain a signature based on the second random number, so that the first device can perform authentication on the second device based on the second random number and the signature. Authentication is performed by using a random number, so that a success rate of recognizing a case in which an authorized device is replaced with an unauthorized device is improved, and reliability of a vehicle system is improved. In addition, authentication between the first device and the second device may be performed in an asymmetric authentication manner. Compared with a symmetric authentication manner, the asymmetric authentication manner can further improve authentication reliability.

With reference to the second aspect, in a possible implementation of the second aspect, the first certificate does not include subject attribute information of the first certificate.

The first certificate may not include the subject attribute information of the first certificate. Alternatively, the subject attribute information may be referred to as application scenario information. A device certificate can be used only for authentication between devices, and is not used for authentication in another scenario. This reflects exclusiveness of the device certificate and helps ensure system security. In addition, according to the solution provided in this embodiment of this application, a size of the device certificate can also be reduced.

With reference to the second aspect, in a possible implementation of the second aspect, the first certificate includes one or any combination of the following information: version information of the first certificate, signer information of the first certificate, subject information of the first certificate, validity information of the first certificate, or signature information of the first certificate.

For example, the first certificate includes the version information of the first certificate; or the first certificate includes the signer information of the first certificate and the subject information of the first certificate; or the first certificate includes the subject information of the first certificate, the validity information of the first certificate, and the signature information of the first certificate; or the first certificate includes the version information of the first certificate, the signer information of the first certificate, the subject information of the first certificate, the validity information of the first certificate, and the signature information of the first certificate.

With reference to the second aspect, in a possible implementation of the second aspect, the method further includes:

When the authentication on the first device fails, the second device sends indication information to the first device, where the indication information is used to indicate that the authentication on the first device fails, or is used to indicate the first device to stop working or stop using part of functions of the first device; or when the authentication on the first device fails, the second device stops working, or the second device stops using part of functions of the second device.

If the second device fails to authenticate the first device, the second device may determine a first execution policy. For example, the first execution policy includes: a device stops working, or a device stops using part of functions of the device. For example, the first execution policy is determined by the second device based on the first service, so that an execution policy of a device better meets a requirement of the service. The first execution policy may be executed by the second device or the first device. If the first execution policy should be executed by the first device, the second device may send the indication information to the first device, and the first device receives the indication information from the second device, where the indication information is used to indicate the first execution policy. For example, if the second device is a device such as a gateway or a router, or is an entity having a routing and forwarding function, the first execution policy may be executed by the first device, and the second device may send the indication information to the first device. Alternatively, if the second device is a device other than a gateway and a router, or is an entity other than an entity having a routing and forwarding function, the first execution policy may be executed by the second device. In this case, the second device may not send the indication information to the first device, but executes the first execution policy.

According to a third aspect, a third device authentication method is provided. The method includes: A third device receives first information and a first certificate from a first device, where the first information is used to indicate a second device, and the first certificate is a device certificate of the first device. The third device searches for the corresponding second device based on the first information, and sends the first information and the first certificate to the second device, where the first certificate is used by the second device to perform authentication on the first device.

The method in the third aspect may be performed by a third communications apparatus. The third communications apparatus may be a communications device or an apparatus, for example, a chip system, that can support a communications device in implementing a function described in the method. For example, the communications device is a vehicle-mounted apparatus. For example, the vehicle-mounted apparatus is an apparatus such as a gateway or a router, or may be another apparatus having a routing and forwarding function. In the following description, an example in which the third communications apparatus is the third device is used.

The third device may perform only a forwarding function. To be specific, the third device does not perform any processing on information (for example, the first information and the first certificate) from the first device, but directly forwards the information to the second device.

Alternatively, the third device may perform searching based on the first information, to search for the corresponding second device. For example, the first information is an ID of a first service, and the first device sends only the ID of the first service and the first certificate to the third device. For example, the third device stores a correspondence between an ID of a service and a device. For example, the correspondence may be a correspondence between an ID of a service and an address of a device, and the address of the device is, for example, an IP address of the device. The correspondence is used to indicate a device that should execute a corresponding service, or is used to indicate a device on which authentication needs to be performed to execute a corresponding service, or is used to indicate a device associated with a service. For example, the third device searches the correspondence, to determine that devices corresponding to the ID of the first service include, for example, the second device. In this case, the third device may forward the first certificate and the first information to the second device. In this case, in the correspondence, an ID of one service may correspond to one or more devices. For example, the ID of the first service may correspond to only the second device, or may correspond to a plurality of devices, and the plurality of devices include the second device. In this case, the third device may forward the first information, the first certificate, and the like to only some devices corresponding to the ID of the first service. For example, the third device forwards the first information and the first certificate to the second device only. Alternatively, the third device may forward the first information, the first certificate, and the like to all devices corresponding to the ID of the first service. The third device is responsible for forwarding, and the first device does not need to learn of excessive information of a target device, thereby reducing load of the first device. In addition, the third device forwards information together, so that information forwarding can better comply with a unification rule. Certainly, the correspondence may also be stored in the first device, and the first device may determine a corresponding device through self-searching based on an ID of a service. In this case, the third device may be used only as a forwarding device, and does not need to determine the second device based on the first information. Alternatively, in this case, the third device may perform a filtering function described below.

Alternatively, the third device may perform a filtering function. For example, the third device determines, based on the first information, whether the second device corresponding to the first information meets a preset rule. If the second device meets the preset rule, the third device may forward the first information and the first certificate to the second device; or if the second device does not meet the preset rule, the third device does not forward the first information or the first certificate to the second device. For example, the third device may discard the first information and the first certificate, and the procedure ends. In this manner, a possibility that the first device mistakenly sends information is reduced, and communication security is improved.

The third device may have a plurality of functions. In the third aspect, only a searching function of the third device is used as an example.

With reference to the third aspect, in a possible implementation of the third aspect, the first information includes an identifier of the first service.

For example, the first information may include the identifier of the first service. In other words, the authentication process may be related to the first service. Therefore, different services may correspond to different second devices, so that an authentication process can be related to a service, to serve the service, thereby improving security of the service. Alternatively, the first information may further include other content. For example, the first information may include information about the second device, and the information about the second device includes, for example, an identifier (for example, an ID of the second device) of the second device, or includes an IP address of the second device. Alternatively, the first information may further include other information.

With reference to the third aspect, in a possible implementation of the third aspect, the first information is the identifier of the first service, and that the third device searches for the corresponding second device based on the first information includes: The third device searches, based on the identifier of the first service, for the second device related to the first service.

For example, the identifier of the first service is the ID of the first service, and the first device sends only the ID of the first service and the first certificate to the third device. For example, the third device stores a correspondence between an ID of a service and a device. For example, the correspondence may be a correspondence between an ID of a service and an address of a device, and the address of the device is, for example, an IP address of the device. The correspondence is used to indicate a device that should execute a corresponding service, or is used to indicate a device on which authentication needs to be performed to execute a corresponding service, or is used to indicate a device associated with a service. For example, the third device searches the correspondence, to determine that devices corresponding to the ID of the first service include, for example, the second device. In this case, the third device may forward the first certificate and the first information to the second device. In this case, in the correspondence, an ID of one service may correspond to one or more devices. For example, the ID of the first service may correspond to only the second device, or may correspond to a plurality of devices, and the plurality of devices include the second device. In this case, the third device may forward the first information, the first certificate, and the like to only some devices corresponding to the ID of the first service. For example, the third device forwards the first information and the first certificate to the second device only. Alternatively, the third device may forward the first information, the first certificate, and the like to all devices corresponding to the ID of the first service.

With reference to the third aspect, in a possible implementation of the third aspect, the first certificate does not include subject attribute information of the first certificate.

The first certificate may not include the subject attribute information of the first certificate. Alternatively, the subject attribute information may be referred to as application scenario information. A device certificate can be used only for authentication between devices, and is not used for authentication in another scenario. This reflects exclusiveness of the device certificate and helps ensure system security. In addition, according to the solution provided in this embodiment of this application, a size of the device certificate can also be reduced.

With reference to the third aspect, in a possible implementation of the third aspect, the first certificate includes one or any combination of the following information: version information of the first certificate, signer information of the first certificate, subject information of the first certificate, validity information of the first certificate, or signature information of the first certificate.

For example, the first certificate includes the version information of the first certificate; or the first certificate includes the signer information of the first certificate and the subject information of the first certificate; or the first certificate includes the subject information of the first certificate, the validity information of the first certificate, and the signature information of the first certificate; or the first certificate includes the version information of the first certificate, the signer information of the first certificate, the subject information of the first certificate, the validity information of the first certificate, and the signature information of the first certificate.

According to a fourth aspect, a fourth device authentication method is provided. The method includes: A second device fails to authenticate a first device. The second device determines a first execution policy based on a first service, where the authentication corresponds to the first service. The second device sends the first execution policy to the first device, or the second device executes the first execution policy.

The method in the fourth aspect may be performed by a fourth communications apparatus. The fourth communications apparatus may be a communications device or an apparatus, for example, a chip system, that can support a communications device in implementing a function described in the method. For example, the communications device is a vehicle-mounted apparatus. In the following description, an example in which the fourth communications apparatus is the second device is used.

In this embodiment of this application, if the second device fails to authenticate the first device, because the authentication is an authentication process related to the first service, when the second device determines an execution policy, the determined execution policy may be an execution policy related to the first service. In other words, the execution policy may be determined based on the first service, so that the determined execution policy better meets a service requirement.

With reference to the fourth aspect, in a possible implementation of the fourth aspect, the first execution policy includes: a device stops working, or a device stops using part of functions of the device.

For example, the first execution policy includes: a device stops working, or a device stops using part of functions of the device. For example, for the second device, the first execution policy may include: the second device stops working, or the second device stops using part of functions of the second device. The part of functions herein may be functions related to the first service. For example, if the second device is an MDC, and the first service is a self-driving function, the MDC stops using part of functions of the MDC, for example, stops using a function related to the self-driving function.

With reference to the fourth aspect, in a possible implementation of the fourth aspect, the method further includes:

the second device receives first information and a first certificate from the first device, where the first information is used to indicate the second device, and the first certificate is a device certificate of the first device;

the second device verifies, based on a third certificate of the first device, whether the first certificate is correct;

the second device generates a first random number when the first certificate is correct;

the second device sends the first random number to the first device;

the second device receives a first signature from the first device; and the second device performs authentication on the first device based on the first signature, the first random number, and a first identifier, where the first identifier is an identifier of the first device.

Herein, a manner in which the second device performs authentication on the first device is described. For how the second device performs authentication on the first device, refer to a related description in the first aspect or various possible implementations of the first aspect, the second aspect or various possible implementations of the second aspect, the third aspect or various possible implementations of the third aspect, or the fourth aspect or various possible implementations of the fourth aspect.

With reference to the fourth aspect, in a possible implementation of the fourth aspect, the first certificate does not include subject attribute information of the first certificate.

The first certificate may not include the subject attribute information of the first certificate. Alternatively, the subject attribute information may be referred to as application scenario information. A device certificate can be used only for authentication between devices, and is not used for authentication in another scenario. This reflects exclusiveness of the device certificate and helps ensure system security. In addition, according to the solution provided in this embodiment of this application, a size of the device certificate can also be reduced.

With reference to the fourth aspect, in a possible implementation of the fourth aspect, the first certificate includes one or any combination of the following information: version information of the first certificate, signer information of the first certificate, subject information of the first certificate, validity information of the first certificate, or signature information of the first certificate.

For example, the first certificate includes the version information of the first certificate; or the first certificate includes the signer information of the first certificate and the subject information of the first certificate; or the first certificate includes the subject information of the first certificate, the validity information of the first certificate, and the signature information of the first certificate; or the first certificate includes the version information of the first certificate, the signer information of the first certificate, the subject information of the first certificate, the validity information of the first certificate, and the signature information of the first certificate.

According to a fifth aspect, a communications apparatus is provided. For example, the communications apparatus is the first communications apparatus described above. The first communications apparatus is configured to perform the method according to any one of the first aspect or the possible implementations of the first aspect. Specifically, the first communications apparatus may include modules configured to perform the method according to any one of the first aspect or the possible implementations of the first aspect, for example, includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the first communications apparatus is a vehicle-mounted apparatus.

The transceiver module is configured to send first information and a first certificate to a second device, where the first information is used to indicate the second device, and the first certificate is a device certificate of the first communications apparatus.

The transceiver module is further configured to receive a first random number from the second device.

The processing module is configured to obtain a first signature based on the first random number and a first identifier by using a first private key, where the first identifier is an identifier of the first communications apparatus.

The transceiver module is further configured to send the first signature to the second device, where the first signature is used for authentication on the first communications apparatus.

With reference to the fifth aspect, in a possible implementation of the fifth aspect, the first information includes an identifier of a first service.

With reference to the fifth aspect, in a possible implementation of the fifth aspect, the processing module is further configured to generate a second random number; and the transceiver module is further configured to send the second random number to the second device.

With reference to the fifth aspect, in a possible implementation of the fifth aspect, the transceiver module is further configured to receive a second signature and a second identifier from the second device, where the second identifier is an identifier of the second device; and the processing module is further configured to perform authentication on the second device based on the second signature, the second random number, and the second identifier.

With reference to the fifth aspect, in a possible implementation of the fifth aspect, the processing module is configured to perform authentication on the second device based on the second signature, the second random number, and the second identifier in the following manner:

performing signature verification on the second signature, the second random number, and the second identifier by using a second public key, to obtain a returned result; and when the returned result indicates that the signature verification succeeds, determining that the authentication on the second device succeeds; or otherwise, when the returned result indicates that the signature verification fails, determining that the authentication on the second device fails.

With reference to the fifth aspect, in a possible implementation of the fifth aspect, the first certificate does not include subject attribute information of the first certificate.

With reference to the fifth aspect, in a possible implementation of the fifth aspect, the first certificate includes one or any combination of the following information:

version information of the first certificate;
signer information of the first certificate;
subject information of the first certificate;
validity information of the first certificate; or
signature information of the first certificate.

With reference to the fifth aspect, in a possible implementation of the fifth aspect, the transceiver module is further configured to receive indication information from the second device, where the indication information is used to indicate that the authentication on the first communications apparatus fails, or is used to indicate the first communications apparatus to stop working or stop using part of functions of the first communications apparatus; and the processing module is further configured to enable the first communications apparatus to stop working, or stop using part of functions of the first communications apparatus.

For technical effects of the fifth aspect or the possible implementations of the fifth aspect, refer to the description of the technical effects of the first aspect or the possible implementations of the first aspect.

According to a sixth aspect, a communications apparatus is provided. For example, the communications apparatus is the second communications apparatus described above. The second communications apparatus is configured to perform the method according to any one of the second aspect or the possible implementations of the second aspect. Specifically, the second communications apparatus may include modules configured to perform the method according to any one of the second aspect or the possible implementations of the second aspect, for example, includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the second communications apparatus is a vehicle-mounted apparatus.

The transceiver module is configured to receive first information and a first certificate from a first device, where the first information is used to indicate the second communications apparatus, and the first certificate is a device certificate of the first device.

The processing module is configured to verify, based on a root certificate or a level-2 certificate of the first device, whether the first certificate is correct.

The processing module is further configured to generate a first random number when the first certificate is correct.

The transceiver module is further configured to send the first random number to the first device.

The transceiver module is further configured to receive a first signature from the first device.

The processing module is further configured to perform authentication on the first device based on the first signature, the first random number, and a first identifier, where the first identifier is an identifier of the first device.

With reference to the sixth aspect, in a possible implementation of the sixth aspect, the first information includes an identifier of a first service.

With reference to the sixth aspect, in a possible implementation of the sixth aspect, the processing module is configured to perform authentication on the first device based on the first signature, the first random number, and first second identifier in the following manner:

performing signature verification on the first signature, the first random number, and the first identifier by using a first public key, to obtain a returned result; and when the returned result indicates that the signature verification succeeds, determining that the authentication on the first device succeeds; or otherwise, when the returned result indicates that the signature verification fails, determining that the authentication on the first device fails.

With reference to the sixth aspect, in a possible implementation of the sixth aspect, the transceiver module is further configured to receive a second random number from the first device;

the processing module is further configured to: when the authentication on the first device succeeds, generate a second signature based on the second random number and the second identifier by using a second private key; and the transceiver module is further configured to send the second signature and the second identifier to the first device, where the second signature is used for authentication on the second communications apparatus, and the second identifier is an identifier of the second communications apparatus.

With reference to the sixth aspect, in a possible implementation of the sixth aspect, the first certificate does not include subject attribute information of the first certificate.

With reference to the sixth aspect, in a possible implementation of the sixth aspect, the first certificate includes one or any combination of the following information:

version information of the first certificate;
signer information of the first certificate;
subject information of the first certificate;
validity information of the first certificate; or
signature information of the first certificate.

With reference to the sixth aspect, in a possible implementation of the sixth aspect, the transceiver module is further configured to: when the processing module fails to authenticate the first device, send indication information to the first device, where the indication information is used to indicate that the authentication on the first device fails, or is used to indicate the first device to stop working or stop using part of functions of the first device; or the processing module is further configured to: when the authentication on the first device fails, enable the second communications apparatus to stop working, or stop using part of functions of the second communications apparatus.

For technical effects of the sixth aspect or the possible implementations of the sixth aspect, refer to the description of the technical effects of the second aspect or the possible implementations of the second aspect.

According to a seventh aspect, a communications apparatus is provided. For example, the communications apparatus is the third communications apparatus described above. The third communications apparatus is configured to perform the method according to any one of the third aspect or the possible implementations of the third aspect. Specifically, the third communications apparatus may include modules configured to perform the method according to any one of the third aspect or the possible implementations of the third aspect. For example, the third communications apparatus includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the third communications apparatus is a vehicle-mounted apparatus.

The transceiver module is configured to receive first information and a first certificate from a first device, where the first information is used to indicate a second device, and the first certificate is a device certificate of the first device.

The processing module is configured to search for the corresponding second device based on the first information.

The transceiver module is further configured to send the first information and the first certificate to the second device, where the first certificate is used by the second device to perform authentication on the first device.

With reference to the seventh aspect, in a possible implementation of the seventh aspect, the first information includes an identifier of a first service.

With reference to the seventh aspect, in a possible implementation of the seventh aspect, the first information is the identifier of the first service, and the processing module is configured to search for the corresponding second device based on the first information in the following manner:

searching, based on the identifier of the first service, for the second device related to the first service.

With reference to the seventh aspect, in a possible implementation of the seventh aspect, the first certificate does not include subject attribute information of the first certificate.

With reference to the seventh aspect, in a possible implementation of the seventh aspect, the first certificate includes one or any combination of the following information:

version information of the first certificate;
signer information of the first certificate;
subject information of the first certificate;
validity information of the first certificate; or
signature information of the first certificate.

For technical effects of the seventh aspect or the possible implementations of the seventh aspect, refer to the description of the technical effects of the third aspect or the possible implementations of the third aspect.

According to an eighth aspect, a communications apparatus is provided. For example, the communications apparatus is the fourth communications apparatus described above. The fourth communications apparatus is configured to perform the method according to any one of the fourth aspect or the possible implementations of the fourth aspect. Specifically, the fourth communications apparatus may include modules configured to perform the method according to any one of the fourth aspect or the possible implementations of the fourth aspect, for example, includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the fourth communications apparatus is a vehicle-mounted apparatus.

The processing module is configured to fail to authenticate a first device.

The processing module is further configured to determine a first execution policy based on a first service, where the authentication corresponds to the first service.

The transceiver module is configured to send the first execution policy to the first device, or the processing module is further configured to execute the first execution policy.

With reference to the eighth aspect, in a possible implementation of the eighth aspect, the first execution policy includes: a device stops working, or a device stops using part of functions of the device.

With reference to the eighth aspect, in a possible implementation of the eighth aspect, the transceiver module is further configured to receive first information and a first certificate from the first device, where the first information is used to indicate the second device, and the first certificate is a device certificate of the first device;

the processing module is further configured to verify, based on a third certificate of the first device, whether the first certificate is correct;

the processing module is further configured to generate a first random number when the first certificate is correct;

the transceiver module is further configured to send the first random number to the first device;

the transceiver module is further configured to receive a first signature from the first device; and the processing module is further configured to perform authentication on the first device based on the first signature, the first random number, and a first identifier, where the first identifier is an identifier of the first device.

With reference to the eighth aspect, in a possible implementation of the eighth aspect, the first certificate does not include subject attribute information of the first certificate.

With reference to the eighth aspect, in a possible implementation of the eighth aspect, the first certificate includes one or any combination of the following information:
version information of the first certificate;
signer information of the first certificate;
subject information of the first certificate;
validity information of the first certificate; or
signature information of the first certificate.

For technical effects of the eighth aspect or the possible implementations of the eighth aspect, refer to the description of the technical effects of the fourth aspect or the possible implementations of the fourth aspect.

According to a ninth aspect, a communications apparatus is provided. The communications apparatus is, for example, the first communications apparatus described above. The first communications apparatus includes a processor and a transceiver. The processor and the transceiver are configured to implement the method described in the first aspect or the possible designs of the first aspect. For example, the first communications apparatus is a chip disposed in a communications device. For example, the transceiver is implemented by using an antenna, a feeder, and a codec in the communications device. Alternatively, if the first communications apparatus is the chip disposed in the communications device, the transceiver is, for example, a communications interface in the chip. The communications interface is connected to a radio frequency transceiver component in the communications device, to receive and send information by using the radio frequency transceiver component. The transceiver may be a function module. The function module can complete both a function of receiving information and a function of sending information. Alternatively, the transceiver may be a general term of a transmitter and a receiver. The transmitter is configured to complete a function of sending information, and the receiver is configured to complete a function of receiving information. For example, the communications device is a vehicle-mounted apparatus.

The transceiver is configured to send first information and a first certificate to a second device, where the first information is used to indicate the second device, and the first certificate is a device certificate of the first communications apparatus.

The transceiver is further configured to receive a first random number from the second device.

The processor is configured to obtain a first signature based on the first random number and a first identifier by using a first private key, where the first identifier is an identifier of the first communications apparatus.

The transceiver is further configured to send the first signature to the second device, where the first signature is used for authentication on the first communications apparatus.

With reference to the ninth aspect, in a possible implementation of the ninth aspect, the first information includes an identifier of a first service.

With reference to the ninth aspect, in a possible implementation of the ninth aspect,
the processor is further configured to generate a second random number; and
the transceiver is further configured to send the second random number to the second device.

With reference to the ninth aspect, in a possible implementation of the ninth aspect,
the transceiver is further configured to receive a second signature and a second identifier from the second device, where the second identifier is an identifier of the second device; and
the processor is further configured to perform authentication on the second device based on the second signature, the second random number, and the second identifier.

With reference to the ninth aspect, in a possible implementation of the ninth aspect, the processor is configured to perform authentication on the second device based on the second signature, the second random number, and the second identifier in the following manner:
performing signature verification on the second signature, the second random number, and the second identifier by using a second public key, to obtain a returned result; and
when the returned result indicates that the signature verification succeeds, determining that the authentication on the second device succeeds; or otherwise, when the returned result indicates that the signature verification fails, determining that the authentication on the second device fails.

With reference to the ninth aspect, in a possible implementation of the ninth aspect, the first certificate does not include subject attribute information of the first certificate.

With reference to the ninth aspect, in a possible implementation of the ninth aspect, the first certificate includes one or any combination of the following information:
version information of the first certificate;
signer information of the first certificate;
subject information of the first certificate;
validity information of the first certificate; or
signature information of the first certificate.

With reference to the ninth aspect, in a possible implementation of the ninth aspect,
the transceiver is further configured to receive indication information from the second device, where the indication information is used to indicate that the authentication on the first communications apparatus fails, or is used to indicate the first communications apparatus to stop working or stop using part of functions of the first communications apparatus; and
the processor is further configured to enable the first communications apparatus to stop working, or stop using part of functions of the first communications apparatus.

For technical effects of the ninth aspect or the possible implementations of the ninth aspect, refer to the description of the technical effects of the first aspect or the possible implementations of the first aspect.

According to a tenth aspect, a communications apparatus is provided. The communications apparatus is, for example, the second communications apparatus described above. The second communications apparatus includes a processor and a transceiver. The processor and the transceiver are configured to implement the method described in the second aspect or the possible designs of the second aspect. For example, the second communications apparatus is a chip disposed in a communications device. For example, the transceiver is implemented by using an antenna, a feeder, and a codec in the communications device. Alternatively, if the second communications apparatus is the chip disposed in the communications device, the transceiver is, for example, a communications interface in the chip. The communications interface is connected to a radio frequency transceiver component in the communications device, to receive and send information by using the radio frequency transceiver component. The transceiver may be a function module. The function module can complete both a function of receiving information and a function of sending information. Alternatively, the transceiver may be a general term of a transmitter and a receiver. The transmitter is configured to complete a function of sending information, and the receiver is configured to complete a function of receiving information. For example, the communications device is a vehicle-mounted apparatus.

The transceiver is configured to receive first information and a first certificate from a first device, where the first information is used to indicate the second communications apparatus, and the first certificate is a device certificate of the first device.

The processor is configured to verify, based on a root certificate or a level-2 certificate of the first device, whether the first certificate is correct.

The processor is further configured to generate a first random number when the first certificate is correct.

The transceiver is further configured to send the first random number to the first device.

The transceiver is further configured to receive a first signature from the first device.

The processor is further configured to perform authentication on the first device based on the first signature, the first random number, and a first identifier, where the first identifier is an identifier of the first device.

With reference to the tenth aspect, in a possible implementation of the tenth aspect, the first information includes an identifier of a first service.

With reference to the tenth aspect, in a possible implementation of the tenth aspect, the processor is configured to perform authentication on the first device based on the first signature, the first random number, and first second identifier in the following manner:

performing signature verification on the first signature, the first random number, and the first identifier by using a first public key, to obtain a returned result; and when the returned result indicates that the signature verification succeeds, determining that the authentication on the first device succeeds; or otherwise, when the returned result indicates that the signature verification fails, determining that the authentication on the first device fails.

With reference to the tenth aspect, in a possible implementation of the tenth aspect, the transceiver is further configured to receive a second random number from the first device;

the processor is further configured to: when the authentication on the first device succeeds, generate a second signature based on the second random number and the second identifier by using a second private key; and the transceiver is further configured to send the second signature and the second identifier to the first device, where the second signature is used for authentication on the second communications apparatus, and the second identifier is an identifier of the second communications apparatus.

With reference to the tenth aspect, in a possible implementation of the tenth aspect, the first certificate does not include subject attribute information of the first certificate.

With reference to the tenth aspect, in a possible implementation of the tenth aspect, the first certificate includes one or any combination of the following information:
version information of the first certificate;
signer information of the first certificate;
subject information of the first certificate;
validity information of the first certificate; or
signature information of the first certificate.

With reference to the tenth aspect, in a possible implementation of the tenth aspect, the transceiver is further configured to: when the processor fails to authenticate the first device, send indication information to the first device, where the indication information is used to indicate that the authentication on the first device fails, or is used to indicate the first device to stop working or stop using part of functions of the first device; or the processor is further configured to: when the authentication on the first device fails, enable the second communications apparatus to stop working, or stop using part of functions of the second communications apparatus.

For technical effects of the tenth aspect or the possible implementations of the tenth aspect, refer to the description of the technical effects of the second aspect or the possible implementations of the second aspect.

According to an eleventh aspect, a communications apparatus is provided. The communications apparatus is, for example, the third communications apparatus described above. The third communications apparatus includes a processor and a transceiver. The processor and the transceiver are configured to implement the method described in the third aspect or the possible designs of the third aspect. For example, the third communications apparatus is a chip disposed in a communications device. For example, the transceiver is implemented by using an antenna, a feeder, and a codec in the communications device. Alternatively, if the third communications apparatus is the chip disposed in the communications device, the transceiver is, for example, a communications interface in the chip. The communications interface is connected to a radio frequency transceiver component in the communications device, to receive and send information by using the radio frequency transceiver component. The transceiver may be a function module. The function module can complete both a function of receiving information and a function of sending information. Alternatively, the transceiver may be a general term of a transmitter and a receiver. The transmitter is configured to complete a function of sending information, and the receiver is configured to complete a function of receiving information. For example, the communications device is a vehicle-mounted apparatus.

The transceiver is configured to receive first information and a first certificate from a first device, where the first information is used to indicate a second device, and the first certificate is a device certificate of the first device.

The processor is configured to search for the corresponding second device based on the first information.

The transceiver is further configured to send the first information and the first certificate to the second device, where the first certificate is used by the second device to perform authentication on the first device.

With reference to the eleventh aspect, in a possible implementation of the eleventh aspect, the first information includes an identifier of a first service.

With reference to the eleventh aspect, in a possible implementation of the eleventh aspect, the first information is the identifier of the first service, and the processor is configured to search for the corresponding second device based on the first information in the following manner:

searching, based on the identifier of the first service, for the second device related to the first service.

With reference to the eleventh aspect, in a possible implementation of the eleventh aspect, the first certificate does not include subject attribute information of the first certificate.

With reference to the eleventh aspect, in a possible implementation of the eleventh aspect, the first certificate includes one or any combination of the following information:

version information of the first certificate;
signer information of the first certificate;
subject information of the first certificate;
validity information of the first certificate; or
signature information of the first certificate.

For technical effects of the eleventh aspect or the possible implementations of the eleventh aspect, refer to the description of the technical effects of the third aspect or the possible implementations of the third aspect.

According to a twelfth aspect, a communications apparatus is provided. The communications apparatus is, for example, the fourth communications apparatus described above. The fourth communications apparatus includes a processor and a transceiver. The processor and the transceiver are configured to implement the method described in the fourth aspect or the possible designs of the fourth aspect. For example, the fourth communications apparatus is a chip disposed in a communications device. For example, the transceiver is implemented by using an antenna, a feeder, and a codec in the communications device. Alternatively, if the fourth communications apparatus is the chip disposed in the communications device, the transceiver is, for example, a communications interface in the chip. The communications interface is connected to a radio frequency transceiver component in the communications device, to receive and send information by using the radio frequency transceiver component. The transceiver may be a function module. The function module can complete both a function of receiving information and a function of sending information. Alternatively, the transceiver may be a general term of a transmitter and a receiver. The transmitter is configured to complete a function of sending information, and the receiver is configured to complete a function of receiving information. For example, the communications device is a vehicle-mounted apparatus.

The processor is configured to fail to authenticate a first device.

The processor is further configured to determine a first execution policy based on a first service, where the authentication corresponds to the first service.

The transceiver is configured to send the first execution policy to the first device, or the processor is further configured to execute the first execution policy.

With reference to the twelfth aspect, in a possible implementation of the twelfth aspect, the first execution policy includes: a device stops working, or a device stops using part of functions of the device.

With reference to the twelfth aspect, in a possible implementation of the twelfth aspect, the transceiver is further configured to receive first information and a first certificate from a first device, where the first information is used to indicate the second device, and the first certificate is a device certificate of the first device;

the processor is further configured to verify, based on a third certificate of the first device, whether the first certificate is correct;

the processor is further configured to generate a first random number when the first certificate is correct;

the transceiver is further configured to send the first random number to the first device;

the transceiver is further configured to receive a first signature from the first device; and the processor is further configured to perform authentication on the first device based on the first signature, the first random number, and a first identifier, where the first identifier is an identifier of the first device.

With reference to the twelfth aspect, in a possible implementation of the twelfth aspect, the first certificate does not include subject attribute information of the first certificate.

With reference to the twelfth aspect, in a possible implementation of the twelfth aspect, the first certificate includes one or any combination of the following information:

version information of the first certificate;
signer information of the first certificate;
subject information of the first certificate;
validity information of the first certificate; or
signature information of the first certificate.

For technical effects of the twelfth aspect or the possible implementations of the twelfth aspect, refer to the description of the technical effects of the fourth aspect or the possible implementations of the fourth aspect.

According to a thirteenth aspect, a communications apparatus is provided. The communications apparatus may be the first communications apparatus in the foregoing method designs. For example, the first communications apparatus is a chip disposed in a communications device. For example, the communications device is a vehicle-mounted apparatus. The first communications apparatus may include: a communications interface, configured to communicate with another apparatus or device; and a processor. The processor is coupled to the communications interface. The communications interface may be a transceiver in the communications apparatus, for example, implemented by using an antenna, a feeder, and a codec in the communications apparatus. Alternatively, if the communications apparatus is the chip disposed in the communications device, the communications interface may be an input/output interface of the chip, for example, an input/output pin.

Optionally, the first communications apparatus may further include a memory, configured to store computer executable program code. The program code stored in the memory includes an instruction. When the processor executes the instruction, the first communications apparatus is enabled to perform the method in any one of the first aspect or the possible implementations of the first aspect. Alternatively, the first communications apparatus may not include a memory. For example, the processor may execute an instruction stored in an external memory, so that the first communications apparatus performs the method in any one of the first aspect or the possible implementations of the first aspect.

According to a fourteenth aspect, a communications apparatus is provided. The communications apparatus may be the second communications apparatus in the foregoing method designs. For example, the second communications apparatus is a chip disposed in a communications device. For example, the communications device is a vehicle-mounted apparatus. The second communications apparatus may include: a communications interface, configured to communicate with another apparatus or device; and a processor. The processor is coupled to the communications interface. The communications interface may be a transceiver in the communications apparatus, for example, implemented by using an antenna, a feeder, and a codec in the communications apparatus. Alternatively, if the communications apparatus is the chip disposed in the communications device, the communications interface may be an input/output interface of the chip, for example, an input/output pin.

Optionally, the second communications apparatus may further include a memory, configured to store computer executable program code. The program code stored in the memory includes an instruction. When the processor executes the instruction, the second communications apparatus is enabled to perform the method in any one of the second aspect or the possible implementations of the second aspect. Alternatively, the second communications apparatus may not include a memory. For example, the processor may execute an instruction stored in an external memory, so that the second communications apparatus performs the method in any one of the second aspect or the possible implementations of the second aspect.

According to a fifteenth aspect, a communications apparatus is provided. The communications apparatus may be the third communications apparatus in the foregoing method designs. For example, the third communications apparatus is a chip disposed in a communications device. For example, the communications device is a vehicle-mounted apparatus. The third communications apparatus may include: a communications interface, configured to communicate with another apparatus or device; and a processor. The processor is coupled to the communications interface. The communications interface may be a transceiver in the communications apparatus, for example, implemented by using an antenna, a feeder, and a codec in the communications apparatus. Alternatively, if the communications apparatus is the chip disposed in the communications device, the communications interface may be an input/output interface of the chip, for example, an input/output pin.

Optionally, the third communications apparatus may further include a memory, configured to store computer executable program code. The program code stored in the memory includes an instruction. When the processor executes the instruction, the third communications apparatus is enabled to perform the method in any one of the third aspect or the possible implementations of the third aspect. Alternatively, the third communications apparatus may not include a memory. For example, the processor may execute an instruction stored in an external memory, so that the third communications apparatus performs the method in any one of the third aspect or the possible implementations of the third aspect.

According to a sixteenth aspect, a communications apparatus is provided. The communications apparatus may be the fourth communications apparatus in the foregoing method designs. For example, the fourth communications apparatus is a chip disposed in a communications device. For example, the communications device is a vehicle-mounted apparatus. The fourth communications apparatus may include: a communications interface, configured to communicate with another apparatus or device; and a processor. The processor is coupled to the communications interface. The communications interface may be a transceiver in the communications apparatus, for example, implemented by using an antenna, a feeder, and a codec in the communications apparatus. Alternatively, if the communications apparatus is the chip disposed in the communications device, the communications interface may be an input/output interface of the chip, for example, an input/output pin.

Optionally, the fourth communications apparatus may further include a memory, configured to store computer executable program code. The program code stored in the memory includes an instruction. When the processor executes the instruction, the fourth communications apparatus is enabled to perform the method in any one of the fourth aspect or the possible implementations of the fourth aspect. Alternatively, the fourth communications apparatus may not include a memory. For example, the processor may execute an instruction stored in an external memory, so that the fourth communications apparatus performs the method in any one of the fourth aspect or the possible implementations of the fourth aspect.

According to a seventeenth aspect, a communications system is provided. The communications system may include the communications apparatus according to the fifth aspect, the communications apparatus according to the ninth aspect, or the communications apparatus according to the thirteenth aspect, and the communications apparatus according to the sixth aspect, the communications apparatus according to the tenth aspect, or the communications apparatus according to the fourteenth aspect.

With reference to the seventeenth aspect, in a possible implementation of the seventeenth aspect, the communications system may further include the communications apparatus according to the seventh aspect, the communications apparatus according to the eleventh aspect, or the communications apparatus according to the fifteenth aspect.

According to an eighteenth aspect, a communications system is provided. The communications system includes the communications apparatus according to the eighth aspect, the communications apparatus according to the twelfth aspect, or the communications apparatus according to the sixteenth aspect.

With reference to the eighteenth aspect, in a possible implementation of the eighteenth aspect, the communications system may further include the communications apparatus according to the fifth aspect, the communications apparatus according to the ninth aspect, or the communications apparatus according to the thirteenth aspect.

With reference to the eighteenth aspect, in a possible implementation of the eighteenth aspect, the communications system may further include the communications apparatus according to the sixth aspect, the communications apparatus according to the tenth aspect, or the communications apparatus according to the fourteenth aspect.

According to a nineteenth aspect, a computer storage medium is provided. The computer readable storage medium stores a computer program. When the computer program is run on a computer, the computer is enabled to perform the method according to any one of the first aspect or the possible implementations of the first aspect.

According to a twentieth aspect, a computer storage medium is provided. The computer readable storage medium stores a computer program. When the computer program is run on a computer, the computer is enabled to perform the method according to any one of the second aspect or the possible implementations of the second aspect.

According to a twenty-first aspect, a computer storage medium is provided. The computer readable storage medium stores a computer program. When the computer program is run on a computer, the computer is enabled to perform the method according to any one of the third aspect or the possible implementations of the third aspect.

According to a twenty-second aspect, a computer storage medium is provided. The computer readable storage medium stores a computer program. When the computer program is run on a computer, the computer is enabled to perform the method according to any one of the fourth aspect or the possible implementations of the fourth aspect.

According to a twenty-third aspect, a computer program product including an instruction is provided. The computer program product is used to store a computer program. When the computer program is run on a computer, the computer is enabled to perform the method according to any one of the first aspect or the possible implementations of the first aspect.

According to a twenty-fourth aspect, a computer program product including an instruction is provided. The computer program product is used to store a computer program. When the computer program is run on a computer, the computer is enabled to perform the method according to any one of the second aspect or the possible implementations of the second aspect.

According to a twenty-fifth aspect, a computer program product including an instruction is provided. The computer program product is used to store a computer program. When the computer program is run on a computer, the computer is enabled to perform the method according to any one of the third aspect or the possible implementations of the third aspect.

According to a twenty-sixth aspect, a computer program product including an instruction is provided. The computer program product is used to store a computer program. When the computer program is run on a computer, the computer is enabled to perform the method according to any one of the fourth aspect or the possible implementations of the fourth aspect.

In the embodiments of this application, authentication between devices does not depend on a hierarchical relationship between devices. For example, even if the first device is a level-1 device and the second device is a level-3 device, authentication can be performed between the first device and the second device. In this way, a distributed authentication process is implemented. Compared with a centralized authentication mechanism, the authentication manner in this embodiment of this application reduces load of a device, reduces dependence on an intermediate node, and improves system reliability because one intermediate node does not need to perform authentication on a plurality of nodes.

DESCRIPTION OF EMBODIMENTS

Figure 1:
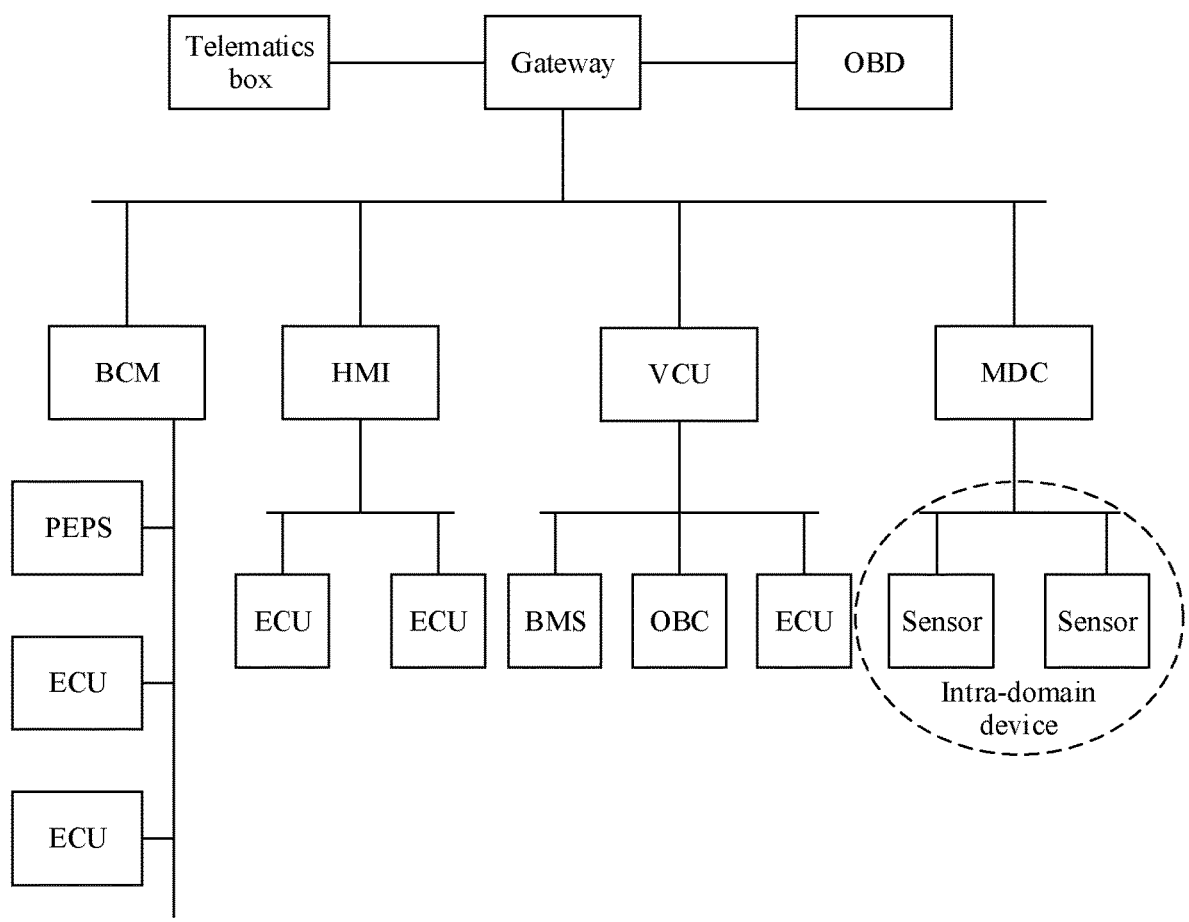
FIG. 1 is a schematic diagram of a network architecture to which an embodiment of this application is applied.

To make the objectives, technical solutions and advantages of the embodiments of this application clearer, the following further describes the embodiments of this application in detail with reference to the accompanying drawings.

(1) Vehicle-mounted device: A device placed or installed on a vehicle may be considered as a vehicle-mounted device. For example, for a vehicle that can perform a self-driving function, driving decision is generally made based on information provided by an ADAS system. The ADAS includes many sensors, such as a camera, a millimeter-wave radar, an ultrasonic radar, or a LiDAR. These sensors may be considered as vehicle-mounted devices. For example, an in-vehicle network of a vehicle may include a plurality of electronic control units (ECU), and all these ECUs may be considered as vehicle-mounted devices.

For example, a vehicle-mounted device is an on-board unit (OBU), and is generally installed on a vehicle. In an electronic toll collection (ETC) system, a road side unit (RSU) is disposed on a roadside, and the OBU may communicate with the RSU, for example, communicate with the RSU through microwave. When the vehicle passes by the RSU, the OBU and the RSU may communicate with each other through microwave. In the ETC system, the OBU establishes a microwave communication link with the RSU by using a dedicated short-range communications (DSRC) technology, to implement processes, such as vehicle identity recognition or electronic fee deduction, in a travel of the vehicle without stopping.

Alternatively, various terminal devices described below may be considered as vehicle-mounted terminal devices or referred to as vehicle-mounted devices if the terminal devices are located on a vehicle (for example, placed in the vehicle or installed in the vehicle).

A terminal device may be a device that provides a user with voice and/or data connectivity, for example, a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

As an example instead of a limitation, in the embodiments of this application, the vehicle-mounted device placed or installed on the vehicle may further include a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of the user. The wearable device is a hardware device, and implements a powerful function based on software support, data interaction, and cloud interaction. In a broader sense, the wearable intelligent device is full-featured, has a large size, and can implement all or part of functions without depending on a smartphone. For example, the wearable intelligent device is a smart watch or smart glasses. Alternatively, the wearable intelligent device focuses only on a specific application function and needs to be used with another device, for example, a smartphone. For example, the wearable intelligent device is a smart wristband, a smart helmet, or smart jewelry for physical sign monitoring.

(2) The terms "system" and "network" may be used interchangeably in the embodiments of this application. "At least one" indicates one or more, and "a plurality of" indicates two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following" or a similar expression indicates any combination of the items, and includes any combination of singular items or plural items. For example, at least one (piece) of a, b, or c may represent: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first message and a second message are merely intended to distinguish between different messages, but do not indicate that the two messages are different in a priority, a sending sequence, or importance.

The foregoing describes some concepts in the embodiments of this application. The following describes technical features in the embodiments of this application.

With the development of intelligent and networked vehicles, functions of the vehicles are increasing. Networking of vehicles not only enables a vehicle factory to learn of and track a status of a vehicle, but also brings more convenience to daily life of a user. However, an unauthorized user may access a vehicle networking system through a network, to operate and control a vehicle, which poses great threats to vehicle security. Therefore, some measures need to be taken to ensure that a terminal device installed on a vehicle is an authorized device, and prevent an unauthorized device from listening to vehicle-mounted data and sending malicious and false instructions and data, to avoid interference with a vehicle function and damage to a vehicle function.

A current measure may be to perform authentication on a vehicle-mounted device. Currently, vehicle-mounted devices are grouped into a plurality of levels, to implement a hierarchical authentication mechanism. For example, all or some of vehicle-mounted devices except a gateway included in a vehicle may be grouped into several domains. Each domain includes one or more vehicle-mounted devices, and each domain has one domain manager (DM). The domain manager may act as a domain controller. An intra-domain device may communicate with a gateway through a domain controller. For example, the gateway is a level-1 device, the domain controller is a level-2 device, and the intra-domain device is a level-3 device. A level-1 vehicle-mounted device may perform authentication on a level-2 vehicle-mounted device. If the authentication on the level-2 vehicle-mounted device succeeds, the level-2 vehicle-mounted device may perform authentication on a level-3 vehicle-mounted device. For example, the gateway may perform authentication on the domain controller. If the authentication on the domain controller succeeds, the domain controller may perform authentication on the intra-domain device in the domain in which the domain controller is located.

In such an authentication measure, authentication largely depends on an intermediate node. For example, the domain controller may be considered as an intermediate node. If the gateway fails to authenticate the domain controller, the domain controller, as an insecure device, cannot perform authentication on an intra-domain device. As a result, a large quantity of intra-domain devices cannot undergo authentication.

It can be learned that in this authentication mechanism, some vehicle-mounted devices cannot undergo authentication, and a security risk is relatively high.

In view of this, the technical solutions in the embodiments of this application are provided. In the embodiments of this application, first information is used to indicate a second device. For example, the first information may be an identifier of a first service, or an address of the second device. As long as a first device sends the first information to the second device, the second device can perform authentication on the first device without depending on a hierarchy relationship between devices. For example, even if the first device is a level-1 device, and the second device is a level-3 device, authentication can be performed between the first device and the second device. In this way, a distributed authentication process is implemented. Compared with a centralized authentication mechanism, the authentication manner in the embodiments of this application reduces load of a device because one intermediate node does not need to perform authentication on a plurality of nodes. According to the technical solutions in the embodiments of this application, end-to-end authentication between devices is implemented, and dependence on the intermediate node is reduced, so that more vehicle-mounted devices can undergo authentication, and security of the vehicle-mounted devices is improved. The authentication solution provided in the embodiments of this application have particular resilience. In addition, the end-to-end authentication solution provided in the embodiments of this application is unrelated to an architecture of an entire vehicle, has relatively good compatibility, and may be applied to an existing vehicle architecture, and may also be applied to a future vehicle architecture.

The following describes a network architecture to which an embodiment of this application is applied. FIG. 1 shows the network architecture to which the embodiments of this application are applied.

FIG. 1 shows all or some vehicle-mounted devices included in a vehicle. These vehicle-mounted devices may be grouped into several domains, each domain includes one or more vehicle-mounted devices, each domain includes a domain administrator, and the domain administrator may also be referred to as a domain controller. For example, a mobile data center (MDC), one or more sensors, and a global positioning system (GPS) belong to a domain, and the MDC is a domain controller in the domain. A vehicle control unit (VCU), one or more electronic control units (ECU), wireless power transmission (WPT), and the like belong to a domain, and the VCU is a domain controller in the domain. A human machine interface (HMI) and one or more ECUs belong to a domain, and the HMI is a domain controller in the domain. A body control module (BCM), one or more ECUs, a passive entry passive start (PEPS), and the like belong to a domain, and the BCM is a domain controller in the domain. A domain controller is connected to a gateway, and the gateway is further connected to devices such as an on-board diagnostics (OBD) and a telematics box (T-Box). For example, the domain controller may communicate with a device such as the T-Box through the gateway, and an intra-domain device may communicate with a device such as the gateway through the domain controller.

In FIG. 1, an example in which the gateway serves as a primary authentication node is used. Actually, the primary authentication node is not limited to the gateway, and may be another vehicle-mounted device.

The vehicle-mounted devices are grouped into a plurality of domains according to a plurality of factors. For example, the vehicle-mounted devices may be grouped according to functions implemented by the vehicle-mounted devices. For example, if several vehicle-mounted devices cooperate with each other to implement a function (for example, a power function), these vehicle-mounted devices may be grouped into a domain. Alternatively, the vehicle-mounted devices may be grouped into different domains according to another factor. For the domain controller, for example, a vehicle-mounted device in a domain is randomly selected as the domain controller, or a vehicle-mounted device that has a coordinated management function in a domain may be selected as the domain controller.

The following describes the technical solutions in the embodiments of this application with reference to the accompanying drawings.

Figure 2:
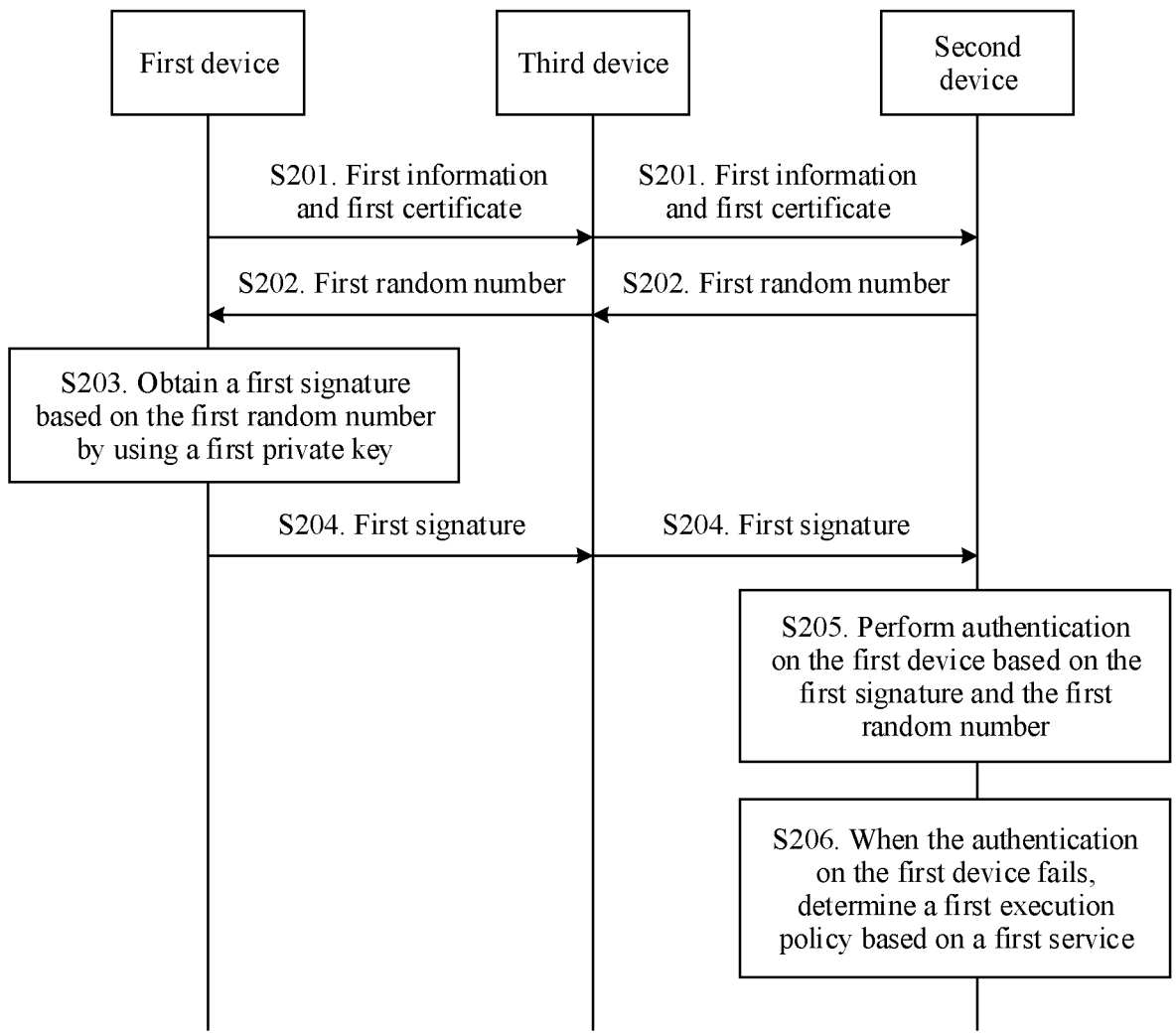
FIG. 2 is a flowchart of a device authentication method according to an embodiment of this application.

An embodiment of this application provides a device authentication method. FIG. 2 is a flowchart of the method. In the following description process, an example in which the method is applied to the network architecture shown in FIG. 1 is used. In addition, the method may be performed by three communications apparatuses (or three types of communications apparatuses). The three communications apparatuses are, for example, a first communications apparatus, a second communications apparatus, and a third communications apparatus. The first communications apparatus, the second communications apparatus, or the third communications apparatus may be a vehicle-mounted apparatus or a communications apparatus (for example, a chip system) that can support a vehicle-mounted apparatus in implementing a function described in the method, or certainly may be another communications apparatus. In addition, implementations of the first communications apparatus, the second communications apparatus, and the third communications apparatus are not limited. For example, the three communications apparatuses may be implemented in a same form, for example, all implemented in a form of a device. Alternatively, the three communications apparatuses may be implemented in different forms. For example, the first communications apparatus is implemented in a form of a device, the second communications apparatus is implemented in a form of a chip system, and the third communications apparatus is implemented in a form of a device. The three communications apparatuses may alternatively be three different chips, or the like.

For ease of description, the following uses an example in which the method is performed by a first device, a second device, and a third device. In other words, an example in which the first communications apparatus is the first device, the second communications apparatus is the second device, and the third communications apparatus is the third device is used. For example, the first device may be a to-be-authenticated device, and the second device may be a device other than a gateway and a router, or an entity other than an entity having a routing and forwarding function. In addition, the gateway may also be an entity apparatus having a function of a routing and forwarding device. For example, this embodiment is applied to the network architecture shown in FIG. 1. Therefore, the first device described below is, for example, a domain controller in the network architecture shown in FIG. 1, the second device described below is, for example, the T-Box or the OBD in the network architecture shown in FIG. 1, and the third device described below is, for example, the gateway in the network architecture shown in FIG. 1. Alternatively, the first device described below is, for example, the T-Box or the OBD in the network architecture shown in FIG. 1, the second device described below is, for example, a domain controller in the network architecture shown in FIG. 1, and the third device described below is, for example, the gateway in the network architecture shown in FIG. 1.

S201. The first device sends first information and a first certificate to the second device, and the second device receives the first information and the first certificate from the first device. The first information is used to indicate the second device, and the first certificate is a device certificate of the first device.

The first information may be used for authentication. The first information may include information about the second device. The information about the second device includes, for example, an IP address of the second device, or the information about the second device includes, for example, an ID of the second device, or the information about the second device includes, for example, an IP address of the second device and an ID of the second device, or the information about the second device may include other information about the second device. Therefore, the first information may indicate the second device. The first information may indicate the second device, or the first information may be associated with the second device. The association herein may be an association between services, or may be an association relationship included in the first information as a carrier in S201.

Alternatively, the first information may include an identifier of a service, and the identifier may indicate a target authentication device. For example, the target authentication device may be determined through table lookup (or searching for a corresponding relationship) based on the identifier. Alternatively, the target authentication device indicated by the identifier may be determined based on the identifier without an additional operation such as table lookup. The target authentication device is, for example, the second device. For example, the identifier of the service is an identity (ID) of the service, and the service is referred to as, for example, a first service. The first service may be a service that is to be performed by the first device and the second device. For example, before the first device and the second device perform the first service, the second device first needs to perform authentication on the first device. Therefore, it may be considered that the target device that is to perform the current authentication and that is indicated by the identifier of the service is the second device.

Alternatively, the first information may include information in response to entered information, for example, include information in response to information entered by a user. In other words, the first information includes information related to an input of the user. For example, the first information is information in response to entered information, and the entered information is, for example, information entered by the user. For example, if the user wants to perform the first service, the user presses one or more buttons or keys. This is equivalent to entering information. Alternatively, the user performs an operation on a human-machine interaction interface or another interaction interface. This is equivalent to entering information. Alternatively, the first information may be a response to some determining or triggering conditions. After receiving the information entered by the user, the first device may start an authentication process, to execute the first service.

Alternatively, the first information may implicitly indicate the second device, or the first information includes other information similar to that described above.

Alternatively, the first information may include an identifier of another triggering condition provided by another device or the first device. For example, the first information includes information in response to a measurement result, a trigger identifier, or an information report that is periodically reported by the another device, or may include information introduced by start or restart of the first device, another device, or a vehicle, or information introduced by update of software/hardware, or information introduced by a plug-and-play device.

Alternatively, the first information may include information in response to another event. The another event is, for example, an event that the first device is powered on, or an event that the first device receives information from another device. For example, if the user wants to perform the first service, the user presses a button or some buttons. This is equivalent to entering information, and the another device receives the information entered by the user. After receiving the information entered by the user, the another device may indicate the first device to start an authentication process, and the first device may perform S201.

Alternatively, the first information may include packet ID information.

The first certificate may be the device certificate of the first device. For example, to ensure security, identity information of a device may be written into the device after the device is manufactured. For example, after manufacturing the device, a manufacturer may test the device. After the device passes the test, the manufacturer or an original equipment manufacturer (OEM) of the device may write the identity information of the device into the device. For example, the identity information of the device includes one or more of the following: a root certificate or a level-2 certificate of the device, a device certificate of the device, a model of the device, a private key used by the device, or an identifier of the device. For example, the identity information of the device includes the root certificate and the device certificate of the device. Alternatively, the identity information of the device includes the identifier of the device. Alternatively, the identity information of the device includes the level-2 certificate of the device, the private key of the device, and the identifier of the device. Alternatively, the identity information of the device includes the root certificate or the level-2 certificate of the device, the device certificate of the device, the private key of the device, the model of the device, the identifier of the device, and the like.

In addition to the first information and the first certificate, the first device may further send a first identifier to the second device, and the second device may receive the first identifier from the first device. The first identifier is an identifier of the first device, for example, an ID of the first device.

Information needs to be forwarded between the first device and the second device through the third device. Therefore, the first device actually sends the first certificate and the first information to the third device, the third device forwards the first certificate and the first information to the second device, and the second device receives the first certificate and the first information from the third device. However, because the first certificate and the first information are sent by the first device to the third device, it may also be considered that the second device receives the first certificate and the first information from the first device. If the first device further needs to send the first identifier to the second device, the first identifier also needs to be forwarded to the second device through the third device.

The third device may perform only a forwarding function. To be specific, the third device does not perform any processing on information (for example, the first information and the first certificate) from the first device, but directly forwards the information to the second device.

Alternatively, the third device may perform searching based on the first information, to search for the corresponding second device. For example, the first information is an ID of the first service, and the first device sends only the ID of the first service and the first certificate to the third device. For example, the third device stores a correspondence between an ID of a service and a device. For example, the correspondence may be a correspondence between an ID of a service and an address of a device, and the address of the device is, for example, an IP address of the device. The correspondence is used to indicate a device that should execute a corresponding service, or is used to indicate a device on which authentication needs to be performed to execute a corresponding service, or is used to indicate a device associated with a service. For example, the third device searches the correspondence, to determine that devices corresponding to the ID of the first service include, for example, the second device. In this case, the third device may forward the first certificate and the first information to the second device. In this case, in the correspondence, an ID of one service may correspond to one or more devices. For example, the ID of the first service may correspond to only the second device, or may correspond to a plurality of devices, and the plurality of devices include the second device. In this case, the third device may forward the first information, the first certificate, and the like to only some devices corresponding to the ID of the first service. For example, the third device forwards the first information and the first certificate to the second device only. Alternatively, the third device may forward the first information, the first certificate, and the like to all devices corresponding to the ID of the first service. Certainly, the correspondence may also be stored in the first device, and the first device may determine a corresponding device through self-searching based on an ID of a service. In this case, the third device may be used only as a forwarding device, and does not need to determine the second device based on the first information. Alternatively, in this case, the third device may perform a filtering function described below.

Alternatively, the third device may perform a filtering function. For example, the third device determines, based on the first information, whether the second device corresponding to the first information meets a preset rule. If the second device meets the preset rule, the third device may forward the first information and the first certificate to the second device; or if the second device does not meet the preset rule, the third device does not forward the first information or the first certificate to the second device. For example, the third device may discard the first information and the first certificate, and the procedure ends.

For example, the first information includes the ID of the first service and an identifier of the second device, for example, the IP address. The first device sends the ID of the first service, the IP address of the second device, and the first certificate to the third device. For example, the third device stores the correspondence, and the correspondence may be considered as the preset rule. For example, the third device searches the correspondence, to determine devices corresponding to the ID of the first service. The third device may determine whether the second device corresponding to the IP address of the second device exists in the devices corresponding to the ID of the first service. If the second device exists, the second device meets the preset rule, and the third device may forward the ID of the first service, the IP address of the second device, the first certificate, and the like to the second device. If there is no second device in the devices corresponding to the ID of the first service, the second device does not meet the preset rule, and the third device may not forward the ID of the first service, the IP address of the second device, the first certificate, or the like to the second device. This ensures information security.

Alternatively, for example, the first information includes an identifier of the second device, for example, the IP address. The first device sends the IP address of the second device and the first certificate to the third device. For example, the third device stores an association relationship between devices. For example, the first device may interact with some devices when executing a corresponding service. In this case, the third device may store an association relationship between the first device and these devices, and the correspondence may be considered as the preset rule. For example, the third device searches the association relationship, to determine devices corresponding to the first service. The third device may determine whether the second device corresponding to the IP address of the second device exists in the devices corresponding to the first service. If the second device exists, the second device meets the preset rule, and the third device may forward the IP address of the second device, the first certificate, and the like to the second device. If there is no second device in the devices corresponding to the first service, the second device does not meet the preset rule, and the third device may not forward the IP address of the second device, the first certificate, or the like to the second device. This ensures information security.

The first certificate may include one or any combination of the following information: version information of the first certificate, signer information of the first certificate, subject information of the first certificate, validity information of the first certificate, or signature information of the first certificate. For example, the first certificate includes the version information of the first certificate; or the first certificate includes the signer information of the first certificate and the subject information of the first certificate; or the first certificate includes the subject information of the first certificate, the validity information of the first certificate, and the signature information of the first certificate; or the first certificate includes the version information of the first certificate, the signer information of the first certificate, the subject information of the first certificate, the validity information of the first certificate, and the signature information of the first certificate.

In addition, the first certificate may not include subject attribute information of the first certificate. Alternatively, the subject attribute information may be referred to as application scenario information. A device certificate may be used only for authentication between devices, and is not used for authentication in another scenario, such as secure boot authentication or over the air (OTA) authentication. This reflects exclusiveness of the device certificate. Leakage of a third-party certificate private key in another application scenario does not affect validity of a signature of the device certificate. This ensures security of communication between different devices and security of a system. In addition, according to the solution provided in this embodiment of this application, a size of the device certificate can be reduced.

For example, the first certificate includes the version information of the first certificate, the signer information of the first certificate, the subject information of the first certificate, the validity information of the first certificate, and the signature information of the first certificate. For an example of content included in the first certificate, refer to Table 1.

TABLE 1

| Field name | | | Length (Byte) | Remarks |
|---|---|---|---|---|
| Version | Version | | 1 | |
| Signer information | Certificate digest | Digest algorithm | 1 | 1. Self-signed mode 2. Digest algorithm |
| | | 8-byte truncated digest value | 8 | |
| Subject information | Device ID | | 7 | 7 bytes, including information such as a manufacturer, a production batch number, and a production date |
| Validity restriction | Start date | | 4 | Generally, a validity period of a certificate is 25 years |
| | End date | | 4 | |
| Signature | Elliptic curve | | 1 | |
| | Horizontal coordinate of a public key on the elliptic curve | | 32 | |
| | Signature value | | 64 | |

In an optional manner, if the second device is a device other than a gateway or a router, or the second device is an entity other than an entity having a routing and forwarding function, the first device may not send the first information to the second device. That is, in S201, the first device may send the first certificate to the second device, and does not need to send the first information to the second device.

S202. The second device sends a first random number to the first device, and the first device receives the first random number from the second device.

After receiving the first information and the first certificate, the second device may perform verification on the first certificate to determine whether the first certificate is reliable. For example, the second device may perform verification on the first certificate based on a third certificate of the first device. If the verification succeeds, the second device determines that the first certificate is reliable. If the verification fails, the second device determines that the first certificate is unreliable. A third certificate of a device may be an OEM root certificate, a level-2 certificate issued by an OEM/certificate authority (CA), a level-3 certificate issued by the OEM/CA, a level-4 certificate, a certificate of a higher level, or the like. A level of the certificate is not limited. For example, the third certificate of the first device may be a root certificate, a level-2 certificate, a level-3 certificate, a level-4 certificate, or a certificate of a higher level.

If the second device determines that the first certificate is reliable, the second device may generate a random number, for example, the first random number, and the second device may send the first random number to the first device. The first random number may be used for authentication on the first device. In this embodiment, an example in which the second device determines that the first certificate is reliable is used.

If the second device determines that the first certificate is unreliable, the second device may not need to generate the first random number. For example, if the second device determines that the first certificate is unreliable, the second device may further send a notification message to the first device. The notification message is used to indicate that the first certificate is unreliable, or is used to indicate that an authentication process fails, or the like.

The second device may forward the first random number to the first device through the third device.

Content related to the first certificate may be combined in the embodiment shown in FIG. 2, or may be independently used as an embodiment. For example, an operation of sending the first certificate by the first device to the second device, and content of the first certificate may be independently used as an embodiment. Alternatively, an operation of performing verification on the first certificate by the second device, content of the first certificate, and the like may be independently used as an embodiment.

S203. The first device obtains a first signature based on the first random number by using a first private key.

The first private key is a private key used by the first device. For example, the first private key belongs to the identity information of the first device, and may be written into the first device after the first device is manufactured, or may be a random number that is randomly generated by the device in advance and stored in the device. Therefore, the first private key does not need to be temporarily written into the first device, and the first device may directly use the first private key, thereby improving device authentication efficiency.

In an optional manner, the first device may obtain the first signature based on the first random number and the first identifier. For example, the first device may obtain a hash value, for example, referred to as a first hash value, based on the first random number and the first identifier according to a hash algorithm. The first device may sign the first hash value based on the first private key, to obtain the first signature. For example, the first signature is represented as $sig1=sig_{pk}(r1, ID\ 1)$, where r1 represents the first random number, ID 1 represents the first identifier, and pk represents the private key of the first device.

S204. The first device sends the first signature to the second device, and the second device receives the first signature from the first device. The first signature may be used for authentication on the first device.

The first device may send the first signature to the third device, and the third device forwards the first signature to the second device.

S205. The second device performs authentication on the first device based on the first signature and the first random number.

If the first device obtains the first signature based on the first random number, the second device may perform authentication on the first device based on the first signature and the first random number. Alternatively, if the first device obtains the first signature based on the first random number and the first identifier, the second device may perform authentication on the first device based on the first signature, the first random number, and the first identifier.

For example, the second device may perform authentication on the first device based on the first random number, the first signature, and the first identifier by using a first public key. The first public key and the first private key that is used to obtain the first signature are a pair of asymmetric keys. For example, the second device may perform signature verification on the first signature, the first random number, and the first identifier by using the first public key, and determine, based on a returned result, whether the signature verification succeeds. If the signature verification succeeds, it indicates that the authentication on the first device succeeds; or if the signature verification fails, it indicates that the authentication on the first device fails. A signature verification manner is, for example, that the second device obtains a hash value, for example, referred to as a fourth hash value, based on the first random number and the first identifier according to the hash algorithm. The second device inputs the first public key, the fourth hash value, and the first signature into a signature verification function (for example, referred to as a first function) to perform signature verification, and determines, based on a returned result, whether the signature verification succeeds.

The second device may send an authentication result to the first device through the third device, so that the first device can learn of the authentication result.

The authentication process described in S202 to S206 may also be replaced with another authentication process, or any one or more of S202 to S206 may not be performed. For example, S202 may not be performed, the second device may not need to send the first random number to the first device, and the first device may generate the first signature based on the first identifier without the first random number, provided that the authentication performed by the second device on the first device can be completed.

S206. The second device determines a first execution policy based on the first service. The authentication process described above corresponds to the first service.

S206 is also an optional step, and is not necessarily performed. S206 is performed on a premise that the second device fails to authenticate the first device. In other words, if the second device fails to authenticate the first device in S205, the second device may perform S206. However, if the second device fails to authenticate the first device in S205, the second device may not perform S206. For example, if the second device has authenticated the first device, the second device may continue to perform subsequent step 207, or may not perform subsequent step 207, but may perform another process, for example, may start the first service.

For example, the first execution policy includes: a device stops working, or a device stops using part of functions of the device. For example, for the second device, the first execution policy may include: the second device stops working, or the second device stops using part of functions of the second device. The part of functions herein may be functions related to the first service. For example, if the second device is an MDC, and the first service is a self-driving function, the MDC stops using part of functions of the MDC, for example, stops using a function related to the self-driving function. The first execution policy may be executed by the second device or the first device. If the first execution policy should be executed by the first device, the second device may send indication information to the first device, and the first device receives the indication information from the second device. The indication information is used to indicate the first execution policy. For example, if the second device is a device such as a gateway or a router, or is an entity having a routing and forwarding function, the first execution policy may be executed by the first device, and the second device may send the indication information to the first device. Alternatively, if the second device is a device other than a gateway and a router, or is an entity other than an entity having a routing and forwarding function, the first execution policy may be executed by the second device. In this case, the second device may not send the indication information to the first device, but executes the first execution policy.

In this embodiment of this application, the first information is used to indicate the second device. For example, the first information may be the identifier of the first service, or the address of the second device. As long as the first device sends the first information to the second device, the second device can perform authentication on the first device without depending on a hierarchy relationship between devices. For example, even if the first device is a level-1 device and the second device is a level-3 device, authentication can be performed between the first device and the second device. In this way, a distributed authentication process is implemented. Compared with a centralized authentication mechanism, the authentication manner in the embodiments of this application reduces load of a device because one intermediate node does not need to perform authentication on a plurality of nodes. According to the technical solution in this embodiment of this application, end-to-end authentication between devices is implemented, and dependence on the intermediate node is reduced, so that more vehicle-mounted devices can undergo authentication, and security of the vehicle-mounted devices is improved. In addition, authentication can be performed based on a service requirement, this ensures service security. In addition, the third device may perform only a forwarding function, or the third device may search for and determine the second device, and the first device does not need to determine the second device, thereby reducing a workload of the first device. Alternatively, the third device may further perform the filtering function, thereby further improving communication security. The authentication solution provided in this embodiment of this application has particular resilience. In addition, the end-to-end authentication solution provided in this embodiment of this application is unrelated to an architecture of an entire vehicle, has relatively good compatibility, and may be applied to an existing vehicle architecture, and may also be applied to a future vehicle architecture.

Figure 3:
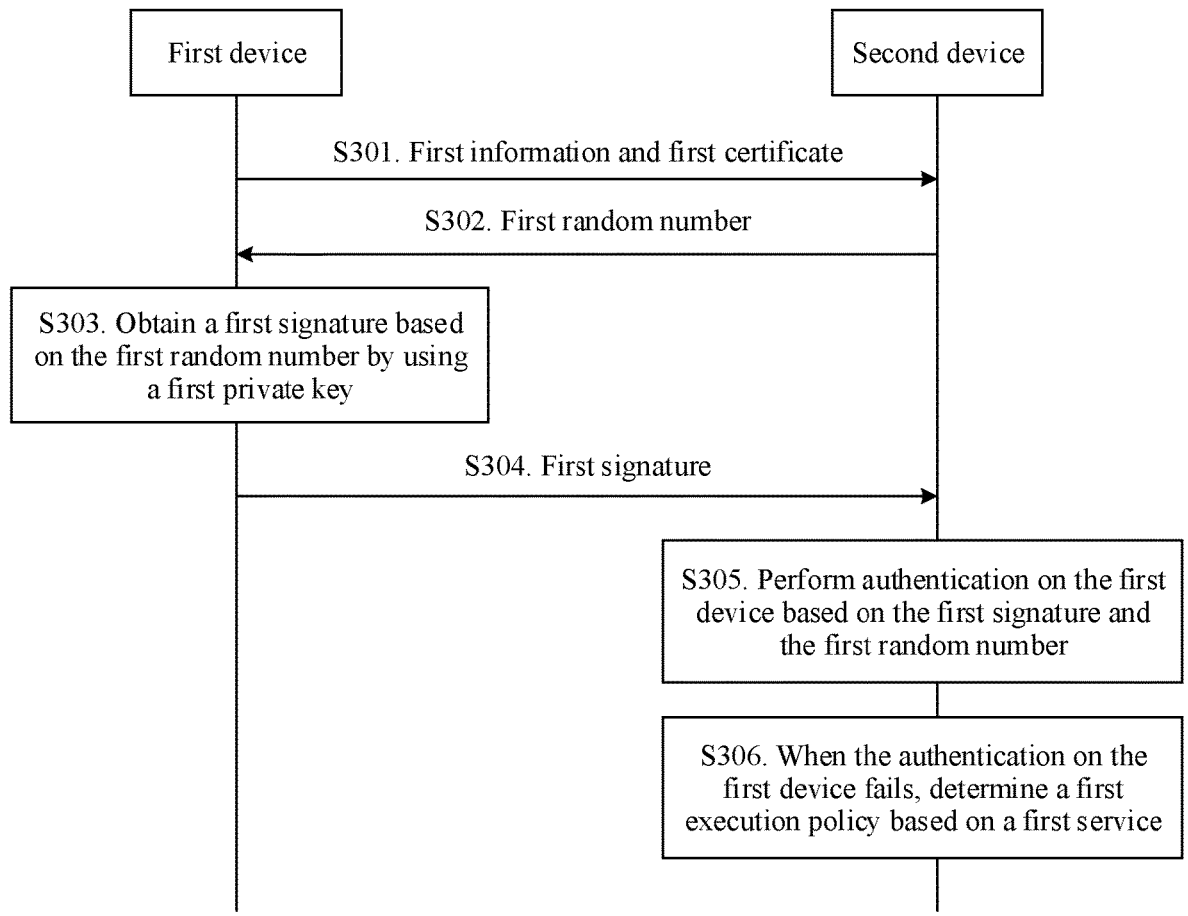
FIG. 3 is a flowchart of a device authentication method according to an embodiment of this application.

In the embodiment shown in FIG. 2, information needs to be forwarded between the first device and the second device through the third device. The following further describes a device authentication method. In this method, the first device and the second device may directly communicate with each other, and do not need to forward information through another device. FIG. 3 is a flowchart of the method. In the following description process, an example in which the method is applied to the network architecture shown in FIG. 1 is used. In addition, the method may be performed by two communications apparatuses (or two types of communications apparatuses). The two communications apparatuses are, for example, a first communications apparatus and a second communications apparatus. The first communications apparatus or the second communications apparatus may be a vehicle-mounted apparatus or a communications apparatus (for example, a chip system) that can support a vehicle-mounted apparatus in implementing a function described in the method, or certainly may be another communications apparatus. In addition, implementations of the first communications apparatus and the second communications apparatus are not limited. For example, the two communications apparatuses may be implemented in a same form. For example, the two communications apparatuses are implemented in a form of a device. Alternatively, the two communications apparatuses may be implemented in different forms. For example, the first communications apparatus is implemented in a form of a device, and the second communications apparatus is implemented in a form of a chip system.

For ease of description, the following uses an example in which the method is performed by a first device and a second device. In other words, an example in which the first communications apparatus is the first device and the second communications apparatus is the second device is used. For example, the first device may be a to-be-authenticated device, the second device may be a device other than a gateway and a router, or an entity other than an entity having a routing and forwarding function, or the second device may be a device such as a gateway or a router, or the second device may be an entity having a routing and forwarding function. In addition, the gateway may also be an entity apparatus having a function of a routing and forwarding device. If the second device is a device such as a gateway or a router, or an entity having a routing and forwarding function, it may be considered that the embodiment shown in FIG. 3 is in a scenario in which the gateway performs centralized authentication. For example, the gateway may perform authentication on each domain controller. Alternatively, it may be considered that the embodiment shown in FIG. 3 is still in a distributed authentication scenario. For example, the gateway may perform authentication on each domain controller, or domain controllers may perform authentication on each other. However, if the second device is a device other than the gateway and the router, it may be considered that the embodiment shown in FIG. 3 is in a distributed authentication scenario in which the gateway does not need to perform centralized authentication. In this embodiment, the network architecture shown in FIG. 1 is used as an example. Therefore, the first device described below is, for example, the domain controller in the network architecture shown in FIG. 1, and the second device described below is, for example, the T-Box, the OBD, or the gateway in the network architecture shown in FIG. 1.

S301. The first device sends first information and a first certificate to the second device, and the second device receives the first information and the first certificate from the first device. The first information is used to indicate the second device, and the first certificate is a device certificate of the first device.

The first information may be used for authentication. The first information may include information about the second device. The information about the second device includes, for example, an IP address of the second device, or the information about the second device includes, for example, an ID of the second device, or the information about the second device includes, for example, an IP address of the second device and an ID of the second device, or the information about the second device may further include other information about the second device. Therefore, the first information may indicate the second device. Alternatively, it may be considered that the first information is associated with the second device.

Alternatively, the first information may include an identifier of a service, and the identifier may indicate a target authentication device. For example, the target authentication device may be determined through table lookup based on the identifier. Alternatively, the target authentication device indicated by the identifier may be determined based on the identifier without an additional operation such as table lookup. The target authentication device is, for example, the second device. For example, the identifier of the service is an identity (ID) of the service, and the service is referred to as, for example, a first service. The first service may be a service that is to be performed by the first device and the second device. For example, before the first device and the second device perform the first service, the second device first needs to perform authentication on the first device. Therefore, it may be considered that the target device that is to perform the current authentication and that is indicated by the identifier of the service is the second device.

Alternatively, the first information may include information in response to entered information, for example, include information in response to information entered by a user. In other words, the first information includes information related to an input of the user. For example, the first information is information in response to entered information, and the entered information is, for example, information entered by the user. For example, if the user wants to perform the first service, the user presses one or more buttons or keys. This is equivalent to entering information. Alternatively, the user performs an operation on a human-machine interaction interface or another interaction interface. This is equivalent to entering information. After receiving the information entered by the user, the first device may start an authentication process, to execute the first service.

Alternatively, the first information may implicitly indicate the second device, or the first information includes other information similar to that described above.

Alternatively, the first information may include an identifier of another triggering condition provided by another device or the first device. For example, the first information includes information about a measurement result, a trigger identifier, or an information report that is periodically reported by the another device, or may include information introduced by start or restart of the first device, another device, or a vehicle, or information introduced by update of software/hardware, or information introduced by a plug-and-play device.

Alternatively, the first information may include information in response to another event. The another event is, for example, an event that the first device is powered on, or an event that the first device receives information from another device. For example, if the user wants to perform the first service, the user presses a button or some buttons. This is equivalent to entering information, and the another device receives the information entered by the user. After receiving the information entered by the user, the another device may indicate the first device to start an authentication process, and the first device may perform S201.

Alternatively, the first information may include packet ID information.

The first certificate may be the device certificate of the first device. For example, to ensure security, identity information of a device may be written into the device after the device is manufactured. For example, after manufacturing the device, a manufacturer may test the device. After the device passes the test, the manufacturer or an OEM of the device may write the identity information of the device into the device. For example, the identity information of the device includes one or more of the following: a third certificate of the device, a device certificate of the device, a model of the device, a private key used by the device, or an identifier of the device. For example, the identity information of the device includes the third certificate and the device certificate of the device. Alternatively, the identity information of the device includes the identifier of the device. Alternatively, the identity information of the device includes the third certificate of the device, the private key of the device, and the identifier of the device. Alternatively, the identity information of the device includes the third certificate of the device, the device certificate of the device, the private key of the device, the model of the device, the identifier of the device, and the like. A third certificate of a device may be an OEM root certificate, a level-2 certificate issued by an OEM/CA, a level-3 certificate issued by the OEM/CA, a level-4 certificate, a certificate of a higher level, or the like. A level of the certificate is not limited. For example, a third certificate of the first device may be a root certificate, a level-2 certificate, a level-3 certificate, a level-4 certificate, or a certificate of a higher level.

In addition to the first information and the first certificate, the first device may further send a first identifier to the second device, and the second device may receive the first identifier from the first device. The first identifier is an identifier of the first device, for example, an ID of the first device.

In this embodiment of this application, information does not need to be forwarded between the first device and the second device through another device. The first device may directly send the first certificate, the first information, and the like to the second device, or the second device may directly receive the first certificate and the first information from the first device.

The first certificate may include one or any combination of the following information: version information of the first certificate, signer information of the first certificate, subject information of the first certificate, validity information of the first certificate, or signature information of the first certificate. For example, the first certificate includes the version information of the first certificate; or the first certificate includes the signer information of the first certificate and the subject information of the first certificate; or the first certificate includes the subject information of the first certificate, the validity information of the first certificate, and the signature information of the first certificate; or the first certificate includes the version information of the first certificate, the signer information of the first certificate, the subject information of the first certificate, the validity information of the first certificate, and the signature information of the first certificate.

In addition, the first certificate may not include subject attribute information of the first certificate. Alternatively, the subject attribute information may be referred to as application scenario information.

For example, the first certificate includes the version information of the first certificate, the signer information of the first certificate, the subject information of the first certificate, the validity information of the first certificate, and the signature information of the first certificate. For an example of content included in the first certificate, refer to Table 1 in the embodiment shown in FIG. 2.

In an optional manner, if the second device is a device other than a gateway or a router, or the second device is an entity other than an entity having a routing and forwarding function, the first device may not send the first information to the second device. That is, in S301, the first device may send the first certificate to the second device, and does not need to send the first information to the second device.

S302. The second device sends a first random number to the first device, and the first device receives the first random number from the second device.

After receiving the first information and the first certificate, the second device may perform verification on the first certificate to determine whether the first certificate is reliable. For example, the second device may perform verification on the first certificate based on the third certificate of the first device. If the verification succeeds, the second device determines that the first certificate is reliable. If the verification fails, the second device determines that the first certificate is unreliable.

If the second device determines that the first certificate is reliable, the second device may generate a random number, for example, the first random number, and the second device may send the first random number to the first device. The first random number may be used for authentication on the first device. In this embodiment, an example in which the second device determines that the first certificate is reliable is used.

If the second device determines that the first certificate is unreliable, the second device may not need to generate the first random number. For example, if the second device determines that the first certificate is unreliable, the second device may further send a notification message to the first device. The notification message is used to indicate that the first certificate is unreliable, or is used to indicate that an authentication process fails, or the like.

Content related to the first certificate may be combined in the embodiment shown in FIG. 3, or may be independently used as an embodiment. For example, an operation of sending the first certificate by the first device to the second device, and content of the first certificate may be independently used as an embodiment. Alternatively, an operation of performing verification on the first certificate by the second device, content of the first certificate, and the like may be independently used as an embodiment.

S303. The first device obtains a first signature based on the first random number by using a first private key.

For S303, refer to S203 in the embodiment shown in FIG. 2.

S304. The first device sends the first signature to the second device, and the second device receives the first signature from the first device. The first signature may be used for authentication on the first device.

S305. The second device performs authentication on the first device based on the first signature and the first random number.

The second device may send an authentication result to the first device, so that the first device can learn of the authentication result. For details of S305, refer to S205 in the embodiment shown in FIG. 2.

The authentication process described in S302 to S306 may also be replaced with another authentication process, or any one or more of S302 to S306 may not be performed. For example, S302 may not be performed, the first device may not need to send a second random number to the second device, and the second device may generate a second signature based on a second identifier without the second random number, provided that the authentication performed by the first device on the second device can be completed.

S306. The second device determines a first execution policy based on the first service. The authentication process described above corresponds to the first service.

S306 is also an optional step, and is not necessarily performed. S306 is performed on a premise that the second device fails to authenticate the first device. In other words, if the second device fails to authenticate the first device in S305, the second device may perform S306. However, if the second device fails to authenticate the first device in S305, the second device may not perform S306. For example, if the second device has authenticated the first device, the second device may continue to perform subsequent step 307, or may not perform subsequent step 307, but may perform another process, for example, may start the first service.

For example, the first execution policy includes: a device stops working, or a device stops using part of functions of the device. For example, for the second device, the first execution policy may include: the second device stops working, or the second device stops using part of functions of the second device. The part of functions herein may be functions related to the first service. For example, if the second device is an MDC, and the first service is a self-driving function, the MDC stops using part of functions of the MDC, for example, stops using a function related to the self-driving function. The first execution policy may be executed by the second device or the first device. If the first execution policy should be executed by the first device, the second device may send indication information to the first device, and the first device receives the indication information from the second device. The indication information is used to indicate the first execution policy. For example, if the second device is a device such as a gateway or a router, or is an entity having a routing and forwarding function, the first execution policy may be executed by the first device, and the second device may send the indication information to the first device. Alternatively, if the second device is a device other than a gateway and a router, or is an entity other than an entity having a routing and forwarding function, the first execution policy may be executed by the second device. In this case, the second device may not send the indication information to the first device, but executes the first execution policy.

In this embodiment of this application, the first information is used to indicate the second device. For example, the first information may be the identifier of the first service, or the address of the second device. As long as the first device sends the first information to the second device, the second device can perform authentication on the first device without depending on a hierarchy relationship between devices. For example, even if the first device is a level-1 device and the second device is a level-3 device, authentication can be performed between the first device and the second device. In this way, a distributed authentication process is implemented. Compared with a centralized authentication mechanism, the authentication manner in the embodiments of this application reduces load of a device because one intermediate node does not need to perform authentication on a plurality of nodes. According to the technical solution in this embodiment of this application, end-to-end authentication between devices is implemented, and dependence on the intermediate node is reduced, so that more vehicle-mounted devices can undergo authentication, and security of the vehicle-mounted devices is improved. In addition, information does not need to be forwarded between the first device and the second device through another device, and instead, the first device and the second device can directly communicate with each other. This reduces a communication delay, and improves authentication efficiency, and end-to-end authentication between devices can be implemented more effectively. The authentication solution provided in this embodiment of this application has particular resilience. In addition, the end-to-end authentication solution provided in this embodiment of this application is unrelated to an architecture of an entire vehicle, has relatively good compatibility, and may be applied to an existing vehicle architecture, and may also be applied to a future vehicle architecture.

Figure 4:
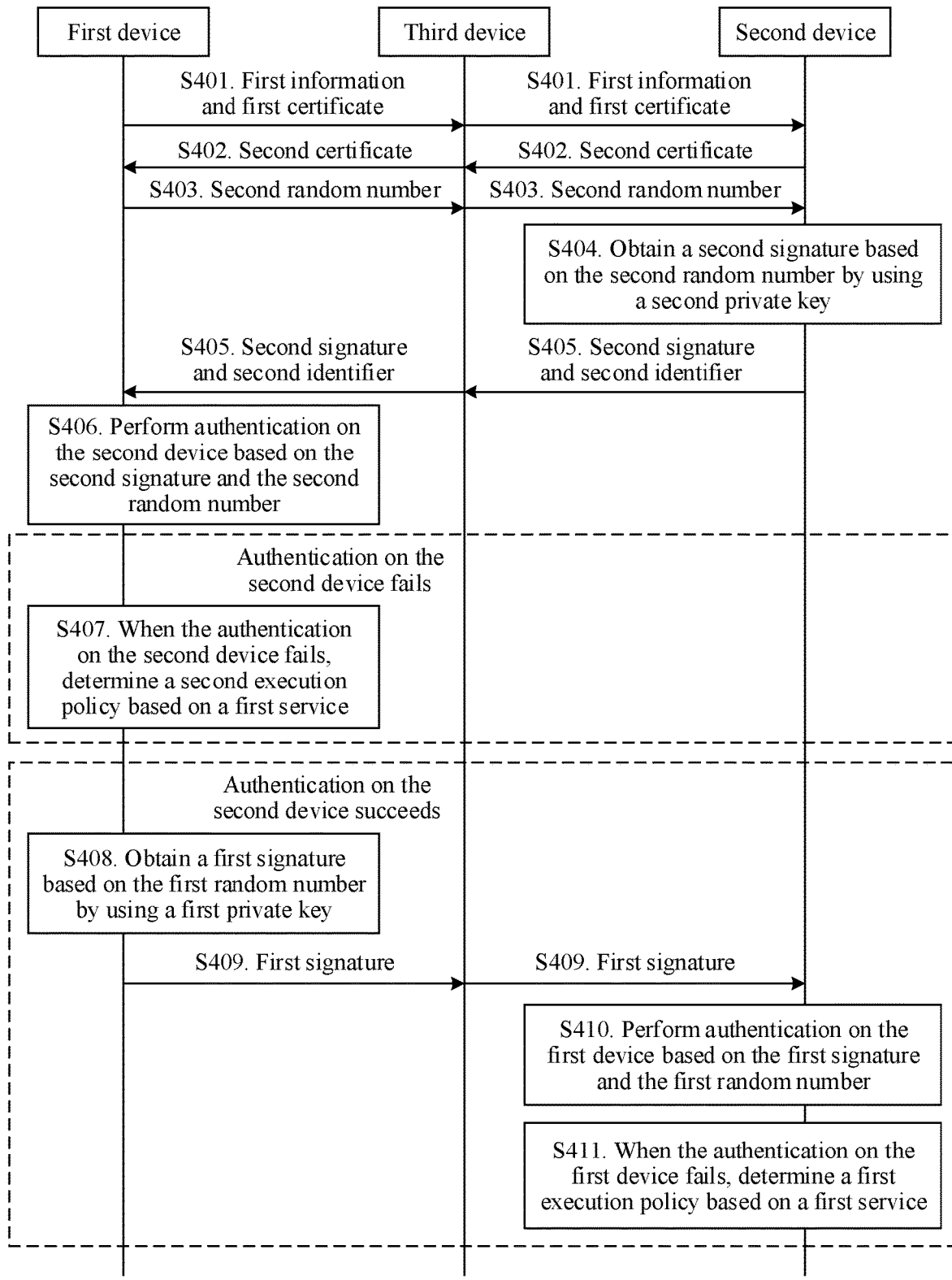
FIG. 4 is a flowchart of a device authentication method according to an embodiment of this application.

A process described in the embodiment shown in FIG. 2 or the embodiment shown in FIG. 3 may be considered as a one-way authentication process, and the second device performs authentication on the first device. However, in some scenarios, to improve security, two-way authentication may be implemented. To be specific, not only the second device performs authentication on the first device, but also the first device performs authentication on the second device. Therefore, an embodiment of this application provides a device authentication method. FIG. 4 is a flowchart of the method. In the following description process, an example in which the method is applied to the network architecture shown in FIG. 1 is used. In addition, the method may be performed by three communications apparatuses (or three types of communications apparatuses). The three communications apparatuses are, for example, a first communications apparatus, a second communications apparatus, and a third communications apparatus. The first communications apparatus, the second communications apparatus, or the third communications apparatus may be a vehicle-mounted apparatus or a communications apparatus (for example, a chip system) that can support a vehicle-mounted apparatus in implementing a function described in the method, or certainly may be another communications apparatus. In addition, implementations of the first communications apparatus, the second communications apparatus, and the third communications apparatus are not limited. For example, the three communications apparatuses may be implemented in a same form, for example, all implemented in a form of a device. Alternatively, the three communications apparatuses may be implemented in different forms. For example, the first communications apparatus is implemented in a form of a device, the second communications apparatus is implemented in a form of a chip system, and the third communications apparatus is implemented in a form of a device.

For ease of description, the following uses an example in which the method is performed by a first device, a second device, and a third device. In other words, an example in which the first communications apparatus is the first device, the second communications apparatus is the second device, and the third communications apparatus is the third device is used. For example, the first device may be a to-be-authenticated device, and the second device may be a device other than a gateway and a router, or an entity other than an entity having a routing and forwarding function. In addition, the gateway may also be an entity apparatus having a function of a routing and forwarding device. For example, this embodiment is applied to the network architecture shown in FIG. 1. Therefore, the first device described below is, for example, the domain controller in the network architecture shown in FIG. 1, the second device described below is, for example, the T-Box or the OBD in the network architecture shown in FIG. 1, and the third device described below is, for example, the gateway in the network architecture shown in FIG. 1. Alternatively, the first device described below is, for example, the T-Box or the OBD in the network architecture shown in FIG. 1, the second device described below is, for example, the domain controller in the network architecture shown in FIG. 1, and the third device described below is, for example, the gateway in the network architecture shown in FIG. 1.

S401. The first device sends first information and a first certificate to the second device, and the second device receives the first information and the first certificate from the first device. The first information is used to indicate the second device, and the first certificate is a device certificate of the first device.

For S401, refer to the description of the step S201 in the embodiment shown in FIG. 2.

In an optional manner, if the second device is a device other than a gateway or a router, or the second device is an entity other than an entity having a routing and forwarding function, the first device may not send the first information to the second device. That is, in S401, the first device may send the first certificate to the second device, and does not need to send the first information to the second device.

S402. The second device sends a second certificate to the first device, and the first device receives the second certificate from the second device. The second certificate is a device certificate of the second device.

After receiving the first information and the first certificate, the second device may perform verification on the first certificate to determine whether the first certificate is reliable. For example, the second device may perform verification on the first certificate based on a third certificate of the first device. If the verification succeeds, the second device determines that the first certificate is reliable. If the verification fails, the second device determines that the first certificate is unreliable. A third certificate of a device may be an OEM root certificate, a level-2 certificate issued by an OEM/CA, a level-3 certificate issued by the OEM/CA, a level-4 certificate, a certificate of a higher level, or the like. A level of the certificate is not limited. For example, the third certificate of the first device may be a root certificate, a level-2 certificate, a level-3 certificate, a level-4 certificate, or a certificate of a higher level.

If the second device determines that the first certificate is reliable, the second device may send the second certificate to the first device. The second device may send the second certificate to the third device, and the third device forwards the second certificate to the first device.

In addition, the second device may further send a second identifier to the first device. The second identifier is an identifier of the second device, for example, an ID of the second device. Similarly, the second device may send the second identifier to the third device, and the third device forwards the second identifier to the first device.

If the second device determines that the first certificate is unreliable, the second device may not need to send the second certificate to the first device. For example, if the second device determines that the first certificate is unreliable, the second device may further send a notification message to the first device. The notification message is used to indicate that the first certificate is unreliable, or is used to indicate that an authentication process fails, or the like.

Content included in the second certificate may be similar to content included in the first certificate. For example, the second certificate may include one or any combination of the following information: version information of the second certificate, signer information of the second certificate, subject information of the second certificate, validity information of the second certificate, or signature information of the second certificate. For example, the second certificate includes the version information of the second certificate; or the second certificate includes the signer information of the second certificate and the subject information of the second certificate; or the second certificate includes the subject information of the second certificate, the validity information of the second certificate, and the signature information of the second certificate; or the second certificate includes the version information of the second certificate, the signer information of the second certificate, the subject information of the second certificate, the validity information of the second certificate, and the signature information of the second certificate. For more descriptions of the second certificate, refer to the descriptions of the first certificate in the embodiment shown in FIG. 2.

Content related to the first certificate may be combined in the embodiment shown in FIG. 4, or may be independently used as an embodiment. For example, an operation of sending the first certificate by the first device to the second device, and content of the first certificate may be independently used as an embodiment. Alternatively, an operation of performing verification on the first certificate by the second device, content of the first certificate, and the like may be independently used as an embodiment.

Likewise, content related to the second certificate may be combined in the embodiment shown in FIG. 4, or may be independently used as an embodiment. For example, an operation of sending the second certificate by the second device to the first device, and content of the second certificate may be independently used as an embodiment. Alternatively, an operation of performing verification on the second certificate by the first device, content of the second certificate, and the like may be independently used as an embodiment.

S403. The first device sends a second random number to the second device, and the second device receives the second random number from the first device.

If the first device determines that the second certificate is reliable, the first device may generate the second random number, and may send the second random number to the second device. The second random number is used for authentication on the second device.

The first device may send the second random number to the third device, and the third device forwards the second random number to the second device.

S404. The second device obtains a second signature based on the second random number by using a second private key.

The second device may obtain the second signature based on only the second random number. Alternatively, in an optional manner, the second device may obtain the second signature based on the second random number and the second identifier. The second identifier is the identifier of the second device, for example, the ID of the second device. The second private key is a private key used by the second device. For example, the second private key belongs to identity information of the second device, and may be written into the second device after the second device is manufactured. Therefore, the second private key does not need to be temporarily written into the second device, and the second device may directly use the second private key, thereby improving device authentication efficiency.

For example, the second device may obtain a hash value, for example, referred to as a second hash value, based on the second random number and the second identifier according to a hash algorithm. The second device may sign the second hash value based on the second private key, to obtain the second signature. For example, the second signature is represented as $sig2=sig_{pk}(r^2, ID\ 2)$, where r2 represents the second random number, and ID 2 represents the second identifier.

S405. The second device sends the second signature and the second identifier to the first device, and the first device receives the second signature and the second identifier from the second device. The second signature is used for authentication on the second device.

The second device may send the second signature and the second identifier to the third device, and the third device forwards the second signature and the second identifier to the first device.

The second device may further send the second identifier to the third device, and the third device forwards the second identifier to the first device.

In addition, the second device may further generate a first random number, and send the first random number to the third device, and the third device forwards the first random number to the first device.

S406. The first device performs authentication on the second device based on the second signature and the second random number. If the authentication succeeds, S408 is to be performed; or if the authentication fails, S407 is to be performed.

If the second device obtains the second signature based on the second random number, the first device may perform authentication on the second device based on the second signature and the second random number. Alternatively, if the second device obtains the second signature based on the second random number and the second identifier, the first device may perform authentication on the second device based on the second signature, the second random number, and the second identifier.

For example, the first device may perform authentication on the second device based on the second random number, the second signature, and the second identifier by using a second public key. The second public key and the second private key that is used to obtain the second signature are a pair of asymmetric keys. For example, the first device may perform signature verification on the second signature, the second random number, and the second identifier by using the second public key, and determine, based on a returned result, whether the signature verification succeeds. If the signature verification succeeds, it indicates that the authentication on the second device succeeds; or if the signature verification fails, it indicates that the authentication on the second device fails. A signature verification manner is, for example, that the first device obtains a hash value, for example, referred to as a third hash value, based on the second random number and the second identifier according to a hash algorithm. The first device inputs the second public key, the third hash value, and the second signature into a signature verification function (for example, referred to as a second function) to perform signature verification, and determines, based on a returned result, whether the signature verification succeeds.

A first function and the second function that are used for signature verification may be a same function, or may be different functions.

The first device may send an authentication result to the second device through the third device, so that the second device can learn of the authentication result.

S407. The first device determines a second execution policy based on a first service. The authentication process described above corresponds to the first service.

S407 is also an optional step, and is not necessarily performed. S407 is performed on a premise that the first device fails to authenticate the second device. In other words, if the first device fails to authenticate the second device in S406, the first device may perform S407. However, if the first device fails to authenticate the second device in S406, the first device may not perform S407 but perform S408.

For example, the second execution policy includes: a device stops working, or a device stops using part of functions of the device. For example, for the first device, the second execution policy may include: the first device stops working, or the first device stops using part of functions of the first device. The part of functions herein may be functions related to the first service. For example, if the first device is an MDC, and the first service is a self-driving function, the MDC stops using part of functions of the MDC, for example, stops using a function related to the self-driving function. For example, the MDC may not start the self-driving function, or the MDC may stop using the self-driving function.

The second execution policy may be executed by the first device or the second device. If the second execution policy should be executed by the second device, the first device may send indication information to the second device, and the second device receives the indication information from the first device. The indication information is used to indicate the second execution policy. For example, if the second device is a device such as a gateway or a router, or is an entity having a routing and forwarding function, the second execution policy may be executed by the first device, and the first device may not need to send the indication information to the second device, but execute the second execution policy. Alternatively, if the second device is a device other than a gateway and a router, or is an entity other than an entity having a routing and forwarding function, the second execution policy may be executed by the second device. In this case, the first device may send the indication information to the second device.

S408. The first device obtains a first signature based on the first random number by using a first private key.

If the first device has authenticated the second device, the first device may obtain the first signature. The first signature is used to for authentication on the first device.

The first private key is a private key used by the first device. For example, the first private key belongs to identity information of the first device, and may be written into the first device after the first device is manufactured. Therefore, the first private key does not need to be temporarily written into the first device, and the first device may directly use the first private key, thereby improving device authentication efficiency.

In an optional manner, the first device may obtain the first signature based on the first random number and the first identifier. For example, the first device may obtain a hash value, for example, referred to as a first hash value, based on the first random number and the first identifier according to a hash algorithm. The first device may sign the first hash value based on the first private key, to obtain the first signature. For example, the first signature is represented as $sig1=sig_{pk}(r1, ID\ 1)$, where r1 represents the first random number, and ID 1 represents the first identifier.

S409. The first device sends the first signature to the second device, and the second device receives the first signature from the first device.

The first device may send the first signature to the third device, and the third device forwards the first signature to the second device.

S410. The second device performs authentication on the first device based on the first signature and the first random number.

If the first device obtains the first signature based on the first random number, the second device may perform authentication on the first device based on the first signature and the first random number. Alternatively, if the first device obtains the first signature based on the first random number and the first identifier, the second device may perform authentication on the first device based on the first signature, the first random number, and the first identifier. For an authentication process, refer to S205 in the embodiment shown in FIG. 2.

The second device may send an authentication result to the first device through the third device, so that the first device can learn of the authentication result.

The authentication process described in S402 to S410 may also be replaced with another authentication process, or any one or more of S402 to S410 may not be performed. For example, S403 may not be performed, the first device may not need to send the second random number to the second device, and the second device may generate the second signature based on the second identifier without the second random number, provided that the first device can complete authentication on the second device. Likewise, in a process in which the second device performs authentication on the first device, some steps may not need to be performed, provided that the second device can complete authentication on the first device.

S411. The second device determines a first execution policy based on the first service. The authentication process described above corresponds to the first service.

S411 is also an optional step, and is not necessarily performed. S411 is performed on a premise that the second device fails to authenticate the first device. In other words, if the second device fails to authenticate the first device in S410, the second device may perform S411. However, if the second device fails to authenticate the first device in S410, the second device may not perform S411. For example, if the second device has authenticated the first device, the second device may continue to perform another process, for example, may start the first service.

For example, the first execution policy includes: a device stops working, or a device stops using part of functions of the device. For example, for the second device, the first execution policy may include: the second device stops working, or the second device stops using part of functions of the second device. The part of functions herein may be functions related to the first service. For example, if the second device is an MDC, and the first service is a self-driving function, the MDC stops using part of functions of the MDC, for example, stops using a function related to the self-driving function.

The first execution policy may be executed by the second device or the first device. If the first execution policy should be executed by the first device, the second device may send indication information to the first device, and the first device receives the indication information from the second device. The indication information is used to indicate the first execution policy. For example, if the second device is a device such as a gateway or a router, or is an entity having a routing and forwarding function, the first execution policy may be executed by the first device, and the second device may send the indication information to the first device. Alternatively, if the second device is a device other than a gateway and a router, or is an entity other than an entity having a routing and forwarding function, the first execution policy may be executed by the second device. In this case, the second device may not send the indication information to the first device, but executes the first execution policy.

For descriptions of the steps in the embodiment shown in FIG. 4, refer to the descriptions of the related steps in the embodiment shown in FIG. 2.

In this embodiment of this application, the first information is used to indicate the second device. For example, the first information may be an identifier of the first service, or an address of the second device. As long as the first device sends the first information to the second device, the second device can perform authentication on the first device without depending on a hierarchy relationship between devices. For example, even if the first device is a level-1 device and the second device is a level-3 device, authentication can be performed between the first device and the second device. In this way, a distributed authentication process is implemented. Compared with a centralized authentication mechanism, the authentication manner in the embodiments of this application reduces load of a device because one intermediate node does not need to perform authentication on a plurality of nodes. According to the technical solution in this embodiment of this application, end-to-end authentication between devices is implemented, and dependence on the intermediate node is reduced, so that more vehicle-mounted devices can undergo authentication, and security of the vehicle-mounted devices is improved. In addition, the third device may perform only a forwarding function, or the third device may search for and determine the second device, and the first device does not need to determine the second device, thereby reducing a workload of the first device. Alternatively, the third device may further perform a filtering function, thereby further improving communication security. The authentication solution provided in this embodiment of this application has particular resilience. In addition, the end-to-end authentication solution provided in this embodiment of this application is unrelated to an architecture of an entire vehicle, has relatively good compatibility, and may be applied to an existing vehicle architecture, and may also be applied to a future vehicle architecture.

In addition, two-way authentication can be implemented between two devices to further improve reliability of a communication process.

Figure 5:
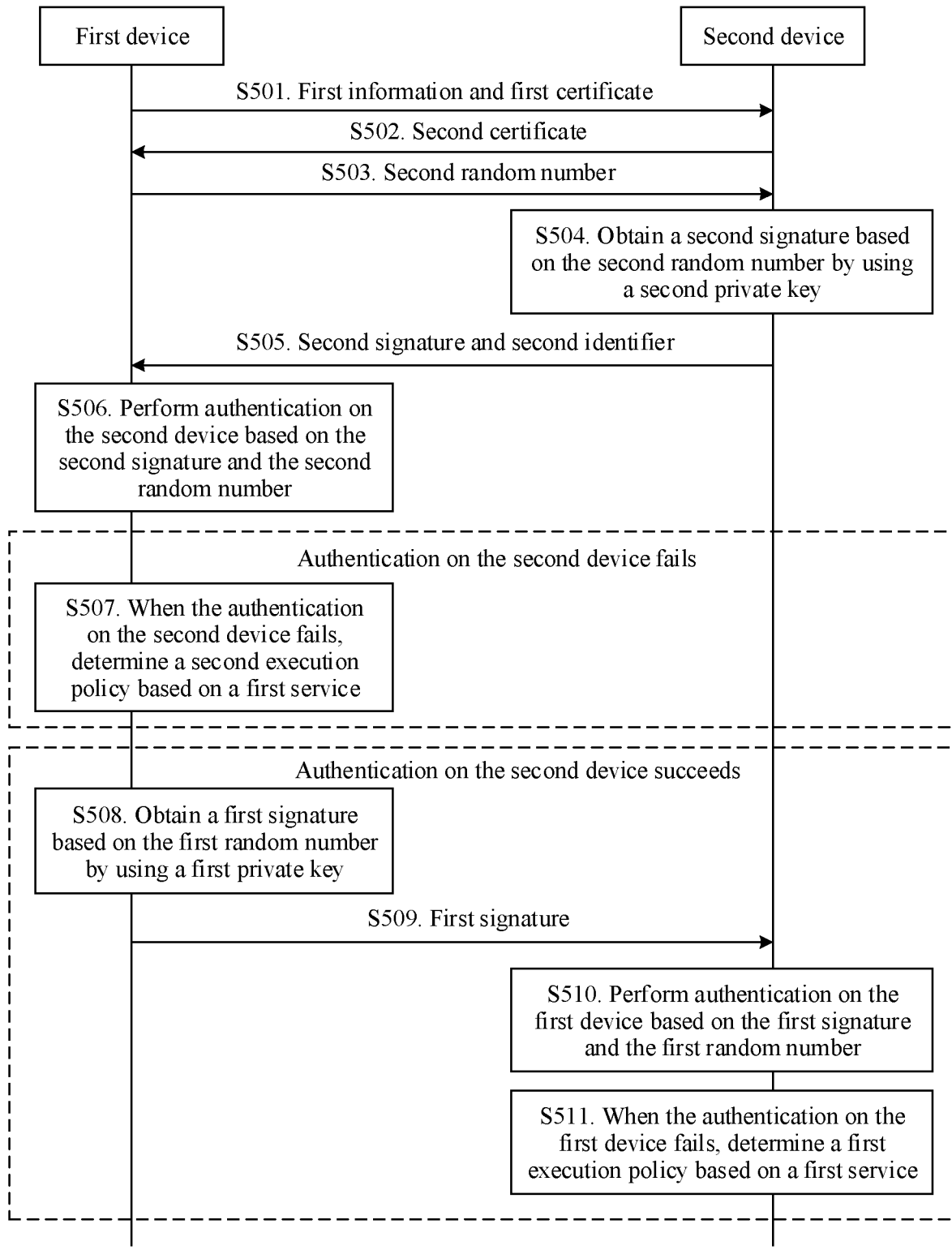
FIG. 5 is a flowchart of a device authentication method according to an embodiment of this application.

In the two-way authentication method described in the embodiment shown in FIG. 4, information needs to be forwarded between the first device and the second device through the third device. The following further describes a device authentication method. In this method, the first device and the second device still perform two-way authentication, but the first device and the second device may directly communicate with each other, and do not need to forward information through another device. FIG. 5 is a flowchart of the method. In the following description process, an example in which the method is applied to the network architecture shown in FIG. 1 is used. In addition, the method may be performed by two communications apparatuses (or two types of communications apparatuses). The two communications apparatuses are, for example, a first communications apparatus and a second communications apparatus. The first communications apparatus or the second communications apparatus may be a vehicle-mounted apparatus or a communications apparatus (for example, a chip system) that can support a vehicle-mounted apparatus in implementing a function described in the method, or certainly may be another communications apparatus. In addition, implementations of the first communications apparatus and the second communications apparatus are not limited. For example, the two communications apparatuses may be implemented in a same form. For example, the two communications apparatuses are implemented in a form of a device. Alternatively, the two communications apparatuses may be implemented in different forms. For example, the first communications apparatus is implemented in a form of a device, and the second communications apparatus is implemented in a form of a chip system.

For ease of description, the following uses an example in which the method is performed by a first device and a second device. In other words, an example in which the first communications apparatus is the first device and the second communications apparatus is the second device is used. For example, the first device may be a to-be-authenticated device, the second device may be a device other than a gateway and a router, or an entity other than an entity having a routing and forwarding function, or the second device may be a device such as a gateway or a router, or the second device may be an entity having a routing and forwarding function. In addition, the gateway may also be an entity apparatus having a function of a routing and forwarding device. If the second device is a device such as a gateway or a router, or an entity having a routing and forwarding function, it may be considered that the embodiment shown in FIG. 5 is in a scenario in which the gateway performs centralized authentication. For example, the gateway may perform authentication on each domain controller. Alternatively, it may be considered that the embodiment shown in FIG. 5 is still in a distributed authentication scenario. For example, the gateway may perform authentication on each domain controller, or domain controllers may perform authentication on each other. However, if the second device is a device other than the gateway and the router, it may be considered that the embodiment shown in FIG. 5 is in a distributed authentication scenario in which the gateway does not need to perform centralized authentication. In this embodiment, the network architecture shown in FIG. 1 is used as an example. Therefore, the first device described below is, for example, the domain controller in the network architecture shown in FIG. 1, and the second device described below is, for example, the T-Box, the OBD, or the gateway in the network architecture shown in FIG. 1.

S501. The first device sends first information and a first certificate to the second device, and the second device receives the first information and the first certificate from the first device. The first information is used to indicate the second device, and the first certificate is a device certificate of the first device.

For S501, refer to the description of the step S401 in the embodiment shown in FIG. 4.

In an optional manner, if the second device is a device other than a gateway or a router, or the second device is an entity other than an entity having a routing and forwarding function, the first device may not send the first information to the second device. That is, in S501, the first device may send the first certificate to the second device, and does not need to send the first information to the second device.

S502. The second device sends a second certificate to the first device, and the first device receives the second certificate from the second device. The second certificate is a device certificate of the second device.

After receiving the first information and the first certificate, the second device may perform verification on the first certificate to determine whether the first certificate is reliable. For example, the second device may perform verification on the first certificate based on a third certificate of the first device. If the verification succeeds, the second device determines that the first certificate is reliable. If the verification fails, the second device determines that the first certificate is unreliable. A third certificate of a device may be an OEM root certificate, a level-2 certificate issued by an OEM/CA, a level-3 certificate issued by the OEM/CA, a level-4 certificate, a certificate of a higher level, or the like. A level of the certificate is not limited. For example, the third certificate of the first device may be a root certificate, a level-2 certificate, a level-3 certificate, a level-4 certificate, or a certificate of a higher level.

If the second device determines that the first certificate is reliable, the second device may send the second certificate to the first device.

In addition, the second device may further send a second identifier to the first device. The second identifier is an identifier of the second device, for example, an ID of the second device.

If the second device determines that the first certificate is unreliable, the second device may not need to send the second certificate to the first device. For example, if the second device determines that the first certificate is unreliable, the second device may further send a notification message to the first device. The notification message is used to indicate that the first certificate is unreliable, or is used to indicate that an authentication process fails, or the like.

Content related to the first certificate may be combined in the embodiment shown in FIG. 5, or may be independently used as an embodiment. For example, an operation of sending the first certificate by the first device to the second device, and content of the first certificate may be independently used as an embodiment. Alternatively, an operation of performing verification on the first certificate by the second device, content of the first certificate, and the like may be independently used as an embodiment.

Likewise, content related to the second certificate may be combined in the embodiment shown in FIG. 5, or may be independently used as an embodiment. For example, an operation of sending the second certificate by the second device to the first device, and content of the second certificate may be independently used as an embodiment. Alternatively, an operation of performing verification on the second certificate by the first device, content of the second certificate, and the like may be independently used as an embodiment.

S503. The first device sends a second random number to the second device, and the second device receives the second random number from the first device.

If the first device determines that the second certificate is reliable, the first device may generate the second random number, and may send the second random number to the second device. The second random number is used for authentication on the second device.

S504. The second device obtains a second signature based on the second random number by using a second private key.

The second device may obtain the second signature based on only the second random number. Alternatively, in an optional manner, the second device may obtain the second signature based on the second random number and the second identifier. The second identifier is the identifier of the second device, for example, the ID of the second device. The second private key is a private key used by the second device. For example, the second private key belongs to identity information of the second device, and may be written into the second device after the second device is manufactured. Therefore, the second private key does not need to be temporarily written into the second device, and the second device may directly use the second private key, thereby improving device authentication efficiency.

For example, the second device may obtain a hash value, for example, referred to as a second hash value, based on the second random number and the second identifier according to a hash algorithm. The second device may sign the second hash value based on the second private key, to obtain the second signature. For example, the second signature is represented as sig2=$sig_{pk}(r^2, ID\ 2)$, where r2 represents the second random number, and ID 2 represents the second identifier.

S505. The second device sends the second signature and the second identifier to the first device, and the first device receives the second signature and the second identifier from the second device. The second signature is used for authentication on the second device.

In addition, the second device may further send the second identifier to the first device.

In addition, the second device may further generate a first random number, and send the first random number to the first device.

S506. The first device performs authentication on the second device based on the second signature and the second random number. If the authentication succeeds, S508 is to be performed; or if the authentication fails, S507 is to be performed.

If the second device obtains the second signature based on the second random number, the first device may perform authentication on the second device based on the second signature and the second random number. Alternatively, if the second device obtains the second signature based on the second random number and the second identifier, the first device may perform authentication on the second device based on the second signature, the second random number, and the second identifier.

For a process in which the first device performs authentication on the second device, refer to S406 in the embodiment shown in FIG. 4.

The first device may send an authentication result to the second device, so that the second device can learn of the authentication result.

S507. The first device determines a second execution policy based on a first service. The authentication process described above corresponds to the first service.

S507 is also an optional step, and is not necessarily performed. S507 is performed on a premise that the second device fails to authenticate the first device. In other words, if the first device fails to authenticate the second device in S506, the first device may perform S507. However, if the first device fails to authenticate the second device in S506, the first device may not perform S507 but perform S508.

For example, the second execution policy includes: a device stops working, or a device stops using part of functions of the device. For example, for the first device, the second execution policy may include: the first device stops working, or the first device stops using part of functions of the first device. The part of functions herein may be functions related to the first service. For example, if the first device is an MDC, and the first service is a self-driving function, the MDC stops using part of functions of the MDC, for example, stops using a function related to the self-driving function. For example, the MDC may not start the self-driving function, or the MDC may stop using the self-driving function.

The second execution policy may be executed by the second device or the first device. If the second execution policy should be executed by the second device, the first device may send indication information to the second device, and the second device receives the indication information from the first device. The indication information is used to indicate the second execution policy. For example, if the second device is a device such as a gateway or a router, or is an entity having a routing and forwarding function, the second execution policy may be executed by the first device, and the first device may not need to send the indication information to the second device, but execute the second execution policy. Alternatively, if the second device is a device other than a gateway and a router, or is an entity other than an entity having a routing and forwarding function, the second execution policy may be executed by the second device. In this case, the first device may send the indication information to the second device.

S508. The first device obtains a first signature based on the first random number by using a first private key.

If the first device has authenticated the second device, the first device may obtain the first signature. The first signature is used to for authentication on the first device.

The first private key is a private key used by the first device. For example, the first private key belongs to identity information of the first device, and may be written into the first device after the first device is manufactured. Therefore, the first private key does not need to be temporarily written into the first device, and the first device may directly use the first private key, thereby improving device authentication efficiency.

In an optional manner, the first device may obtain the first signature based on the first random number and the first identifier. For example, the first device may obtain a hash value, for example, referred to as a first hash value, based on the first random number and the first identifier according to a hash algorithm. The first device may sign the first hash value based on the first private key, to obtain the first signature. For example, the first signature is represented as $sig1=sig_{pk}(r1, ID\ 1)$, where r1 represents the first random number, and ID 1 represents the first identifier.

S509. The first device sends the first signature to the second device, and the second device receives the first signature from the first device.

S510. The second device performs authentication on the first device based on the first signature and the first random number.

If the first device obtains the first signature based on the first random number, the second device may perform signature verification on the first device based on a public key of the first device, the first signature, and the first random number. Alternatively, if the first device obtains the first signature based on the first random number and the first identifier, the second device may perform signature verification on the first device based on the first signature, the first random number, and the first identifier. For an authentication process, refer to S205 in the embodiment shown in FIG. 2.

The second device may send an authentication result to the first device through the third device, so that the first device can learn of the authentication result.

The authentication process described in S502 to S510 may also be replaced with another authentication process, or any one or more of S502 to S510 may not be performed. For example, S503 may not be performed, the first device may not need to send the second random number to the second device, and the second device may generate the second signature based on the second identifier without the second random number, provided that the first device can complete authentication on the second device. Likewise, in a process in which the first device performs authentication on the second device, some steps may not need to be performed, provided that the second device can complete authentication on the first device.

S511. The second device determines a first execution policy based on the first service. The authentication process described above corresponds to the first service.

S511 is also an optional step, and is not necessarily performed. S511 is performed on a premise that the second device fails to authenticate the first device. In other words, if the second device fails to authenticate the first device in S510, the second device may perform S511. However, if the second device fails to authenticate the first device in S510, the second device may not perform S511. For example, if the second device has authenticated the first device, the second device may continue to perform another process, for example, may start the first service.

For example, the first execution policy includes: a device stops working, or a device stops using part of functions of the device. For example, for the second device, the first execution policy may include: the second device stops working, or the second device stops using part of functions of the second device. The part of functions herein may be functions related to the first service. For example, if the second device is a T-Box, and the first service is a self-driving function, the T-Box stops using part of functions of the T-Box, for example, stops using a function related to the self-driving function.

The first execution policy may be executed by the second device or the first device. If the first execution policy should be executed by the first device, the second device may send indication information to the first device, and the first device receives the indication information from the second device. The indication information is used to indicate the first execution policy. For example, if the second device is a device such as a gateway or a router, or is an entity having a routing and forwarding function, the first execution policy may be executed by the first device, and the second device may send the indication information to the first device. Alternatively, if the second device is a device other than a gateway and a router, or is an entity other than an entity having a routing and forwarding function, the first execution policy may be executed by the second device. In this case, the second device may not send the indication information to the first device, but executes the first execution policy.

For descriptions of the steps in the embodiment shown in FIG. 5, refer to the descriptions of the related steps in the embodiment shown in FIG. 2, the embodiment shown in FIG. 3, or the embodiment shown in FIG. 4.

In this embodiment of this application, the first information is used to indicate the second device. For example, the first information may be an identifier of the first service, or an address of the second device. As long as the first device sends the first information to the second device, the second device can perform authentication on the first device without depending on a hierarchy relationship between devices. For example, even if the first device is a level-1 device and the second device is a level-3 device, authentication can be performed between the first device and the second device. In this way, a distributed authentication process is implemented. Compared with a centralized authentication mechanism, the authentication manner in the embodiments of this application reduces load of a device because one intermediate node does not need to perform authentication on a plurality of nodes. According to the technical solution in this embodiment of this application, end-to-end authentication between devices is implemented, and dependence on the intermediate node is reduced, so that more vehicle-mounted devices can undergo authentication, and security of the vehicle-mounted devices is improved. In addition, information does not need to be forwarded between the first device and the second device through another device, and instead, the first device and the second device can directly communicate with each other. This reduces a communication delay, and improves authentication efficiency, and end-to-end authentication between devices can be implemented more effectively. The authentication solution provided in this embodiment of this application has particular resilience. In addition, the end-to-end authentication solution provided in this embodiment of this application is unrelated to an architecture of an entire vehicle, has relatively good compatibility, and may be applied to an existing vehicle architecture, and may also be applied to a future vehicle architecture.

In addition, two-way authentication can be implemented between two devices to further improve reliability of a communication process.

For ease of understanding, the following uses a specific service as an example to describe any one of the embodiments shown in FIG. 2 to FIG. 5.

Figure 6:
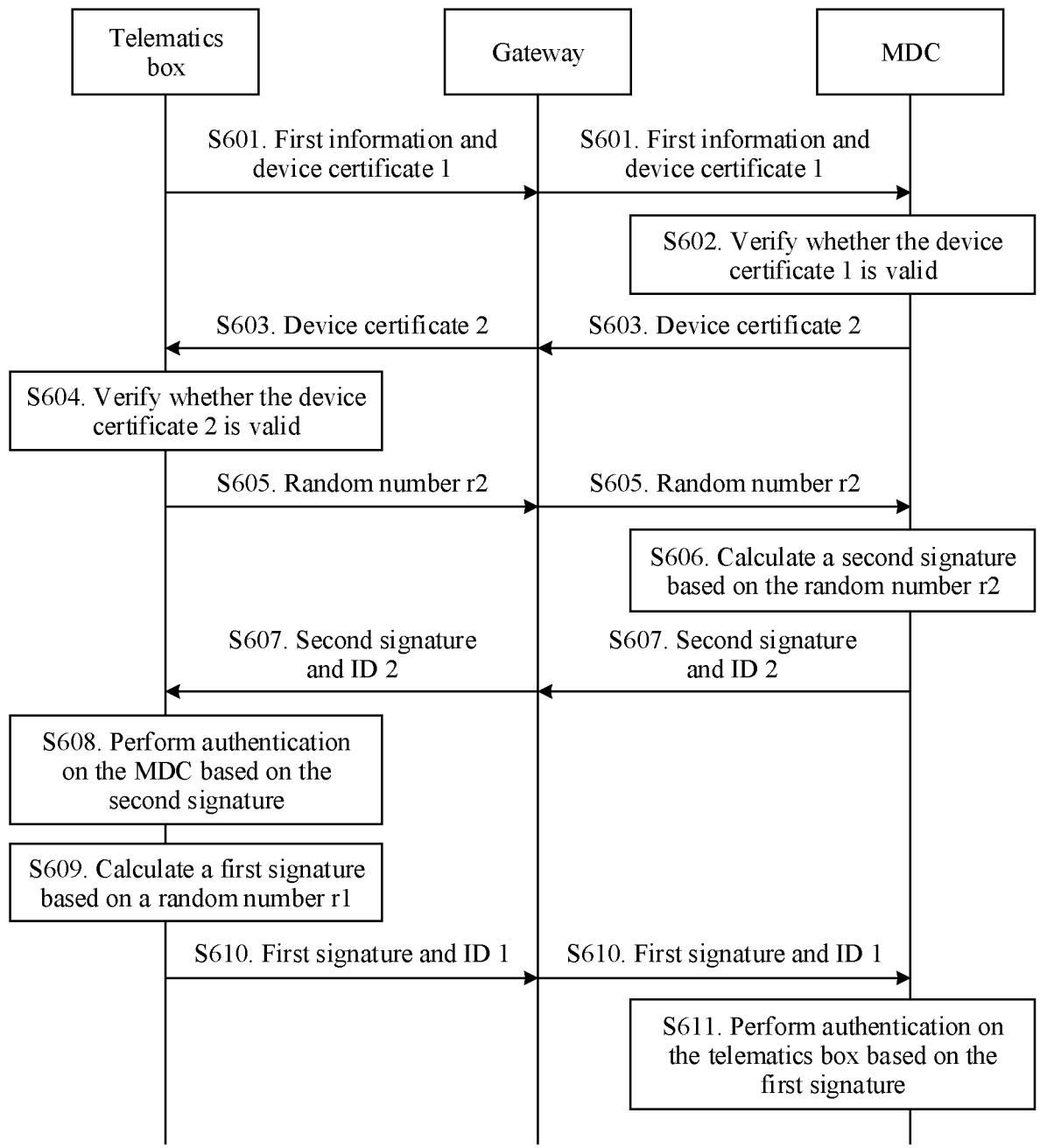
FIG. 6 is a flowchart of a method for performing two-way authentication by an MDC and a T-Box according to an embodiment of this application.

For example, an MDC communicates with a T-Box through a gateway. For example, transmission is performed between the MDC and the T-Box through the Ethernet or a controller local area network with a flexible data rate (controller area network with flexible data-rate). When the MDC transmits confidential information such as geographical location information to an intelligent computing platform through the T-Box, to ensure secure message transmission and timely transmission, a secure transmission channel may be established between the MDC and the T-Box, to perform end-to-end secure transmission. Information transmitted through the secure transmission channel can be transparently transmitted on the gateway without encryption and decryption, and this improves a transmission speed. To establish the end-to-end secure transmission channel, end-to-end authentication needs to be performed, that is, authentication needs to be performed between the MDC and the T-Box. FIG. 6 is a flowchart of an authentication process between the MDC and the T-Box. In the embodiment shown in FIG. 6, an example in which two-way authentication is performed between the MDC and the T-Box is used. For example, the T-Box may be considered as a first device, and the MDC may be considered as a second device. Information may be forwarded between the MDC and the T-Box through the gateway, and the gateway may be considered as a third device.

S601. The T-Box sends a device certificate 1 and first information to the MDC, and the MDC receives the device certificate 1 and the first information from the T-Box.

The T-Box sends the device certificate 1 and the first information to the gateway, and the gateway forwards the device certificate 1 and the first information to the MDC. The device certificate 1 is a device certificate of the T-Box.

For example, the first information includes an IP address of the MDC, and the gateway may forward the device certificate 1 and the first information to the MDC based on the IP address. During forwarding, the gateway may determine, according to a filtering rule, whether forwarding is executed. If a forwarding rule is violated, the gateway discards the first information and the device certificate 1, and does not forward the first information or the device certificate 1.

Alternatively, the first information includes an ID of a first service. After receiving the ID of the first service, the gateway may search a correspondence between an ID of a service and a device, to determine devices corresponding to the ID of the first service. For example, the devices corresponding to the ID of the first service include the MDC, and the gateway forwards the device certificate 1 and the first information to the MDC.

In addition, the T-Box may further send an ID 1 to the MDC, and similarly, the T-Box may forward the ID 1 to the MDC through the gateway. The ID 1 is an ID of the T-Box.

S602. The MDC verifies whether the device certificate 1 is valid.

For example, the MDC may perform verification on the device certificate 1 based on a root certificate or a level-2 certificate of the T-Box. In addition, the MDC may further perform verification on validity of the ID 1.

If it is determined, through verification, that the device certificate 1 is valid, and that the ID 1 is valid, S603 may be further performed; or otherwise, the procedure ends.

S603. The MDC sends a device certificate 2 to the T-Box, and the T-Box receives the device certificate 2 from the MDC. The device certificate 2 is a device certificate of the MDC.

The MDC sends the device certificate 2 to the gateway, and the gateway forwards the device certificate 2 to the T-Box. In addition, the MDC may further send an ID 2 to the T-Box. Similarly, the MDC may send the ID 2 to the gateway, and the gateway forwards the ID 2 to the T-Box. The ID 2 is an ID of the MDC.

S604. The T-Box verifies whether the device certificate 2 is valid.

For example, the T-Box may perform verification on the device certificate 2 based on a root certificate or a level-2 certificate of the MDC. In addition, the T-Box may further perform verification on validity of the ID 2.

If it is determined, through verification, that the device certificate 2 is valid, and that the ID 2 is valid, S605 may be further performed; or otherwise, the procedure ends.

S605. The T-Box sends a random number r2 to the MDC, and the MDC receives the random number r2 from the T-Box. The random number r2 may be a second random number.

The T-Box sends the random number r2 to the gateway, and the gateway forwards the random number r2 to the MDC.

S606. The MDC calculates a second signature based on the random number r2.

In an optional manner, the MDC may calculate the second signature based on the random number r2 and the ID 2, where the ID 2 represents the ID of the MDC.

For example, the second signature is represented as sig2=sig(h2), and h2=hash(ID 2, r2), where hash( ) represents a hash algorithm. For example, the MDC may obtain a hash value, for example, referred to as a second hash value, based on the random number r2 and the ID 2 according to the hash algorithm. The second device may sign the second hash value based on a second private key, to obtain the second signature sig2.

S607. The MDC sends the ID 2 and the sig2 to the T-Box, and the T-Box receives the ID 2 and the sig2 from the MDC.

For example, the MDC may send the ID 2 and the sig2 to the gateway, and the gateway forwards the ID 2 and the sig2 to the T-Box. In addition, the MDC may further generate a random number r1, and send the random number r1 to the gateway, the gateway forwards the random number r1 to the T-Box, and r1 may be a first random number.

S608. The T-Box performs signature verification on the MDC based on the sig2.

The T-Box may perform verification on the sig2 based on the ID 2, the random number r2, and a public key in the device certificate of the MDC. If the verification succeeds, the T-Box considers that the MDC is trusted, and may perform S609. If the verification fails, the T-Box may not perform S609.

S609. The T-Box calculates a first signature based on the random number r1.

In an optional manner, the T-Box may calculate the first signature based on the random number r1 and the ID 1, and the ID 1 represents the ID of the T-Box. For example, the first signature is represented as sig1, sig1=sig(h1), and h1=hash(ID 1, r1).

S610. The T-Box sends the ID 1 and the sig1 to the MDC, and the MDC receives the ID 1 and the sig1 from the T-Box.

The T-Box may send the ID 1 and the sig1 to the gateway, and the gateway forwards the ID 1 and the sig1 to the MDC.

S611. The MDC performs signature verification on the T-Box based on the sig1.

The MDC may perform verification on the sig1 based on the random number r1 and the ID 1. If the MDC has verified the sig1, the MDC considers that the T-Box is trusted. If the MDC has verified the sig1, and the T-Box has also verified the sig2, the secure transmission channel may be established between the MDC and the T-Box. If the MDC fails to verify the sig1, or the T-Box fails to verify the sig2, or the MDC fails to verify the sig1, and the T-Box fails to verify the sig2, the secure transmission channel may not be established between the MDC and the T-Box.

The embodiment shown in FIG. 6 describes the authentication process between the MDC and the T-Box. This embodiment may be considered as an example of the embodiment shown in FIG. 4. The following describes any one of the embodiments shown in FIG. 2 to FIG. 5 by using another authentication process as an example.

For example, the first service is a self-driving function. To enable the self-driving function, the following three authentication processes need to be completed:

1. One-way authentication performed by a VCU on an MDC: After the MDC is started, the MDC may request the VCU to perform authentication on the MDC. If the VCU fails to authenticate the MDC, the VCU may send an authentication failure message to an HMI.

2. Two-way authentication between the HMI and the MDC: After the HMI is started, the HMI may send device information (such as an ID of the HMI) and a certificate of the HMI to the MDC. If the HMI receives no feedback information from the MDC after sending the device information and the certificate of the HMI to the MDC, the HMI periodically sends the device information and the certificate of the HMI to the MDC. A sending period is related to a transmission protocol. For example, if a CAN-FD or CAN protocol is used, the sending period may be an integer multiple of a packet period. If transmission is performed on the Ethernet, the sending period may be more flexible and may be user-defined. Alternatively, after the MDC is started, the MDC may send device information (such as an ID of the MDC) and a certificate of the MDC to the HMI. If the MDC receives no feedback information from the HMI after sending the device information and the certificate of the MDC to the HMI, the MDC periodically sends the device information and the certificate of the MDC to the HMI. A sending period is related to a transmission protocol. For example, if a CAN-FD or CAN protocol is used, the sending period may be an integer multiple of a packet period. If transmission is performed on the Ethernet, the sending period may be more flexible and may be user-defined.

3. One-way authentication performed by the MDC on a sensor: The sensor and the MDC belong to a same domain. After receiving an identifier of the self-driving function (that is, the identifier of the first service), the MDC may perform one-way authentication on the sensor such as a vehicle-mounted millimeter-wave radar or a navigation device.

Certainly, in addition to the foregoing three authentication processes, enabling of the self-driving function may further include another authentication process. For example, in different system architectures, different authentication processes may be included. For example, in some system architectures, the self-driving function may further relate to authentication between the MDC and the T-Box. The foregoing three authentication processes are used as examples.

To reduce a time for waiting for enabling a button for enabling the self-driving function by a user, the first authentication process (the one-way authentication performed by the VCU on the MDC) may be performed before the identifier of the self-driving function is received, or it may be understood that the first authentication process has been performed before the self-driving function is enabled. The second authentication process (the two-way authentication between the HMI and the MDC) may be performed when the identifier of the self-driving function is received. It may be understood that the second authentication process may be performed after the self-driving function is triggered. For example, tapping, by the user, the button for enabling the self-driving function, or performing, by the user, an operation for enabling the self-driving function on a human-machine interaction interface may be a manner of triggering the self-driving function. For example, if the authentication in the first authentication process succeeds, the second authentication process may be performed. If the authentication in the first authentication process fails, the second authentication process does not need to be performed. For example, if the authentication in the first authentication process fails, the self-driving function cannot be enabled, and the second authentication process does not need to be performed. After the second authentication process succeeds, that is, after the HMI has authenticated the MDC and the MDC has authenticated the HMI, the third authentication process (the one-way authentication performed by the MDC on the sensor) can be performed. However, if the authentication in the second authentication process fails, the third authentication process does not need to be performed. For example, if the authentication in the second authentication process fails, the self-driving function cannot be enabled, and the third authentication process does not need to be performed. If the authentication in the third authentication process succeeds, the self-driving function can be used normally. However, if the authentication in the third authentication process fails, the self-driving function cannot be enabled. To ensure personal safety, for the foregoing three authentication processes, a policy that may be used when authentication in any one of the authentication processes fails is that the self-driving function is not enabled. The following separately describes the foregoing three authentication processes by using several embodiments.

Figure 7:
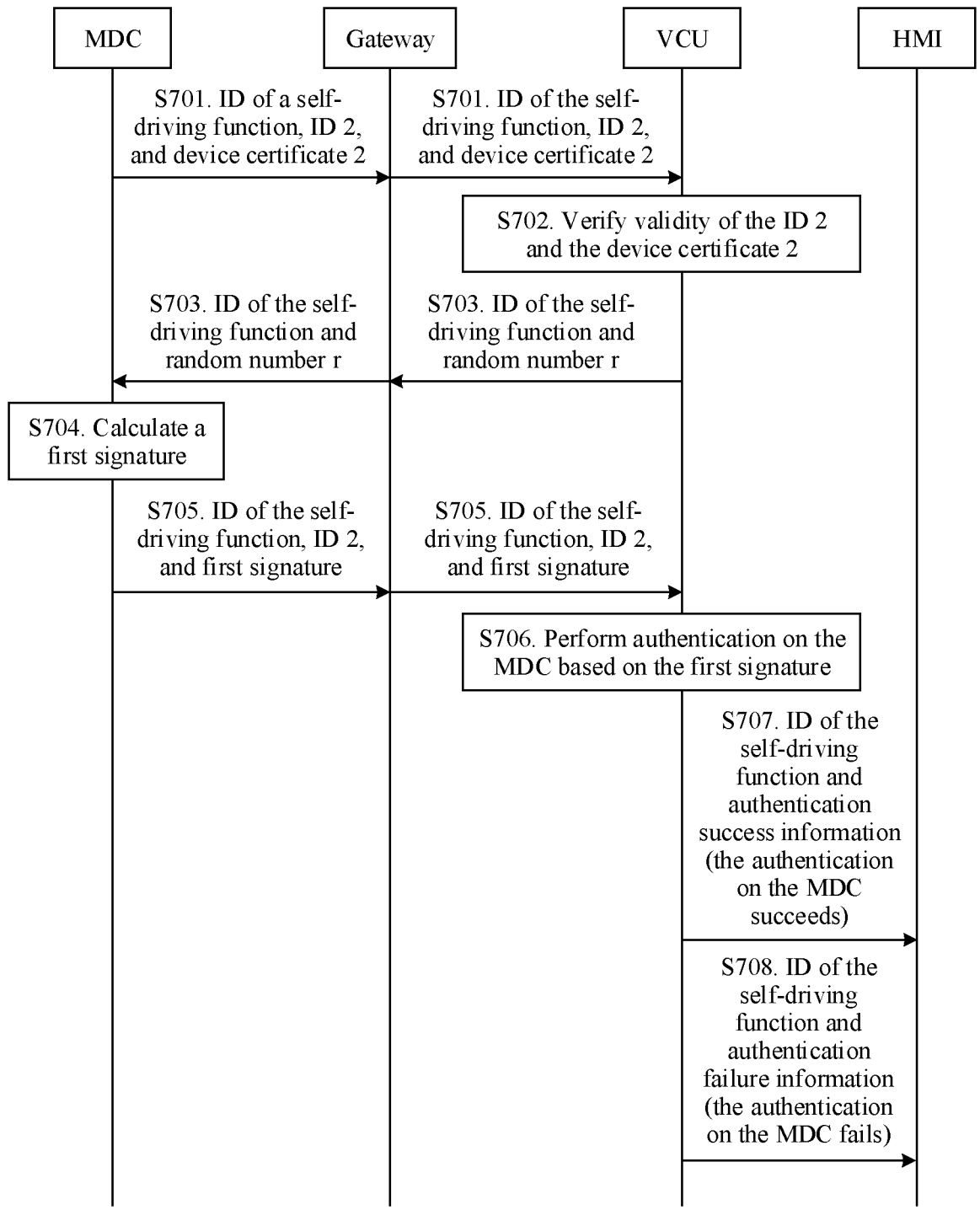
FIG. 7 is a flowchart of a method for performing authentication on an MDC by a VCU according to an embodiment of this application.

FIG. 7 is a flowchart of the first authentication process. In the embodiment shown in FIG. 7, an MDC may be considered as a first device, and a VCU may be considered as a second device. The embodiment shown in FIG. 7 may be considered as an example of the embodiment shown in FIG. 2, or may be considered as an example of the embodiment shown in FIG. 3.

S701. The MDC sends an ID of a self-driving function, an ID 2, and a device certificate 2 to the VCU, and the VCU receives the ID of the self-driving function, the ID 2, and the device certificate 2 from the MDC. The ID 2 is an ID of the MDC, and the device certificate 2 is a device certificate of the MDC. In this case, first information may include the ID of the self-driving function, the ID 2 is a first identifier, and the device certificate 2 is a first certificate.

The MDC and the VCU may communicate with each other through a gateway. For details, refer to the network architecture shown in FIG. 1. In this case, the MDC may send the ID of the self-driving function, the ID 2, and the device certificate 2 to the gateway, and the gateway forwards the ID of the self-driving function, the ID 2, and the device certificate 2 to the VCU. Alternatively, the MDC and the VCU may directly communicate with each other without forwarding through another device. In this case, the MDC may directly send the ID of the self-driving function, the ID 2, and the device certificate 2 to the VCU. In FIG. 7, an example in which the MDC and the VCU communicate with each other through the gateway is used.

S702. The VCU verifies validity of the ID 2 and the device certificate 2. If it is determined that the ID 2 and the device certificate 2 are valid, S703 may be performed. However, if it is determined that the ID 2 is invalid, or it is determined that the device certificate 2 is invalid, or it is determined that both the ID 2 and the device certificate 2 are invalid, information that indicates that the MDC fails to be authenticated may be sent to an HMI. For example, the information that indicates that the MDC fails to be authenticated may include an error code 1, and may further include the ID of the self-driving function. Verifying validity of the ID may also be described as verifying availability of the ID.

S703. The VCU sends the ID of the self-driving function and a random number r to the MDC, and the MDC receives the ID of the self-driving function and the random number r from the VCU. The random number r may be a first random number.

If the MDC and the VCU communicate with each other through the gateway, the VCU may send the ID of the self-driving function and the random number r to the gateway, and the gateway forwards the ID of the self-driving function and the random number r to the MDC. Alternatively, the MDC and the VCU may directly communicate with each other without forwarding through another device. In this case, the VCU may directly send the ID of the self-driving function and the random number r to the MDC.

S704. The MDC calculates a first signature sig1.

For example, the MDC may obtain the first signature based on the random number r and the ID 2. For example, the MDC may obtain a hash value, for example, referred to as a first hash value, based on the random number r and the ID 2 according to a hash algorithm. The MDC may sign the first hash value based on a first private key, to obtain the first signature sig1.

S705. The MDC sends the ID of the self-driving function, the ID 2, and the sig1 to the VCU, and the VCU receives the ID of the self-driving function, the ID 2, and the sig1 from the MDC.

If the VCU and the MDC communicate with each other through the gateway, the MDC may send the ID of the self-driving function, the ID 2, and the sig1 to the gateway, and the gateway forwards the ID of the self-driving function, the ID 2, and the sig1 to the VCU. Alternatively, the MDC and the VCU may directly communicate with each other without forwarding through another device. In this case, the MDC may directly send the ID of the self-driving function, the ID 2, and the sig1 to the VCU. In addition, the MDC may also send the ID of the self-driving function to the VCU, so that the VCU determines that the authentication process is authentication corresponding to a service of the self-driving function.

S706. The VCU performs authentication on the MDC based on the sig1. If the authentication succeeds, S707 is to be performed, or if the authentication fails, S708 is to be performed.

For example, the VCU may perform verification on the sig1 based on the random number r and the ID 2. If the verification succeeds, it is determined that the MDC is trusted, or if the verification fails, it is determined that the MDC is untrusted.

S707. If the authentication succeeds, the VCU sends the ID of the self-driving function and authentication success information to the HMI, and the HMI receives the ID of the self-driving function and the authentication success information from the VCU. The authentication success information is used to indicate that the VCU has authenticated the MDC.

If the VCU and the HMI communicate with each other through the gateway, the VCU may send the ID of the self-driving function and the authentication success information to the gateway, and the gateway forwards the ID of the self-driving function and the authentication success information to the HMI. Alternatively, the HMI and the VCU may directly communicate with each other without forwarding through another device. In this case, the VCU may directly send the ID of the self-driving function and the authentication success information to the HMI. The VCU may send the ID of the self-driving function to the HMI, so that the HMI determines that the authentication process is authentication corresponding to the service of the self-driving function.

S708. If the authentication fails, the VCU sends the ID of the self-driving function and authentication failure information to the HMI, and the HMI receives the ID of the self-driving function and the authentication failure information from the VCU. The authentication failure information includes, for example, an error code 2, and may indicate that the VCU fails to authenticate the MDC. In addition, the VCU may record errors.

If the VCU and the HMI communicate with each other through the gateway, the VCU may send the ID of the self-driving function and the authentication failure information to the gateway, and the gateway forwards the ID of the self-driving function and the authentication failure information to the HMI. Alternatively, the HMI and the VCU may directly communicate with each other without forwarding through another device. In this case, the VCU may directly send the ID of the self-driving function and the authentication failure information to the HMI. The VCU may send the ID of the self-driving function to the HMI, so that the HMI determines that the authentication process is authentication corresponding to the self-driving function service.

Figure 8:
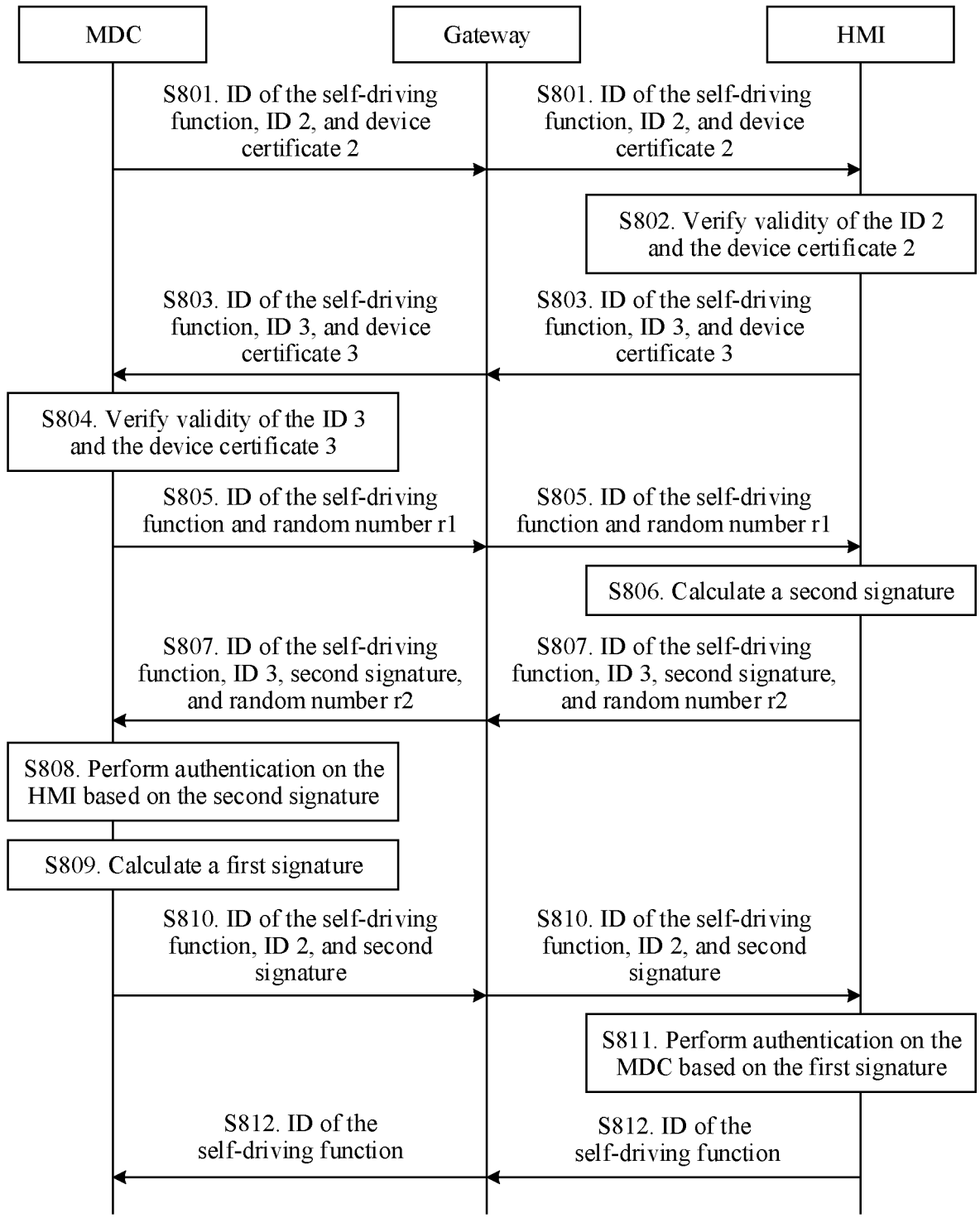
FIG. 8 is a flowchart of a method for performing two-way authentication by an HMI and an MDC according to an embodiment of this application.

FIG. 8 is a flowchart of the second authentication process. In the embodiment shown in FIG. 8, an MDC may be considered as a first device, and an HMI may be considered as a second device. The embodiment shown in FIG. 8 may be considered as an example of the embodiment shown in FIG. 4, or may be considered as an example of the embodiment shown in FIG. 5.

S801. The MDC sends an ID of a self-driving function, an ID 2, and a device certificate 2 to the HMI, and the HMI receives the ID of the self-driving function, the ID 2, and the device certificate 2 from the MDC.

The ID 2 is an ID of the MDC, and the device certificate 2 is a device certificate of the MDC.

The MDC and the HMI may communicate with each other through a gateway. For details, refer to the network architecture shown in FIG. 1. In this case, the MDC may send the ID of the self-driving function, the ID 2, and the device certificate 2 to the gateway, and the gateway forwards the ID of the self-driving function, the ID 2, and the device certificate 2 to the HMI. Alternatively, the MDC and the HMI may directly communicate with each other without forwarding through another device. In this case, the MDC may directly send the ID of the self-driving function, the ID 2, and the device certificate 2 to the HMI. In FIG. 8, an example in which the MDC and the HMI communicate with each other through the gateway is used. Therefore, in subsequent steps of the embodiment shown in FIG. 8, all information transmitted between the MDC and the HMI needs to be forwarded through the gateway, and details are not described in the following.

S802. The HMI performs verification on validity of the ID 2 and verifies whether the device certificate 2 is valid. If the ID 2 is valid and the device certificate 2 is valid, S803 is to be performed; or otherwise, the HMI may send authentication failure information to the MDC. The authentication failure information is, for example, an error code 1. In addition, the HMI may further send the ID of the self-driving function to the MDC.

S803. The HMI sends the ID of the self-driving function, an ID 3, and a device certificate 3 to the MDC, and the MDC receives the ID of the self-driving function, the ID 3, and the device certificate 3 from the HMI. The ID 3 is an ID of the HMI, and the device certificate 3 is a device certificate of the HMI.

S804. The MDC performs verification on validity of the ID 3 and verifies whether the device certificate 3 is valid. If the ID 3 is valid and the device certificate 3 is valid, S805 is to be performed; or otherwise, the MDC does not send information to the HMI, the authentication ends, and the MDC does not enable the self-driving function, but records an error. If necessary, the MDC may send an error code to a cloud device.

S805. The MDC sends the ID of the self-driving function and a random number r1 to the HMI, and the HMI receives the ID of the self-driving function and the random number r1 from the MDC. The random number r1 may be a second random number.

S806. The HMI calculates a second signature.

For example, the second signature is sig2=sig(h2), where h2=hash(ID 3, r1).

S807. The HMI sends the ID of the self-driving function, the ID 3, the sig2, and a random number r2 to the MDC, and the MDC receives the ID of the self-driving function, the ID 3, the sig2, and the random number r2 from the HMI. The random number r2 may be a first random number.

S808. The MDC performs authentication on the HMI based on the sig2. If the authentication succeeds, S808 is to be performed. If the authentication fails, the MDC does not send information to the HMI, and the MDC does not enable the self-driving function. In this case, the authentication ends, and the MDC may record an error.

S809. The MDC calculates a first signature.

For example, the first signature sig3=sig (h3), where h3=hash (ID 2, r1∥r2). r1∥r2 indicates exclusive or between the random numbers r1 and r2, or a sequence obtained after a sequence of the random number r1 and a sequence of the random number r2 are concatenated, for example, a sequence obtained after the sequence of the random number r2 is concatenated to the tail of the sequence of the random number r1.

S810. The MDC sends the ID of the self-driving function, the ID 2, and the sig3 to the HMI, and the HMI receives the ID of the self-driving function, the ID 2, and the sig3 from the MDC.

S811. The HMI performs authentication on the MDC based on the sig3. If the authentication succeeds, S812 is to be performed. If the authentication fails, the HMI may send authentication failure information to the MDC. The authentication failure information includes, for example, an error code 2, and may be displayed through the HMI, and the self-driving function cannot be enabled.

S812. The HMI sends the ID of the self-driving function to the MDC, and the HMI receives the ID of the self-driving function from the MDC.

Figure 9:
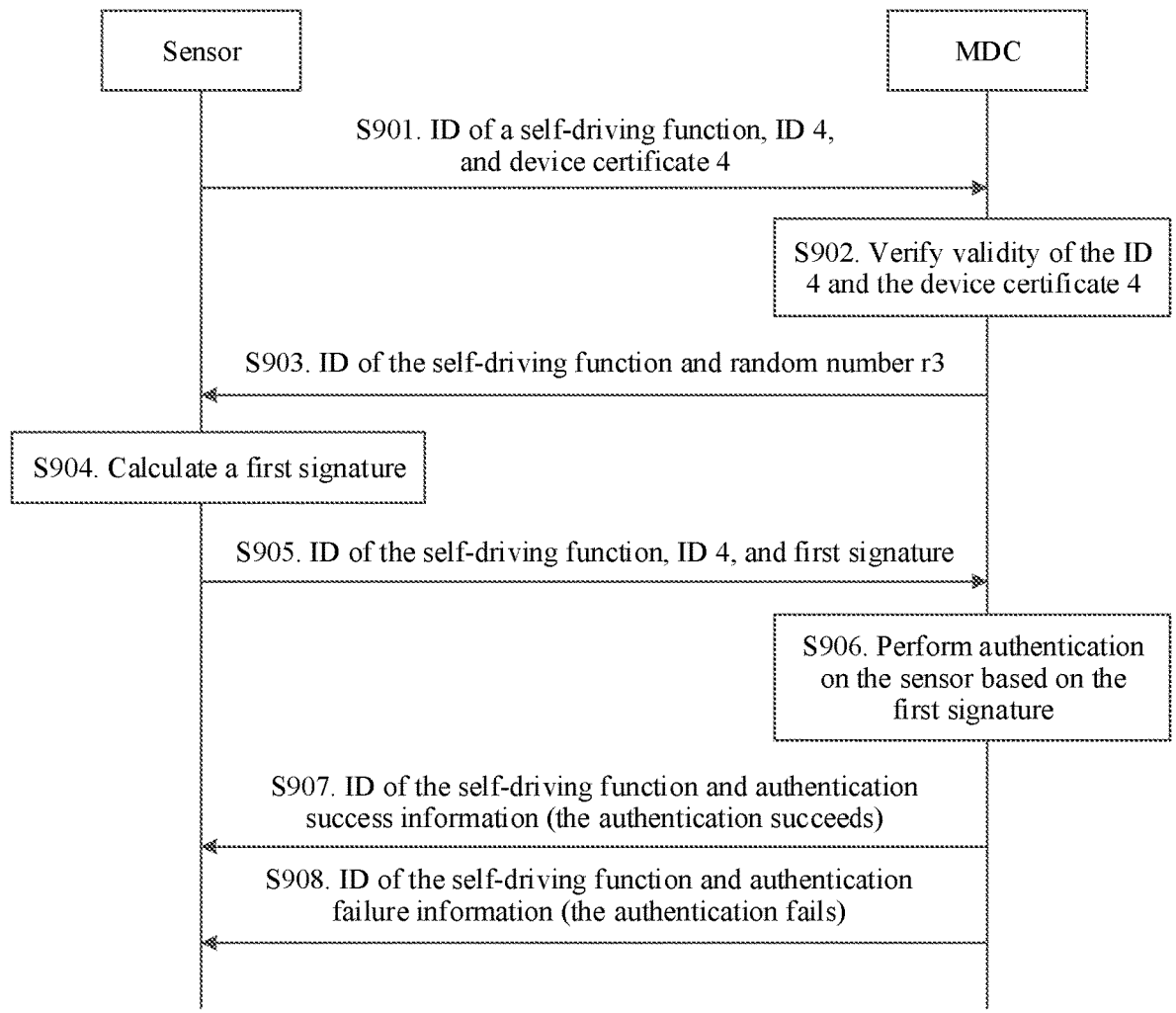
FIG. 9 is a flowchart of a method for performing authentication on a sensor by an MDC according to an embodiment of this application.

FIG. 9 is a flowchart of the third authentication process. In the embodiment shown in FIG. 9, a sensor may be considered as a first device, and an MDC may be considered as a second device. The embodiment shown in FIG. 9 may be considered as an example of the embodiment shown in FIG. 3.

S901. The sensor sends an ID of a self-driving function, an ID 4, and a device certificate 4 to the MDC, and the MDC receives the ID of the self-driving function, the ID 4, and the device certificate 4 from the sensor. The ID 4 is an ID of the sensor, and the device certificate 4 is a device certificate of the sensor.

S902. The MDC performs verification on the ID 4, and performs verification on validity of the device certificate 4. If it is determined that the ID 4 and the device certificate 4 are valid, S903 may be performed. However, if it is determined that the ID 4 is invalid, or it is determined that the device certificate 4 is invalid, or it is determined that both the ID 4 and the device certificate 4 are invalid, authentication failure information may be sent to the sensor. For example, the authentication failure information may include an error code 1, and may further include the ID of the self-driving function. In addition, if it is determined that the ID 4 is invalid, or it is determined that the device certificate 4 is invalid, or it is determined that both the ID 4 and the device certificate 4 are invalid, the error code 1 and the ID of the self-driving function may be further sent to an HMI.

S903. The MDC sends the ID of the self-driving function and a random number r3 to the sensor, and the sensor receives the ID of the self-driving function and the random number r3 from the MDC.

S904. The sensor calculates a first signature. For example, the sensor may calculate the first signature sig4 based on the random number r3 and the ID 4.

S905. The sensor sends the ID of the self-driving function, the ID 4, and the sig4 to the MDC, and the MDC receives the ID of the self-driving function, the ID 4, and the sig4 from the sensor.

S906. The MDC performs authentication on the sensor based on the sig4. If the authentication succeeds, S907 is to be performed, or if the authentication fails, S908 is to be performed.

S907. If the authentication succeeds, the MDC sends the ID of the self-driving function and authentication success information to the HMI and the sensor, the HMI receives the ID of the self-driving function and the authentication success information from the MDC, and the sensor receives the ID of the self-driving function and the authentication success information from the MDC. The authentication success information is used to indicate that the MDC has authenticated the sensor. FIG. 9 does not show a step in which the MDC sends information to the HMI.

S908. If the authentication fails, the MDC sends the ID of the self-driving function and authentication failure information to the HMI, and the HMI receives the ID of the self-driving function and the authentication failure information from the MDC. The authentication failure information includes, for example, an error code 2, and may indicate that the MDC fails to authenticate the sensor. In addition, the MDC may record errors and report the recorded information to a cloud device. If the authentication fails, the self-driving function of the MDC is disabled. FIG. 9 does not show a step in which the MDC sends information to the HMI.

For the description of error codes 1 and 2, refer to Table 2.

TABLE 2

| Type | Value | Meaning |
| --- | --- | --- |
| Error code 1 | 1 | A certificate is not within a validity period |
|  | 2 | A device ID is invalid |
|  | 3 | A certificate fails to be verified |
| Error code 2 | 5 | A signature fails to be verified |

In addition, to enable a user to have better experience, both the first authentication process and the second authentication process may be performed when the ID of the self-driving function is not received. When either or both of the first authentication process and the second authentication process fail, the self-driving function may be disabled.

The embodiments shown in FIG. 6 to FIG. 9 are all distributed authentication processes. However, in the embodiments of this application, the gateway is further supported in performing a centralized authentication process. An example in which the first service is the self-driving function is still used.

As a central server of an entire vehicle-mounted system, the gateway performs authentication on devices such as the HMI and the MDC. In a self-driving case, the gateway receives the ID of the self-driving function from the HMI, and the gateway searches, based on the ID of the self-driving function, for devices on which authentication needs to be performed and an authentication sequence. For example, if the gateway determines, based on the ID of the self-driving function, that the devices on which authentication needs to be performed are the HMI, the VCU, the MDC, and the sensor, an authentication sequence is as follows:

(1) one-way authentication performed by the gateway on the HMI;

(2) one-way authentication performed by the gateway on the VCU;

(3) one-way authentication performed by the gateway on the MDC; and (4) one-way authentication performed by the MDC on the sensor.

Orders of (1) and (2) may be exchanged. In the foregoing four authentication processes, if authentication in any one of the processes fails, the self-driving function cannot be enabled. For example, if the gateway fails to authenticate the MDC, the gateway may deliver an instruction to the VCU, to indicate that the VCU cannot process an instruction from the MDC.

For the foregoing four one-way authentication processes, refer to the description of the one-way authentication process in another embodiment.

The embodiments shown in FIG. 6 to FIG. 9 are described by using the self-driving function as an example. The following describes, by using a service such as an anti-theft startup function as an example, the embodiment shown in FIG. 2 or FIG. 3.

In a scenario in which a vehicle owner enters a vehicle without a key, and directly engages a gear and leaves, the vehicle owner may use a virtual key of a mobile phone to unlock the vehicle. The mobile phone matches the vehicle through Bluetooth. When an application (app) on the mobile phone is enabled or run in the background, and the mobile phone is close to the vehicle, a door of the vehicle is automatically unlocked, and the vehicle is then powered on.

To ensure validity of an access device and a vehicle-mounted device, the vehicle-mounted device needs to complete the following three authentication processes:

4. One-way authentication performed by a BCM on a PEPS: A body domain control unit (BDCU) performs verification on validity of a startup instruction device of a Bluetooth module.

5. One-way authentication performed by a VCU on the BCM: The VCU performs verification on validity of a device that sends a power-on request of the BCM.

6. One-way authentication performed by the VCU on an intra-domain device: The VCU performs one-way validity verification on an intra-domain device such as a battery management system (BMS) or an on-board charge (OBC) (the VCU, the BMS, and the OBC may belong to a same domain, and the VCU is a domain controller).

In the foregoing authentication processes, if the fourth process and the fifth authentication process fail, the vehicle cannot be started. If the fourth and fifth authentication processes succeed but the authentication performed by the VCU on the OBC fails in the sixth authentication process, the VCU may record the failure and report an error. However, the vehicle can be started.

Figure 10:
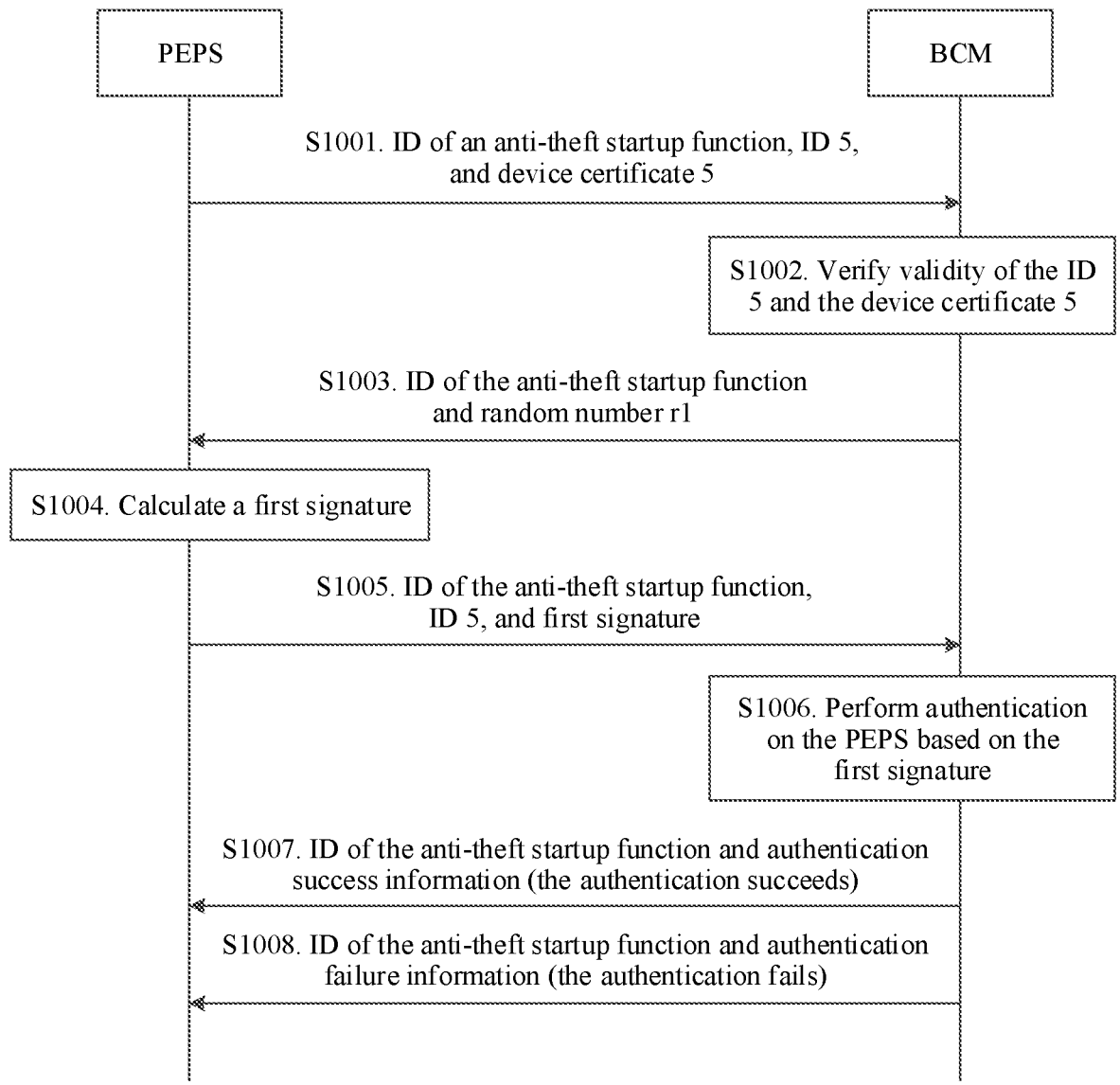
FIG. 10 is a flowchart of a method for performing authentication on a PEPS by a BCM according to an embodiment of this application.

FIG. 10 is a flowchart of the fourth authentication process. In the embodiment shown in FIG. 10, a BCM may be considered as a second device, and a PEPS may be considered as a first device. The embodiment shown in FIG. 10 may be considered as an example of the embodiment shown in FIG. 3.

S1001. The PEPS sends an ID of an anti-theft startup function, an ID 5, and a device certificate 5 to the BCM, and the BCM receives the ID of the anti-theft startup function, the ID 5, and the device certificate 5 from the PEPS. The ID 5 is an ID of the PEPS, and the device certificate 5 is a device certificate of the PEPS.

Referring to the architecture shown in FIG. 1, the PEPS may be an intra-domain device in a domain in which the BCM is located. Therefore, the BCM and the PEPS may directly communicate with each other without forwarding through another device.

S1002. The BCM performs verification on validity of the ID 5, and performs verification on validity of the device certificate 5. If it is determined that the ID 5 and the device certificate 5 are valid, S1003 may be performed. However, if it is determined that the ID 5 is invalid, or it is determined that the device certificate 5 is invalid, or it is determined that both the ID 5 and the device certificate 5 are invalid, information that indicates that the PEPS fails to be authenticated may be sent to the PEPS. For example, the information that indicates that the PEPS fails to be authenticated may include an error code 1, and may further include the ID of the anti-theft startup function.

S1003. The BCM sends the ID of the anti-theft startup function and a random number r1 to the PEPS, and the PEPS receives the ID of the anti-theft startup function and the random number r1 from the BCM. The random number r1 may be a first random number.

S1004. The PEPS calculates a first signature.

For example, the PEPS may obtain the first signature based on the random number r1 and the ID 5. For example, the PEPS may obtain a hash value, for example, referred to as a first hash value, based on the random number r1 and the ID 5 according to a hash algorithm. The PEPS may sign the first hash value based on a first private key, to obtain the first signature sig1.

S1005. The PEPS sends the ID of the anti-theft startup function, the ID 5, and the sig1 to the BCM, and the BCM receives the ID of the anti-theft startup function, the ID 5, and the sig1 from the PEPS.

S1006. The BCM performs authentication on the PEPS based on the sig1. If the authentication succeeds, S1007 is to be performed, or if the authentication fails, S1008 is to be performed.

For example, the BCM may perform verification on the sig1 based on the random number r1 and the ID 5. If the verification succeeds, it is determined that the PEPS is trusted, or if the verification fails, it is determined that the PEPS is untrusted.

S1007. If the authentication succeeds, the BCM sends the ID of the anti-theft startup function and authentication success information to the PEPS, and the PEPS receives the ID of the anti-theft startup function and the authentication success information from the BCM. The authentication success information is used to indicate that the BCM has authenticated the PEPS.

S1008. If the authentication fails, the BCM sends the ID of the anti-theft startup function and authentication failure information to the PEPS, and the PEPS receives the ID of the anti-theft startup function and the authentication failure information from the BCM. The authentication failure information includes, for example, an error code 2, and may indicate that the BCM fails to authenticate the PEPS, and a BCM vehicle door is closed and cannot be opened. In addition, the BCM may record errors or generate an alarm, and report the recorded information to a cloud device.

Figure 11:
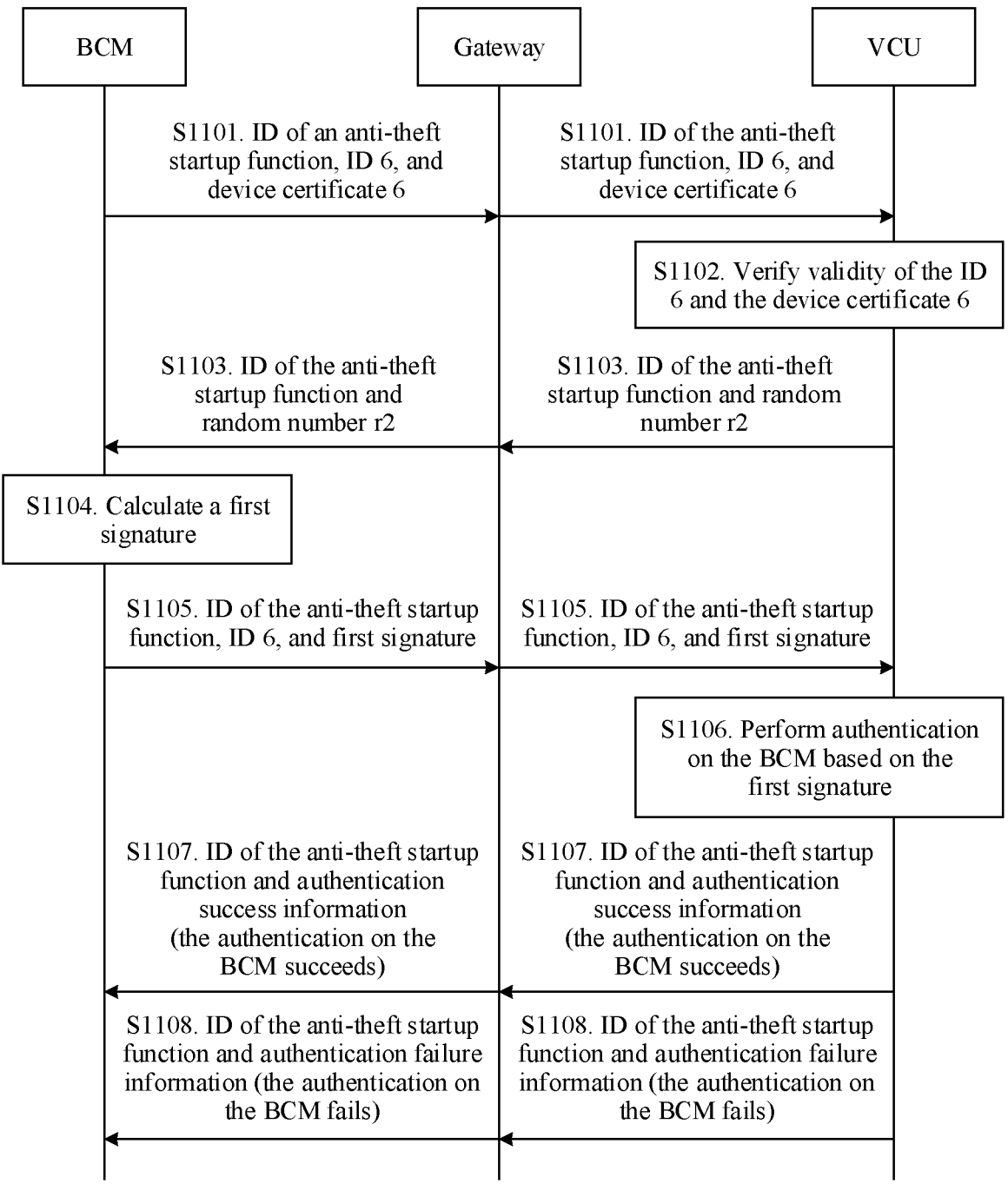
FIG. 11 is a flowchart of a method for performing authentication on a BCM by a VCU according to an embodiment of this application.

FIG. 11 is a flowchart of the fifth authentication process. In the embodiment shown in FIG. 11, a VCU may be considered as a second device, and a BCM may be considered as a first device. The embodiment shown in FIG. 11 may be considered as an example of the embodiment shown in FIG. 2, or may be considered as an example of the embodiment shown in FIG. 3.

S1101. The BCM sends an ID of an anti-theft startup function, an ID 6, and a device certificate 6 to the VCU, and the VCU receives the ID of the anti-theft startup function, the ID 6, and the device certificate 6 from the BCM. The ID 6 is an ID of the BCM, and the device certificate 6 is a device certificate of the BCM.

The BCM and the VCU may communicate with each other through a gateway. For details, refer to the network architecture shown in FIG. 1. In this case, the BCM may send the ID of the anti-theft startup function, the ID 6, and the device certificate 6 to the gateway, and the gateway forwards the ID of the anti-theft startup function, the ID 6, and the device certificate 6 to the VCU. Alternatively, the BCM and the VCU may directly communicate with each other without forwarding through another device. In this case, the BCM may directly send the ID of the anti-theft startup function, the ID 6, and the device certificate 6 to the VCU. In FIG. 11, an example in which the BCM and the VCU communicate with each other through the gateway is used. Therefore, in subsequent steps of the embodiment shown in FIG. 11, all information transmitted between the BCM and the VCU needs to be forwarded through the gateway, and details are not described in the following.

S1102. The VCU performs verification on validity of the ID 6, and performs verification on validity of the device certificate 6. If it is determined that the ID 6 and the device certificate 6 are valid, S1103 may be performed. However, if it is determined that the ID 6 is invalid, or it is determined that the device certificate 6 is invalid, or it is determined that both the ID 6 and the device certificate 6 are invalid, information that indicates that the BCM fails to be authenticated may be sent to the BCM. For example, the information that indicates that the BCM fails to be authenticated may include an error code 1, and may further include the ID of the anti-theft startup function.

S1103. The VCU sends the ID of the anti-theft startup function and a random number r2 to the BCM, and the BCM receives the ID of the anti-theft startup function and the random number r2 from the VCU. The random number r2 may be a first random number.

S1104. The BCM calculates a first signature.

For example, the BCM may obtain the first signature based on the random number r2 and the ID 6. For example, the BCM may obtain a hash value, for example, referred to as a first hash value, based on the random number r2 and the ID 6 according to a hash algorithm. The BCM may sign the first hash value based on a first private key, to obtain the first signature sig2.

S1105. The BCM sends the ID of the anti-theft startup function, the ID 6, and the sig2 to the VCU, and the VCU receives the ID of the anti-theft startup function, the ID 6, and the sig2 from the BCM.

S1106. The VCU performs authentication on the BCM based on the sig2. If the authentication succeeds, S1107 is to be performed, or if the authentication fails, S1108 is to be performed.

For example, the VCU may perform verification on the sig2 based on the random number r2 and the ID 6. If the verification succeeds, it is determined that the BCM is trusted, or if the verification fails, it is determined that the BCM is untrusted.

S1107. If the authentication succeeds, the VCU sends the ID of the anti-theft startup function and authentication success information to the BCM, and the BCM receives the ID of the anti-theft startup function and the authentication success information from the VCU. The authentication success information is used to indicate that the VCU has authenticated the BCM.

S1108. If the authentication fails, the VCU sends the ID of the anti-theft startup function and authentication failure information to the BCM, and the BCM receives the ID of the anti-theft startup function and the authentication failure information from the VCU. The authentication failure information includes, for example, an error code 2, and may indicate that the VCU fails to authenticate the BCM. In addition, the VCU may record errors and report the recorded information to a cloud device.

Figure 12:
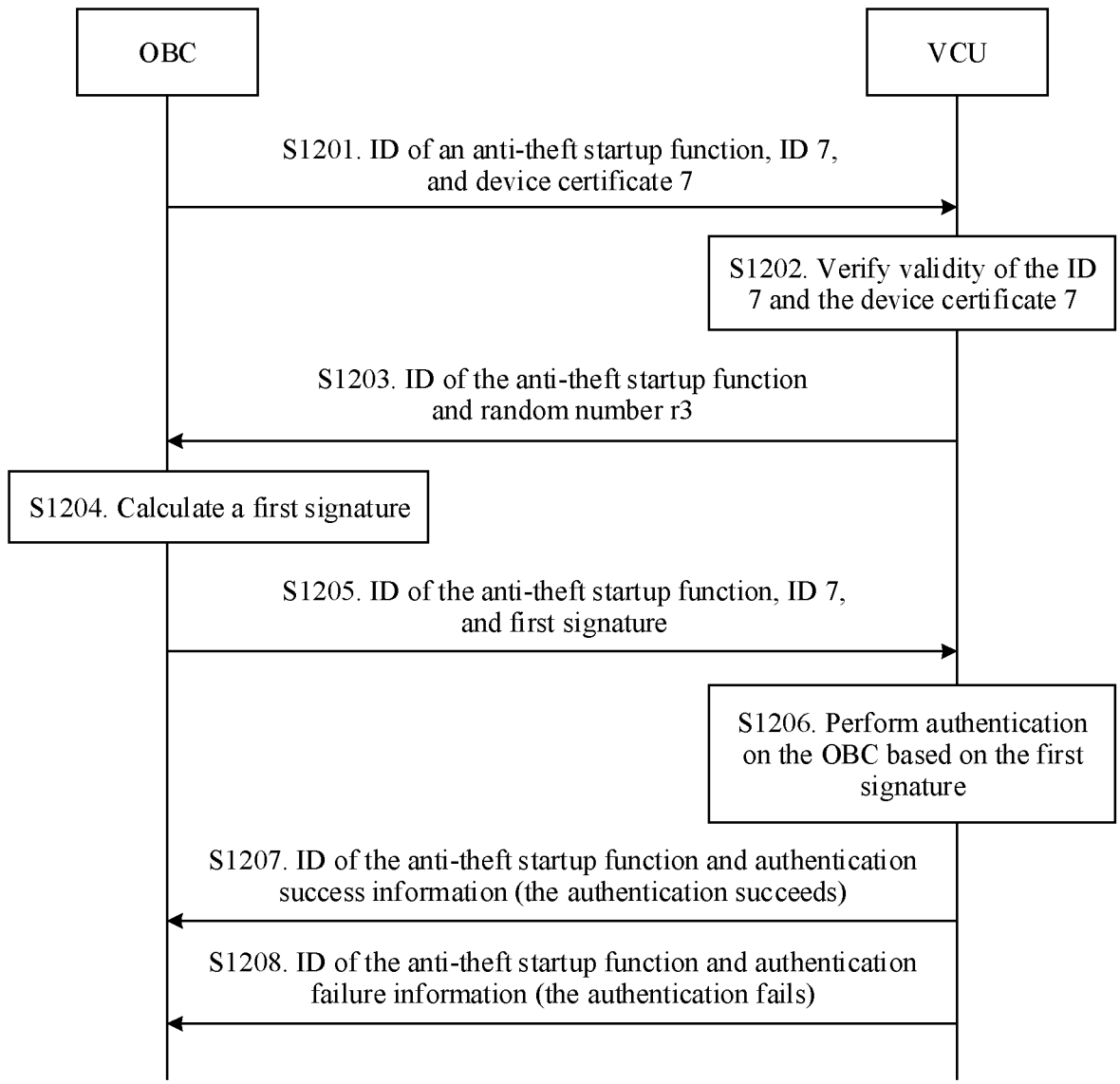
FIG. 12 is a flowchart of a method for performing authentication on an OBC by a VCU according to an embodiment of this application.

FIG. 12 is a flowchart of the sixth authentication process. In the embodiment shown in FIG. 12, a VCU may be considered as a second device, and an OBC may be considered as a first device. The embodiment shown in FIG. 12 may be considered as an example of the embodiment shown in FIG. 3.

S1201. The OBC sends an ID of an anti-theft startup function, an ID 7, and a device certificate 7 to the VCU, and the VCU receives the ID of the anti-theft startup function, the ID 7, and the device certificate 7 from the OBC. The ID 7 is an ID of the OBC, and the device certificate 7 is a device certificate of the OBC.

The OBC may be an intra-domain device in a domain in which the VCU is located. Therefore, the VCU and the OBC may directly communicate with each other without forwarding through another device.

S1202. The VCU performs verification on validity of the ID 7, and performs verification on validity of the device certificate 7. If it is determined that the ID 7 and the device certificate 7 are valid, S1203 may be performed. However, if it is determined that the ID 7 is invalid, or it is determined that the device certificate 7 is invalid, or it is determined that both the ID 7 and the device certificate 7 are invalid, information that indicates that the OBC fails to be authenticated may be sent to the OBC. For example, the information that indicates that the OBC fails to be authenticated may include an error code 1, and may further include the ID of the anti-theft startup function.

S1203. The VCU sends the ID of the anti-theft startup function and a random number r3 to the OBC, and the OBC receives the ID of the anti-theft startup function and the random number r3 from the VCU. The random number r3 may be a first random number.

S1204. The OBC calculates a first signature.

For example, the OBC may obtain the first signature based on the random number r3 and the ID 7. For example, the OBC may obtain a hash value, for example, referred to as a first hash value, based on the random number r3 and the ID 7 according to a hash algorithm. The OBC may sign the first hash value based on a first private key, to obtain the first signature sig3.

S1205. The OBC sends the ID of the anti-theft startup function, the ID 7, and the sig3 to the VCU, and the VCU receives the ID of the anti-theft startup function, the ID 7, and the sig3 from the OBC.

S1206. The VCU performs authentication on the OBC based on the sig3. If the authentication succeeds, S1207 is to be performed, or if the authentication fails, S1208 is to be performed.

For example, the VCU may perform verification on the sig3 based on the random number r3 and the ID 7. If the verification succeeds, it is determined that the OBC is trusted, or if the verification fails, it is determined that the OBC is untrusted.

S1207. If the authentication succeeds, the VCU sends the ID of the anti-theft startup function and authentication success information to the OBC, and the OBC receives the ID of the anti-theft startup function and the authentication success information from the VCU. The authentication success information is used to indicate that the VCU has authenticated the OBC.

S1208. If the authentication fails, the VCU sends the ID of the anti-theft startup function and authentication failure information to the OBC, and the OBC receives the ID of the anti-theft startup function and the authentication failure information from the VCU. The authentication failure information includes, for example, an error code 2, and may indicate that the VCU fails to authenticate the OBC. In addition, the VCU may record errors and report the recorded information to a cloud device.

For the error code 1 or the error code 2 described in any one of the embodiments shown in FIG. 10 to FIG. 12, refer to the foregoing descriptions.

The foregoing embodiments describe the authentication process. In this embodiment of this application, if the authentication fails, a corresponding policy may be used, and the used policy may also be related to a service. The following provides descriptions by using some embodiments.

Figure 13:
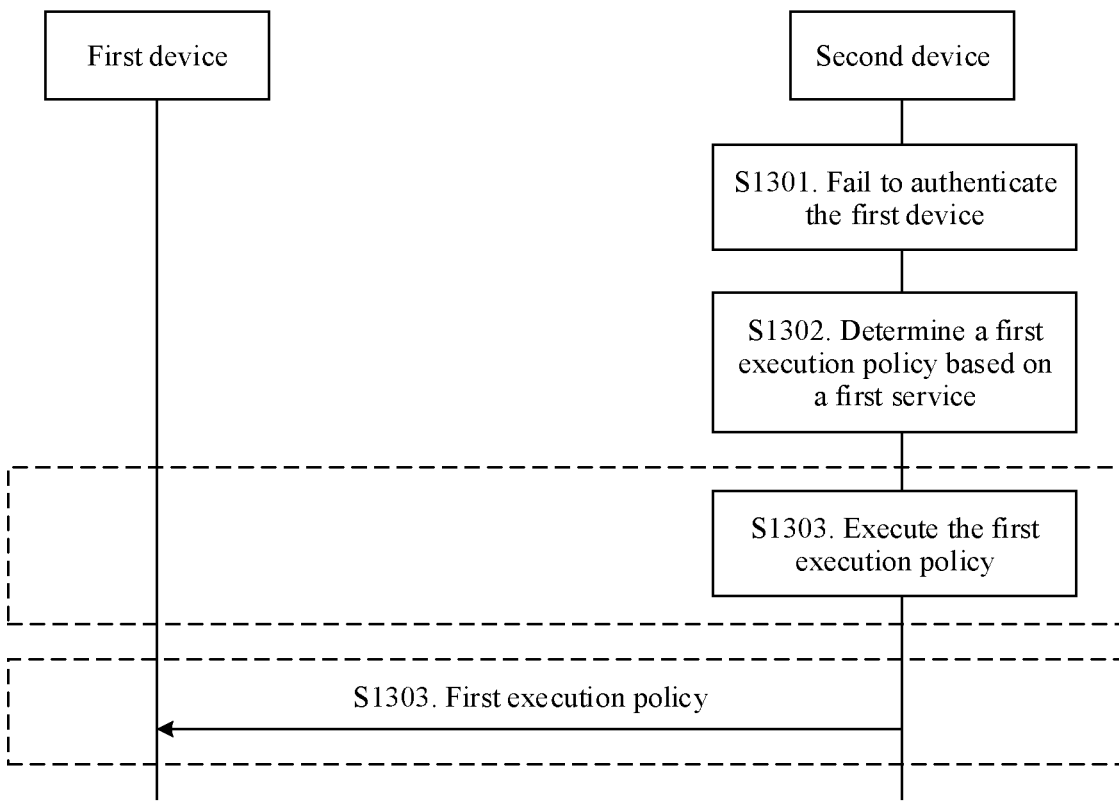
FIG. 13 is a flowchart of a device authentication method according to an embodiment of this application.

FIG. 13 is a flowchart of a device authentication method according to an embodiment of this application. In the following description process, an example in which the method is applied to the network architecture shown in FIG. 1 is used. For example, in the embodiment shown in FIG. 13, a first device may be a to-be-authenticated device or a device that fails to be authenticated, a second device may be a device other than a gateway and a router, or an entity other than an entity having a routing and forwarding function, or the second device may be a device such as a gateway or a router, or the second device may be an entity having a routing and forwarding function. In addition, the gateway may also be an entity apparatus having a function of a routing and forwarding device. If the second device is the device such as the gateway or the router, or the entity having the routing and forwarding function, it may be considered that the embodiment shown in FIG. 13 is in a scenario in which the gateway performs centralized authentication. For example, the gateway may perform authentication on each domain controller. Alternatively, it may be considered that the embodiment shown in FIG. 13 is still in a distributed authentication scenario. For example, the gateway may perform authentication on each domain controller, or domain controllers may perform authentication on each other. However, if the second device is the device other than the gateway and the router, it may be considered that the embodiment shown in FIG. 13 is in a distributed authentication scenario in which the gateway does not perform centralized authentication. In this embodiment, the network architecture shown in FIG. 1 is used as an example. Therefore, the first device described below is, for example, the domain controller in the network architecture shown in FIG. 1, and the second device described below is, for example, the T-Box, the OBD, or the gateway in the network architecture shown in FIG. 1.

S1301. The second device fails to authenticate the first device.

For example, the second device may first receive first information and a first certificate from the first device. The first information is used to indicate the second device, and the first certificate is a device certificate of the first device. The second device verifies, based on a third certificate of the first device, whether the first certificate is correct. When the first certificate is correct, the second device generates a first random number, and may send the first random number to the first device. After receiving the first random number, the first device may generate a first signature, and send the first signature to the second device. The second device receives the first signature from the first device. The second device performs authentication on the first device based on the first signature, the first random number, and a first identifier. The first identifier is an identifier of the first device. A third certificate of a device may be an OEM root certificate, a level-2 certificate issued by an OEM/CA, a level-3 certificate issued by the OEM/CA, a level-4 certificate, a certificate of a higher level, or the like. A level of the certificate is not limited. For example, the third certificate of the first device may be a root certificate, a level-2 certificate, a level-3 certificate, a level-4 certificate, or a certificate of a higher level.

In addition, the first certificate may not include subject attribute information of the first certificate, and the first certificate may include one or any combination of the following information: version information of the first certificate, signer information of the first certificate, subject information of the first certificate, validity information of the first certificate, or signature information of the first certificate.

Content related to the first certificate may be combined in the embodiment shown in FIG. 13, or may be independently used as an embodiment. For example, an operation of sending the first certificate by the first device to the second device, and content of the first certificate may be independently used as an embodiment. Alternatively, an operation of performing verification on the first certificate by the second device, content of the first certificate, and the like may be independently used as an embodiment.

The foregoing paragraph only outlines a process in which the second device performs authentication on the first device. For a relatively detailed description of the authentication process, refer to any one of the embodiments shown in FIG. 2 to FIG. 5. In addition, the first device and the second device may directly communicate with each other, or may forward information through a third device. For the content, refer to the description of any one of the embodiments shown in FIG. 2 to FIG. 5.

S1302. The second device determines a first execution policy based on a first service. The authentication corresponds to the first service.

If the second device fails to authenticate the first device, the second device may determine the first execution policy based on the first service. The second device determines the first execution policy based on the first service. For example, the second device determines the first execution policy based on an identifier of the first service. When the second device fails to authenticate the first device, the second device may determine that the authentication is related to the first service, and specifically, determine that the authentication process is related to the identifier of the first service. Therefore, the second device may determine the first execution policy based on the identifier of the first service. The second device may determine different execution policies for different services.

For example, the first execution policy includes: a device stops working, or a device stops using part of functions of the device. For example, for the second device, the first execution policy may include: the second device stops working, or the second device stops using part of functions of the second device. The part of functions herein may be functions related to the first service. For example, if the second device is an MDC, and the first service is a self-driving function, the MDC stops using part of functions of the MDC, for example, stops using a function related to the self-driving function.

For example, the first device is a BMS, the second device is a VCU, and the first service is an ignition function. If the VCU fails to authenticate the BMS, the first execution policy determined by the VCU may be that the VCU continues to enable the ignition function, but the VCU may send alarm information. Alternatively, the first device is an MDC, the second device is a VCU, and the first service is a self-driving function. If the VCU fails to authenticate the MDC, the first execution policy determined by the VCU may be that the self-driving function is not enabled.

S1303. The second device sends the first execution policy to the first device, or the second device executes the first execution policy.

For example, if an authentication scenario used in this embodiment of this application is a distributed authentication scenario, the second device may execute the first execution policy if the second device fails to authenticate the first device. For example, the first device is an MDC, the second device is a VCU, the authentication scenario used in this embodiment is a distributed authentication scenario, and the first service is a self-driving function. If the VCU fails to authenticate the MDC, the first execution policy determined by the VCU may be that a message or an instruction subsequently sent by the MDC is not executed.

Alternatively, if the authentication scenario used in this embodiment of this application is a scenario in which a gateway performs centralized authentication, the second device may send the first execution policy to the first device if the second device fails to authenticate the first device, and the first device executes the first execution policy. For example, the first device is an MDC, the second device is a gateway, the gateway performs centralized authentication, and the first service is a self-driving function. If the gateway fails to authenticate the MDC, the first execution policy determined by the gateway may be that the self-driving function is not enabled. In this case, the gateway may send the first execution policy to the MDC, to indicate the MDC not to enable the self-driving function. After receiving the first execution policy, the MDC may not enable the self-driving function. In addition, in some embodiments (for example, the embodiment shown in FIG. 8, the embodiment shown in FIG. 9, or the embodiment shown in FIG. 10) in the embodiments shown in FIG. 2 to FIG. 12, different execution policies are used for different services. For details, refer to corresponding content.

In this embodiment of this application, if the second device fails to authenticate the first device, because the authentication is an authentication process related to the first service, when the second device determines an execution policy, the determined execution policy may be an execution policy related to the first service. In other words, the execution policy may be determined based on the first service, so that the determined execution policy better meets a service requirement.

The following describes, with reference to the accompanying drawings, apparatuses configured to implement the foregoing methods in the embodiments of this application. Therefore, all the foregoing descriptions may be used in subsequent embodiments. Repeated content is not described again.

Figure 14:
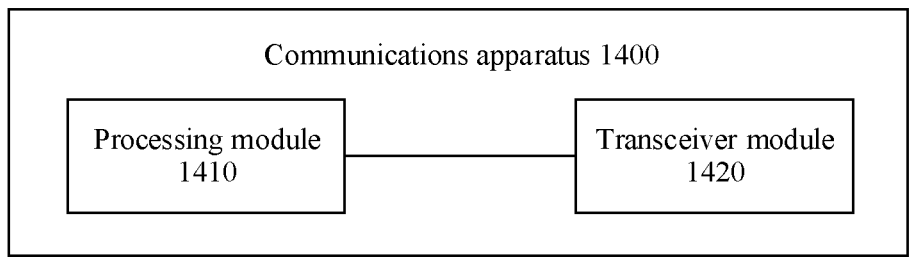
FIG. 14 is a schematic block diagram of a first device according to an embodiment of this application.

FIG. 14 is a schematic block diagram of a communications apparatus 1400 according to an embodiment of this application. The communications apparatus 1400 may be a communications device or an apparatus, for example, a chip system, that can support a communications device in implementing a function described in the method. For example, the communications device is a vehicle-mounted apparatus. For example, the communications device is, for example, a first device 1400.

The communications apparatus 1400 includes a processing module 1410 and a transceiver module 1420. For example, the communications apparatus 1400 may be a first device, or may be a chip applied to a first device, or another combined device, or another component that has a function of the first device. When the communications apparatus 1400 is the first device, the transceiver module 1420 may be a transceiver, and may include an antenna, a radio frequency circuit, and the like. The processing module 1410 may be a processor, for example, a baseband processor, and the baseband processor may include one or more central processing units (CPU). When the communications apparatus 1400 is the component that has a function of the first device, the transceiver module 1420 may be a radio frequency unit, and the processing module 1410 may be a processor, for example, a baseband processor. When the communications apparatus 1400 is the chip system, the transceiver module 1420 may be an input/output interface of the chip system (for example, a baseband chip), and the processing module may be a processor of the chip system, and may include one or more central processing units.

The processing module 1410 may be configured to perform all operations, except receiving and sending operations, performed by the first device in the embodiment shown in FIG. 2, for example, S203, and/or configured to support another process of the technology described in this specification. The transceiver module 1420 may be configured to perform all the receiving and sending operations performed by the first device in the embodiment shown in FIG. 2, for example, S201, S202, and S204, and/or configured to support another process of the technology described in this specification.

Alternatively, the processing module 1410 may be configured to perform all operations, except receiving and sending operations, performed by the first device in the embodiment shown in FIG. 3, for example, S303, and/or configured to support another process of the technology described in this specification. The transceiver module 1420 may be configured to perform all the receiving and sending operations performed by the first device in the embodiment shown in FIG. 3, for example, S301, S302, and S304, and/or configured to support another process of the technology described in this specification.

Alternatively, the processing module 1410 may be configured to perform all operations, except receiving and sending operations, performed by the first device in the embodiment shown in FIG. 4, for example, S406 to S408, and/or configured to support another process of the technology described in this specification. The transceiver module 1420 may be configured to perform all the receiving and sending operations performed by the first device in the embodiment shown in FIG. 4, for example, S401, S402, S403, S405, and S409, and/or configured to support another process of the technology described in this specification.

Alternatively, the processing module 1410 may be configured to perform all operations, except receiving and sending operations, performed by the first device in the embodiment shown in FIG. 5, for example, S506 to S508, and/or configured to support another process of the technology described in this specification. The transceiver module 1420 may be configured to perform all the receiving and sending operations performed by the first device in the embodiment shown in FIG. 5, for example, S501, S502, S503, S505, and S509, and/or configured to support another process of the technology described in this specification.

Alternatively, the processing module 1410 may be configured to perform all operations, except receiving and sending operations, performed by the T-Box in the embodiment shown in FIG. 6, for example, S604, S608, and S609, and/or configured to support another process of the technology described in this specification. The transceiver module 1420 may be configured to perform all the receiving and sending operations performed by the T-Box in the embodiment shown in FIG. 6, for example, S601, S603, S605, S607, and S610, and/or configured to support another process of the technology described in this specification.

Alternatively, the processing module 1410 may be configured to perform all operations, except receiving and sending operations, performed by the MDC in the embodiment shown in FIG. 7, for example, S704, and/or configured to support another process of the technology described in this specification. The transceiver module 1420 may be configured to perform all the receiving and sending operations performed by the MDC in the embodiment shown in FIG. 7, for example, S701, S703, and S705, and/or configured to support another process of the technology described in this specification.

Alternatively, the processing module 1410 may be configured to perform all operations, except receiving and sending operations, performed by the MDC in the embodiment shown in FIG. 8, for example, S804, S808, and S809, and/or configured to support another process of the technology described in this specification. The transceiver module 1420 may be configured to perform all the receiving and sending operations performed by the MDC in the embodiment shown in FIG. 8, for example, S801, S803, S805, S807, S810, and S812, and/or configured to support another process of the technology described in this specification.

Alternatively, the processing module 1410 may be configured to perform all operations, except receiving and sending operations, performed by the sensor in the embodiment shown in FIG. 9, for example, S904, and/or configured to support another process of the technology described in this specification. The transceiver module 1420 may be configured to perform all the receiving and sending operations performed by the sensor in the embodiment shown in FIG. 9, for example, S901, S903, S905, S907, and S908, and/or configured to support another process of the technology described in this specification.

Alternatively, the processing module 1410 may be configured to perform all operations, except receiving and sending operations, performed by the PEPS in the embodiment shown in FIG. 10, for example, S1004, and/or configured to support another process of the technology described in this specification. The transceiver module 1420 may be configured to perform all the receiving and sending operations performed by the PEPS in the embodiment shown in FIG. 10, for example, S1001, S1003, S1005, S1007, and S1008, and/or configured to support another process of the technology described in this specification.

Alternatively, the processing module 1410 may be configured to perform all operations, except receiving and sending operations, performed by the BCM in the embodiment shown in FIG. 11, for example, S1104, and/or configured to support another process of the technology described in this specification. The transceiver module 1420 may be configured to perform all the receiving and sending operations performed by the BCM in the embodiment shown in FIG. 11, for example, S1101, S1103, S1105, S1107, and S1108, and/or configured to support another process of the technology described in this specification.

Alternatively, the processing module 1410 may be configured to perform all operations, except receiving and sending operations, performed by the OBC in the embodiment shown in FIG. 12, for example, S1204, and/or configured to support another process of the technology described in this specification. The transceiver module 1420 may be configured to perform all the receiving and sending operations performed by the OBC in the embodiment shown in FIG. 12, for example, S1201, S1203, S1205, S1207, and S1208, and/or configured to support another process of the technology described in this specification.

In addition, the transceiver module 1420 may be one function module. The function module can implement both a sending operation and a receiving operation. For example, the transceiver module 1420 may be configured to perform all sending operations and receiving operations performed by the first device in any one of the embodiments shown in FIG. 2 to FIG. 12. For example, when a sending operation is performed, it may be considered that the transceiver module 1420 is a sending module, and when a receiving operation is performed, it may be considered that the transceiver module 1420 is a receiving module. Alternatively, the transceiver module 1420 may be a general term of two function modules. The two function modules are a sending module and a receiving module. The sending module is configured to implement a sending operation. For example, the sending module may be configured to perform all sending operations performed by the first device in any one of the embodiments shown in FIG. 2 to FIG. 12. The receiving module is configured to implement a receiving operation. For example, the receiving module may be configured to perform all receiving operations performed by the first device in any one of the embodiments shown in FIG. 2 to FIG. 12.

For example, the transceiver module 1420 is configured to send first information and a first certificate to a second device, where the first information is used to indicate the second device, and the first certificate is a device certificate of the communications apparatus 1400.

The transceiver module 1420 is further configured to receive a first random number from the second device.

The processing module 1410 is configured to obtain a first signature based on the first random number and a first identifier by using a first private key, where the first identifier is an identifier of the communications apparatus 1400.

The transceiver module 1420 is further configured to send the first signature to the second device, where the first signature is used for authentication on the communications apparatus 1400.

In an optional implementation, the first information includes an identifier of a first service.

In an optional implementation,
the processing module 1410 is further configured to generate a second random number; and
the transceiver module 1420 is further configured to send the second random number to the second device.

In an optional implementation,
the transceiver module 1420 is further configured to receive a second signature and a second identifier from the second device, where the second identifier is an identifier of the second device; and
the processing module 1410 is further configured to perform authentication on the second device based on the second signature, the second random number, and the second identifier.

In an optional implementation, the processing module 1410 is configured to perform authentication on the second device based on the second signature, the second random number, and the second identifier in the following manner:
performing signature verification on the second signature, the second random number, and the second identifier by using a second public key, to obtain a returned result; and
when the returned result indicates that the signature verification succeeds, determining that the authentication on the second device succeeds; or otherwise, when the returned result indicates that the signature verification fails, determining that the authentication on the second device fails.

In an optional implementation, the first certificate does not include subject attribute information of the first certificate.

In an optional implementation, the first certificate includes one or any combination of the following information:
version information of the first certificate;
signer information of the first certificate;
subject information of the first certificate;
validity information of the first certificate; or
signature information of the first certificate.

In an optional implementation,
the transceiver module 1420 is further configured to receive indication information from the second device, where the indication information is used to indicate that the authentication on the communications apparatus 1400 fails, or is used to indicate the communications apparatus 1400 to stop working or stop using part of functions of the communications apparatus 1400; and the processing module 1410 is further configured to enable the communications apparatus 1400 to stop working, or stop using part of functions of the communications apparatus 1400.

It should be understood that the processing module 1410 in this embodiment of this application may be implemented by a processor or a processor-related circuit component, and the transceiver module 1420 may be implemented by a transceiver or a transceiver-related circuit component.

Figure 15:
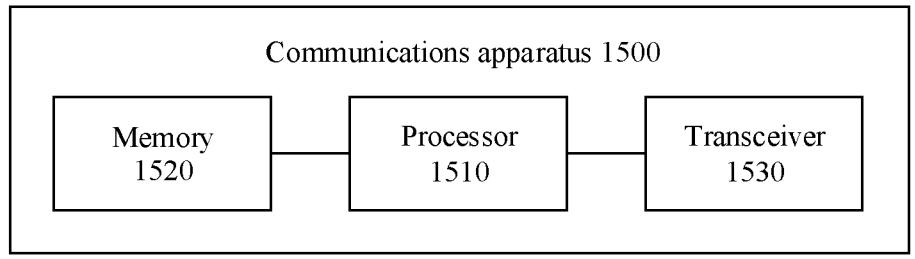
FIG. 15 is another schematic block diagram of a first device according to an embodiment of this application.

As shown in FIG. 15, an embodiment of this application further provides a communications apparatus 1500. For example, the communications apparatus 1500 is, for example, a first device 1500. For example, the communications apparatus 1500 may be a communications device, for example, a terminal device, or may be a chip system. The communications apparatus 1500 includes a processor 1510. Optionally, the communications apparatus 1500 may further include a memory 1520. Optionally, the communications apparatus 1500 may further include a transceiver 1530. The memory 1520 stores a computer instruction or program, and the processor 1510 may execute the computer instruction or program stored in the memory 1520. When the computer instruction or program stored in the memory 1520 is executed, the processor 1510 is configured to perform an operation performed by the processing module 1410 in the foregoing embodiment, and the transceiver 1530 is configured to perform an operation performed by the transceiver module 1420 in the foregoing embodiment. Alternatively, the communications apparatus 1500 may not include the memory 1520. For example, the memory is located outside the communications apparatus 1500. When a computer instruction or program stored in the external memory is executed, the processor 1510 is configured to perform an operation performed by the processing module 1410 in the foregoing embodiment, and the transceiver 1530 is configured to perform an operation performed by the transceiver module 1420 in the foregoing embodiment.

The transceiver 1530 may be one function unit. The function unit can implement both a sending operation and a receiving operation. For example, the transceiver 1530 may be configured to perform all sending operations and receiving operations performed by the first device in any one of the embodiments shown in FIG. 2 to FIG. 12. For example, when a sending operation is performed, it may be considered that the transceiver 1530 is a transmitter, and when a receiving operation is performed, it may be considered that the transceiver 1530 is a receiver. Alternatively, the transceiver 1530 may be a general term of two function units. The two function units are a transmitter and a receiver. The transmitter is configured to implement a sending operation. For example, the transmitter may be configured to perform all sending operations performed by the first device in any one of the embodiments shown in FIG. 2 to FIG. 12. The receiver is configured to implement a receiving operation. For example, the receiver may be configured to perform all receiving operations performed by the first device in any one of the embodiments shown in FIG. 2 to FIG. 12.

In addition, if the communications apparatus 1500 is a chip system, the transceiver 1530 may also be implemented by using a communications interface of the chip system. The communications interface is connected to a radio frequency transceiver component in the communications apparatus, to implement information receiving and sending through the radio frequency transceiver component. The communications interface may be one function unit. The function unit can implement both a sending operation and a receiving operation. For example, the communications interface may be configured to perform all sending operations and receiving operations performed by the first device in any one of the embodiments shown in FIG. 2 to FIG. 12. For example, when a sending operation is performed, it may be considered that the communications interface is a sending interface, and when a receiving operation is performed, it may be considered that the communications interface is a receiving interface. Alternatively, the communications interface may be a general term of two function units. The two function units are a sending interface and a receiving interface. The sending interface is configured to implement a sending operation. For example, the sending interface may be configured to perform all sending operations performed by the first device in any one of the embodiments shown in FIG. 2 to FIG. 12. The receiving interface is configured to implement a receiving operation. For example, the receiving interface may be configured to perform all receiving operations performed by the first device in any one of the embodiments shown in FIG. 2 to FIG. 12.

It should be understood that the communications apparatus 1400 or the communications apparatus 1500 according to the embodiments of this application may implement functions of the first device in any one of the embodiments shown in FIG. 2 to FIG. 12. In addition, operations and/or functions of the modules in the communications apparatus 1400 or the communications apparatus 1500 are separately used to implement corresponding procedures in any one of the embodiments shown in FIG. 2 to FIG. 12. For brevity, details are not described herein again.

Figure 16:
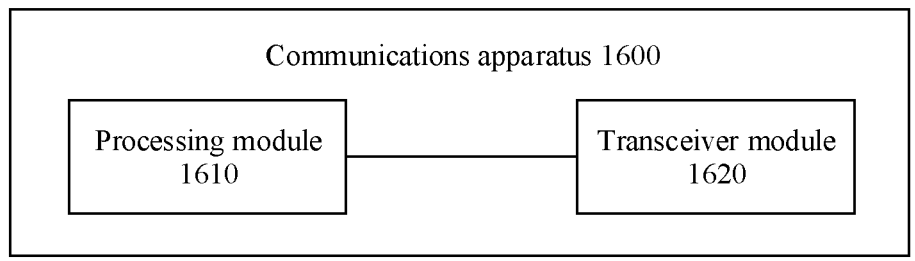
FIG. 16 is a schematic block diagram of a first type of second device according to an embodiment of this application.

FIG. 16 is a schematic block diagram of a communications apparatus 1600 according to an embodiment of this application. The communications apparatus 1600 may be a communications device, or an apparatus, for example, a chip system, that can support a communications device in implementing a function described in the method. For example, the communications device is a vehicle-mounted apparatus. For example, the communications device is, for example, a second device 1600.

The communications apparatus 1600 includes a processing module 1610 and a transceiver module 1620. For example, the communications apparatus 1600 may be a second device, or may be a chip applied to a second device, or another combined device, or another component that has a function of a second device. When the communications apparatus 1600 is the second device, the transceiver module 1620 may be a transceiver, and may include an antenna, a radio frequency circuit, and the like. The processing module 1610 may be a processor, for example, a baseband processor, and the baseband processor may include one or more CPUs. When the communications apparatus 1600 is the component that has a function of the second device, the transceiver module 1620 may be a radio frequency unit, and the processing module 1610 may be a processor, for example, a baseband processor. When the communications apparatus 1600 is the chip system, the transceiver module 1620 may be an input/output interface of the chip system (for example, a baseband chip), and the processing module may be a processor of the chip system, and may include one or more central processing units.

The processing module 1610 may be configured to perform all operations, except receiving and sending operations, performed by the second device in the embodiment shown in FIG. 2, for example, S205 and S206, and/or configured to support another process of the technology described in this specification. The transceiver module 1620 may be configured to perform all the receiving and sending operations performed by the second device in the embodiment shown in FIG. 2, for example, S201, S202, and S204, and/or configured to support another process of the technology described in this specification.

Alternatively, the processing module 1610 may be configured to perform all operations, except receiving and sending operations, performed by the second device in the embodiment shown in FIG. 3, for example, S305 and S306, and/or configured to support another process of the technology described in this specification. The transceiver module 1620 may be configured to perform all the receiving and sending operations performed by the second device in the embodiment shown in FIG. 3, for example, S301, S302, and S304, and/or configured to support another process of the technology described in this specification.

Alternatively, the processing module 1610 may be configured to perform all operations, except receiving and sending operations, performed by the second device in the embodiment shown in FIG. 4, for example, S404, S410, and S411, and/or configured to support another process of the technology described in this specification. The transceiver module 1620 may be configured to perform all the receiving and sending operations performed by the second device in the embodiment shown in FIG. 4, for example, S401, S402, S403, S405, and S409, and/or configured to support another process of the technology described in this specification.

Alternatively, the processing module 1610 may be configured to perform all operations, except receiving and sending operations, performed by the second device in the embodiment shown in FIG. 5, for example, S504, S510, and S511, and/or configured to support another process of the technology described in this specification. The transceiver module 1620 may be configured to perform all the receiving and sending operations performed by the second device in the embodiment shown in FIG. 5, for example, S501, S502, S503, S505, and S509, and/or configured to support another process of the technology described in this specification.

Alternatively, the processing module 1610 may be configured to perform all operations, except receiving and sending operations, performed by the MDC in the embodiment shown in FIG. 6, for example, S602, S606, and S611, and/or configured to support another process of the technology described in this specification. The transceiver module 1620 may be configured to perform all the receiving and sending operations performed by the MDC in the embodiment shown in FIG. 6, for example, S601, S603, S605, S607, and S610, and/or configured to support another process of the technology described in this specification.

Alternatively, the processing module 1610 may be configured to perform all operations, except receiving and sending operations, performed by the VCU in the embodiment shown in FIG. 7, for example, S702 and S706, and/or configured to support another process of the technology described in this specification. The transceiver module 1620 may be configured to perform all the receiving and sending operations performed by the VCU in the embodiment shown in FIG. 7, for example, S701, S703, and S705, and/or configured to support another process of the technology described in this specification.

Alternatively, the processing module 1610 may be configured to perform all operations, except receiving and sending operations, performed by the HMI in the embodiment shown in FIG. 8, for example, S802, S806 and S811, and/or configured to support another process of the technology described in this specification. The transceiver module 1620 may be configured to perform all the receiving and sending operations performed by the HMI in the embodiment shown in FIG. 8, for example, S801, S803, S805, S807, S810, and S812, and/or configured to support another process of the technology described in this specification.

Alternatively, the processing module 1610 may be configured to perform all operations, except receiving and sending operations, performed by the MDC in the embodiment shown in FIG. 9, for example, S902 and S906, and/or configured to support another process of the technology described in this specification. The transceiver module 1620 may be configured to perform all the receiving and sending operations performed by the MDC in the embodiment shown in FIG. 9, for example, S901, S903, S905, S907, and S908, and/or configured to support another process of the technology described in this specification.

Alternatively, the processing module 1610 may be configured to perform all operations, except receiving and sending operations, performed by the BCM in the embodiment shown in FIG. 10, for example, S1002 and S1006, and/or configured to support another process of the technology described in this specification. The transceiver module 1620 may be configured to perform all the receiving and sending operations performed by the BCM in the embodiment shown in FIG. 10, for example, S1001, S1003, S1005, S1007, and S1008, and/or configured to support another process of the technology described in this specification.

Alternatively, the processing module 1610 may be configured to perform all operations, except receiving and sending operations, performed by the VCU in the embodiment shown in FIG. 11, for example, S1102 and S1106, and/or configured to support another process of the technology described in this specification. The transceiver module 1620 may be configured to perform all the receiving and sending operations performed by the VCU in the embodiment shown in FIG. 11, for example, S1101, S1103, S1105, S1107, and S1108, and/or configured to support another process of the technology described in this specification.

Alternatively, the processing module 1610 may be configured to perform all operations, except receiving and sending operations, performed by the VCU in the embodiment shown in FIG. 12, for example, S1202 and S1206, and/or configured to support another process of the technology described in this specification. The transceiver module 1620 may be configured to perform all the receiving and sending operations performed by the VCU in the embodiment shown in FIG. 12, for example, S1201, S1203, S1205, S1207, and S1208, and/or configured to support another process of the technology described in this specification.

In addition, the transceiver module 1620 may be one function module. The function module can implement both a sending operation and a receiving operation. For example, the transceiver module 1620 may be configured to perform all sending operations and receiving operations performed by the second device in any one of the embodiments shown in FIG. 2 to FIG. 12. For example, when a sending operation is performed, it may be considered that the transceiver module 1620 is a sending module, and when a receiving operation is performed, it may be considered that the transceiver module 1620 is a receiving module. Alternatively, the transceiver module 1620 may be a general term of two function modules. The two function modules are a sending module and a receiving module. The sending module is configured to implement a sending operation. For example, the sending module may be configured to perform all sending operations performed by the second device in any one of the embodiments shown in FIG. 2 to FIG. 12. The receiving module is configured to implement a receiving operation. For example, the receiving module may be configured to perform all receiving operations performed by the second device in any one of the embodiments shown in FIG. 2 to FIG. 12.

For example, the transceiver module 1620 is configured to receive first information and a first certificate from a first device, where the first information is used to indicate the communications apparatus 1600, and the first certificate is a device certificate of the first device.

The processing module 1610 is configured to verify, based on a root certificate or a level-2 certificate of the first device, whether the first certificate is correct.

The processing module 1610 is further configured to generate a first random number when the first certificate is correct.

The transceiver module 1620 is further configured to send the first random number to the first device.

The transceiver module 1620 is further configured to receive a first signature from the first device.

The processing module 1610 is further configured to perform authentication on the first device based on the first signature, the first random number, and a first identifier, where the first identifier is an identifier of the first device.

In an optional implementation, the first information includes an identifier of a first service.

In an optional implementation, the processing module 1610 is configured to perform authentication on the first device based on the first signature, the first random number, and first second identifier in the following manner:

performing signature verification on the first signature, the first random number, and the first identifier by using a first public key, to obtain a returned result; and when the returned result indicates that the signature verification succeeds, determining that the authentication on the first device succeeds; or otherwise, when the returned result indicates that the signature verification fails, determining that the authentication on the first device fails.

In an optional implementation, the transceiver module 1620 is further configured to receive a second random number from the first device;

the processing module 1610 is further configured to: when the authentication on the first device succeeds, generate a second signature based on the second random number and the second identifier by using a second private key; and the transceiver module 1620 is further configured to send the second signature and the second identifier to the first device, where the second signature is used for authentication on the communications apparatus 1600, and the second identifier is an identifier of the communications apparatus 1600.

In an optional implementation, the first certificate does not include subject attribute information of the first certificate.

In an optional implementation, the first certificate includes one or any combination of the following information:
 version information of the first certificate;
 signer information of the first certificate;
 subject information of the first certificate;
 validity information of the first certificate; or
 signature information of the first certificate.

In an optional implementation, the transceiver module 1620 is further configured to: when the processing module 1610 fails to authenticate the first device, send indication information to the first device, where the indication information is used to indicate that the authentication on the first device fails, or is used to indicate the first device to stop working or stop using part of functions of the first device; or the processing module 1610 is further configured to: when the authentication on the first device fails, enable the communications apparatus 1600 to stop working, or stop using part of functions of the communications apparatus 1600.

It should be understood that the processing module 1610 in this embodiment of this application may be implemented by a processor or a processor-related circuit component, and the transceiver module 1620 may be implemented by a transceiver or a transceiver-related circuit component.

Figure 17:
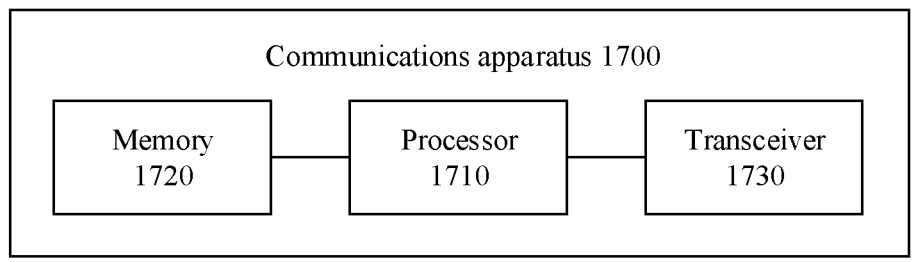
FIG. 17 is another schematic block diagram of a first type of second device according to an embodiment of this application.

As shown in FIG. 17, an embodiment of this application further provides a communications apparatus 1700. For example, the communications apparatus 1700 is, for example, a second device 1700. For example, the communications apparatus 1700 may be a communications device, for example, a terminal device, or may be a chip system. The communications apparatus 1700 includes a processor 1710. Optionally, the communications apparatus 1700 may further include a memory 1720. Optionally, the communications apparatus 1700 may further include a transceiver 1730. The memory 1720 stores a computer instruction or program, and the processor 1710 may execute the computer instruction or program stored in the memory 1720. When the computer instruction or program stored in the memory 1720 is executed, the processor 1710 is configured to perform an operation performed by the processing module 1610 in the foregoing embodiment, and the transceiver 1730 is configured to perform an operation performed by the transceiver module 1620 in the foregoing embodiment. Alternatively, the communications apparatus 1700 may not include the memory 1720. For example, the memory is located outside the communications apparatus 1700. When a computer instruction or program stored in the external memory is executed, the processor 1710 is configured to perform an operation performed by the processing module 1610 in the foregoing embodiment, and the transceiver 1730 is configured to perform an operation performed by the transceiver module 1620 in the foregoing embodiment.

The transceiver 1730 may be one function unit. The function unit can implement both a sending operation and a receiving operation. For example, the transceiver 1730 may be configured to perform all sending operations and receiving operations performed by the second device in any one of the embodiments shown in FIG. 2 to FIG. 12. For example, when a sending operation is performed, it may be considered that the transceiver 1730 is a transmitter, and when a receiving operation is performed, it may be considered that the transceiver 1730 is a receiver. Alternatively, the transceiver 1730 may be a general term of two function units. The two function units are a transmitter and a receiver. The transmitter is configured to implement a sending operation. For example, the transmitter may be configured to perform all sending operations performed by the second device in any one of the embodiments shown in FIG. 2 to FIG. 12. The receiver is configured to implement a receiving operation. For example, the receiver may be configured to perform all receiving operations performed by the second device in any one of the embodiments shown in FIG. 2 to FIG. 12.

In addition, if the communications apparatus 1700 is a chip system, the transceiver 1730 may also be implemented by using a communications interface of the chip system. The communications interface is connected to a radio frequency transceiver component in the communications device, to implement information receiving and sending through the radio frequency transceiver component. The communications interface may be one function unit. The function unit can implement both a sending operation and a receiving operation. For example, the communications interface may be configured to perform all sending operations and receiving operations performed by the second device in any one of the embodiments shown in FIG. 2 to FIG. 12. For example, when a sending operation is performed, it may be considered that the communications interface is a sending interface, and when a receiving operation is performed, it may be considered that the communications interface is a receiving interface. Alternatively, the communications interface may be a general term of two function units. The two function units are a sending interface and a receiving interface. The sending interface is configured to implement a sending operation. For example, the sending interface may be configured to perform all sending operations performed by the second device in any one of the embodiments shown in FIG. 2 to FIG. 12. The receiving interface is configured to implement a receiving operation. For example, the receiving interface may be configured to perform all receiving operations performed by the second device in any one of the embodiments shown in FIG. 2 to FIG. 12.

It should be understood that the communications apparatus 1600 or the communications apparatus 1700 according to the embodiments of this application may implement functions of the second device in any one of the embodiments shown in FIG. 2 to FIG. 12. In addition, operations and/or functions of the modules in the communications apparatus 1600 or the communications apparatus 1700 are separately used to implement corresponding procedures in any one of the embodiments shown in FIG. 2 to FIG. 12. For brevity, details are not described herein again.

Figure 18:
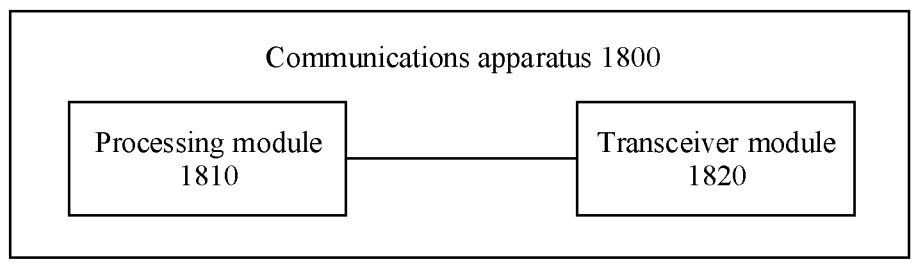
FIG. 18 is a schematic block diagram of a third device according to an embodiment of this application.

FIG. 18 is a schematic block diagram of a communications apparatus 1800 according to an embodiment of this application. The communications apparatus 1800 may be a communications device, or an apparatus, for example, a chip system, that can support a communications device in implementing a function described in the method. For example, the communications device is a vehicle-mounted apparatus. For example, the communications device is, for example, a third device 1800.

The communications apparatus 1800 includes a processing module 1810 and a transceiver module 1820. For example, the communications apparatus 1800 may be a third device, or may be a chip applied to a third device, or another combined device, or another component that has a function of a third device. When the communications apparatus 1800 is the third device, the transceiver module 1820 may be a transceiver, and may include an antenna, a radio frequency circuit, and the like. The processing module 1810 may be a processor, for example, a baseband processor, and the baseband processor may include one or more CPUs. When the communications apparatus 1800 is the component that has a function of the third device, the transceiver module 1820 may be a radio frequency unit, and the processing module 1810 may be a processor, for example, a baseband processor. When the communications apparatus 1800 is the chip system, the transceiver module 1820 may be an input/output interface of the chip system (for example, a baseband chip), and the processing module may be a processor of the chip system, and may include one or more central processing units.

The processing module 1810 may be configured to perform all operations, except receiving and sending operations, performed by the third device in the embodiment shown in FIG. 2, for example, an operation of searching for a second device based on first information or an operation of performing filtering based on first information, and/or configured to support another process of the technology described in this specification. The transceiver module 1820 may be configured to perform all the receiving and sending operations performed by the third device in the embodiment shown in FIG. 2, for example, S201, S202, and S204, and/or configured to support another process of the technology described in this specification.

Alternatively, the processing module 1810 may be configured to perform all operations, except receiving and sending operations, performed by the third device in the embodiment shown in FIG. 4, for example, an operation of searching for a second device based on first information or an operation of performing filtering based on first information, and/or configured to support another process of the technology described in this specification. The transceiver module 1820 may be configured to perform all the receiving and sending operations performed by the third device in the embodiment shown in FIG. 4, for example, S401, S402, S403, S405, and S409, and/or configured to support another process of the technology described in this specification.

Alternatively, the processing module 1810 may be configured to perform all operations, except receiving and sending operations, performed by the gateway in the embodiment shown in FIG. 6, for example, an operation of searching for a second device based on first information or an operation of performing filtering based on first information, and/or configured to support another process of the technology described in this specification. The transceiver module 1820 may be configured to perform all the receiving and sending operations performed by the gateway in the embodiment shown in FIG. 6, for example, S601, S603, S605, S607, and S608, and/or configured to support another process of the technology described in this specification.

Alternatively, the processing module 1810 may be configured to perform all operations, except receiving and sending operations, performed by the gateway in the embodiment shown in FIG. 7, for example, an operation of searching for a second device based on first information or an operation of performing filtering based on first information, and/or configured to support another process of the technology described in this specification. The transceiver module 1820 may be configured to perform all the receiving and sending operations performed by the gateway in the embodiment shown in FIG. 7, for example, S701, S703, and S705, and/or configured to support another process of the technology described in this specification.

Alternatively, the processing module 1810 may be configured to perform all operations, except receiving and sending operations, performed by the gateway in the embodiment shown in FIG. 8, for example, an operation of searching for a second device based on first information or an operation of performing filtering based on first information, and/or configured to support another process of the technology described in this specification. The transceiver module 1820 may be configured to perform all the receiving and sending operations performed by the gateway in the embodiment shown in FIG. 8, for example, S801, S803, S805, S807, S810, and S812, and/or configured to support another process of the technology described in this specification.

Alternatively, the processing module 1810 may be configured to perform all operations, except receiving and sending operations, performed by the gateway in the embodiment shown in FIG. 11, for example, an operation of searching for a second device based on first information or an operation of performing filtering based on first information, and/or configured to support another process of the technology described in this specification. The transceiver module 1820 may be configured to perform all the receiving and sending operations performed by the gateway in the embodiment shown in FIG. 11, for example, S1101, S1103, S1105, S1107, and S1108, and/or configured to support another process of the technology described in this specification.

In addition, the transceiver module 1820 may be one function module. The function module can implement both a sending operation and a receiving operation. For example, the transceiver module 1820 may be configured to perform all sending operations and receiving operations performed by the third device in any one of the embodiments shown in FIG. 2 to FIG. 12. For example, when a sending operation is performed, it may be considered that the transceiver module 1820 is a sending module, and when a receiving operation is performed, it may be considered that the transceiver module 1820 is a receiving module. Alternatively, the transceiver module 1820 may be a general term of two function modules. The two function modules are a sending module and a receiving module. The sending module is configured to implement a sending operation. For example, the sending module may be configured to perform all sending operations performed by the third device in any one of the embodiments shown in FIG. 2 to FIG. 12. The receiving module is configured to implement a receiving operation. For example, the receiving module may be configured to perform all receiving operations performed by the third device in any one of the embodiments shown in FIG. 2 to FIG. 12.

For example, the transceiver module 1820 is configured to receive first information and a first certificate from a first device, where the first information is used to indicate a second device, and the first certificate is a device certificate of the first device.

The processing module 1810 is configured to search for the corresponding second device based on the first information.

The transceiver module 1820 is further configured to send the first information and the first certificate to the second device, where the first certificate is used by the second device to perform authentication on the first device.

In an optional implementation, the first information includes an identifier of a first service.

In an optional implementation, the first information is the identifier of the first service, and the processing module 1810 is configured to search for the corresponding second device based on the first information in the following manner:

searching, based on the identifier of the first service, for the second device related to the first service.

In an optional implementation, the first certificate does not include subject attribute information of the first certificate.

In an optional implementation, the first certificate includes one or any combination of the following information:

version information of the first certificate;
signer information of the first certificate;
subject information of the first certificate;
validity information of the first certificate; or
signature information of the first certificate.

It should be understood that the processing module 1810 in this embodiment of this application may be implemented by a processor or a processor-related circuit component, and the transceiver module 1820 may be implemented by a transceiver or a transceiver-related circuit component.

Figure 19:
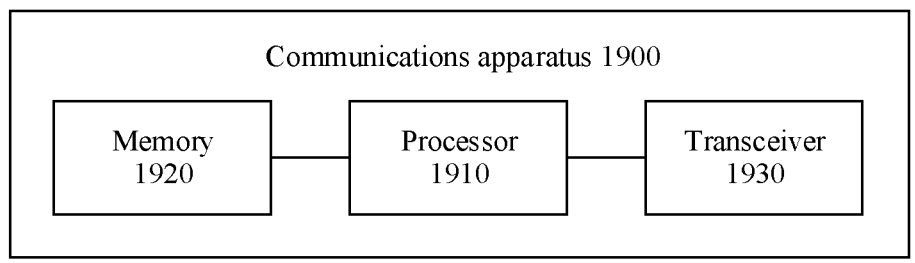
FIG. 19 is another schematic block diagram of a third device according to an embodiment of this application.

As shown in FIG. 19, an embodiment of this application further provides a communications apparatus 1900. For example, the communications apparatus 1900 is, for example, a third device 1900. For example, the communications apparatus 1900 may be a communications device, for example, a terminal device, or may be a chip system. The communications apparatus 1900 includes a processor 1910. Optionally, the communications apparatus 1900 may further include a memory 1920. Optionally, the communications apparatus 1900 may further include a transceiver 1930. The memory 1920 stores a computer instruction or program, and the processor 1910 may execute the computer instruction or program stored in the memory 1920. When the computer instruction or program stored in the memory 1920 is executed, the processor 1910 is configured to perform an operation performed by the processing module 1810 in the foregoing embodiment, and the transceiver 1930 is configured to perform an operation performed by the transceiver module 1820 in the foregoing embodiment. Alternatively, the communications apparatus 1900 may not include the memory 1920. For example, the memory is located outside the communications apparatus 1900. When a computer instruction or program stored in the external memory is executed, the processor 1910 is configured to perform an operation performed by the processing module 1810 in the foregoing embodiment, and the transceiver 1930 is configured to perform an operation performed by the transceiver module 1820 in the foregoing embodiment.

The transceiver 1930 may be one function unit. The function unit can implement both a sending operation and a receiving operation. For example, the transceiver 1930 may be configured to perform all sending operations and receiving operations performed by third device in any one of the embodiments shown in FIG. 2 to FIG. 12. For example, when a sending operation is performed, it may be considered that the transceiver 1930 is a transmitter, and when a receiving operation is performed, it may be considered that the transceiver 1930 is a receiver. Alternatively, the transceiver 1930 may be a general term of two function units. The two function units are a transmitter and a receiver. The transmitter is configured to implement a sending operation. For example, the transmitter may be configured to perform all sending operations performed by the third device in any one of the embodiments shown in FIG. 2 to FIG. 12. The receiver is configured to implement a receiving operation. For example, the receiver may be configured to perform all receiving operations performed by the third device in any one of the embodiments shown in FIG. 2 to FIG. 12.

In addition, if the communications apparatus 1900 is a chip system, the transceiver 1930 may also be implemented by using a communications interface of the chip system. The communications interface is connected to a radio frequency transceiver component in the communications device, to implement information receiving and sending through the radio frequency transceiver component. The communications interface may be one function unit. The function unit can implement both a sending operation and a receiving operation. For example, the communications interface may be configured to perform all sending operations and receiving operations performed by the third device in any one of the embodiments shown in FIG. 2 to FIG. 12. For example, when a sending operation is performed, it may be considered that the communications interface is a sending interface, and when a receiving operation is performed, it may be considered that the communications interface is a receiving interface. Alternatively, the communications interface may be a general term of two function units. The two function units are a sending interface and a receiving interface. The sending interface is configured to implement a sending operation. For example, the sending interface may be configured to perform all sending operations performed by the third device in any one of the embodiments shown in FIG. 2 to FIG. 12. The receiving interface is configured to implement a receiving operation. For example, the receiving interface may be configured to perform all receiving operations performed by the third device in any one of the embodiments shown in FIG. 2 to FIG. 12.

It should be understood that the communications apparatus 1800 or the communications apparatus 1900 according to the embodiments of this application may implement functions of the third device in any one of the embodiments shown in FIG. 2 to FIG. 12. In addition, operations and/or functions of the modules in the communications apparatus 1800 or the communications apparatus 1900 are separately used to implement corresponding procedures in any one of the embodiments shown in FIG. 2 to FIG. 12. For brevity, details are not described herein again.

Figure 20:
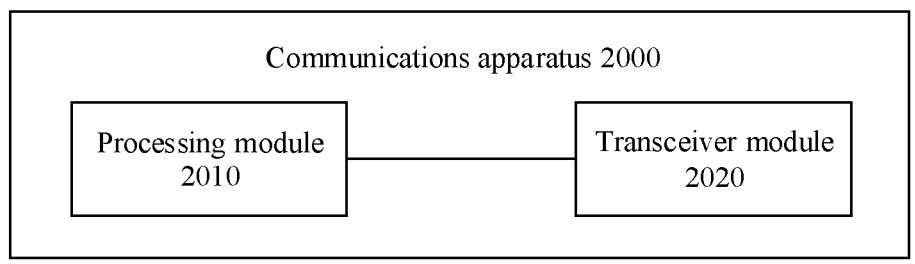
FIG. 20 is a schematic block diagram of a second type of second device according to an embodiment of this application.

FIG. 20 is a schematic block diagram of a communications apparatus 2000 according to an embodiment of this application. The communications apparatus 2000 may be a communications device, or an apparatus, for example, a chip system, that can support a communications device in implementing a function described in the method. For example, the communications device is a vehicle-mounted apparatus. For example, the communications device is, for example, a second device 2000.

The communications apparatus 2000 includes a processing module 2010 and a transceiver module 2020. For example, the communications apparatus 2000 may be a second device, or may be a chip applied to a second device, or another combined device, or another component that has a function of a second device. When the communications apparatus 2000 is the second device, the transceiver module 2020 may be a transceiver, and may include an antenna, a radio frequency circuit, and the like. The processing module 2010 may be a processor, for example, a baseband processor, and the baseband processor may include one or more CPUs. When the communications apparatus 2000 is the component that has a function of the second device, the transceiver module 2020 may be a radio frequency unit, and the processing module 2010 may be a processor, for example, a baseband processor. When the communications apparatus 2000 is the chip system, the transceiver module 2020 may be an input/output interface of the chip system (for example, a baseband chip), and the processing module may be a processor of the chip system, and may include one or more central processing units.

The processing module 2010 may be configured to perform all operations, except receiving and sending operations, performed by the second device in the embodiment shown in FIG. 13, for example, S1301 to S1303, and/or configured to support another process of the technology described in this specification. The transceiver module 2020 may be configured to perform all the receiving and sending operations performed by the second device in the embodiment shown in FIG. 13, for example, S1303, and/or configured to support another process of the technology described in this specification.

In addition, the transceiver module 2020 may be one function module. The function module can implement both a sending operation and a receiving operation. For example, the transceiver module 2020 may be configured to perform all sending operations and receiving operations performed by the second device in the embodiment shown in FIG. 13. For example, when a sending operation is performed, it may be considered that the transceiver module 2020 is a sending module, and when a receiving operation is performed, it may be considered that the transceiver module 2020 is a receiving module. Alternatively, the transceiver module 2020 may be a general term of two function modules. The two function modules are a sending module and a receiving module. The sending module is configured to implement a sending operation. For example, the sending module may be configured to perform all sending operations performed by the second device in the embodiment shown in FIG. 13. The receiving module is configured to implement a receiving operation. For example, the receiving module may be configured to perform all receiving operations performed by the second device in the embodiment shown in FIG. 13.

For example, the processing module 2010 is configured to fail to authenticate a first device.

The processing module 2010 is further configured to determine a first execution policy based on a first service, where the authentication corresponds to the first service.

The transceiver module 2020 is configured to send the first execution policy to the first device, or the processing module is further configured to execute the first execution policy.

In an optional implementation, the first execution policy includes: a device stops working, or a device stops using part of functions of the device.

In an optional implementation, the transceiver module 2020 is further configured to receive first information and a first certificate from the first device, where the first information is used to indicate the second device, and the first certificate is a device certificate of the first device;

the processing module 2010 is further configured to verify, based on a third certificate of the first device, whether the first certificate is correct;

the processing module 2010 is further configured to generate a first random number when the first certificate is correct;

the transceiver module is further configured to send the first random number to the first device;

the transceiver module 2020 is further configured to receive a first signature from the first device; and the processing module 2010 is further configured to perform authentication on the first device based on the first signature, the first random number, and a first identifier, where the first identifier is an identifier of the first device.

In an optional implementation, the first certificate does not include subject attribute information of the first certificate.

In an optional implementation, the first certificate includes one or any combination of the following information:

version information of the first certificate;

signer information of the first certificate;

subject information of the first certificate;

validity information of the first certificate; or signature information of the first certificate.

It should be understood that the processing module 2010 in this embodiment of this application may be implemented by a processor or a processor-related circuit component, and the transceiver module 2020 may be implemented by a transceiver or a transceiver-related circuit component.

Figure 21:
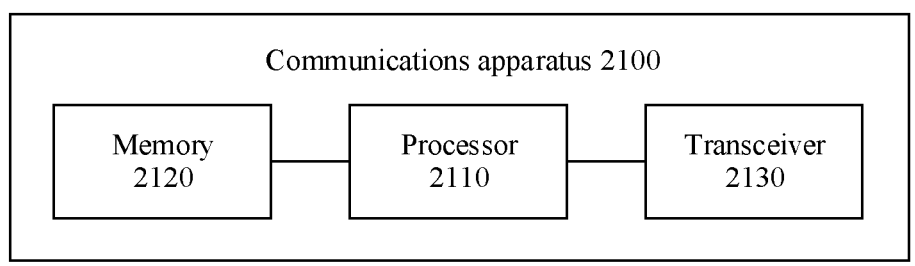
FIG. 21 is another schematic block diagram of a second type of second device according to an embodiment of this application.

As shown in FIG. 21, an embodiment of this application further provides a communications apparatus 2100. For example, the communications apparatus 2100 is, for example, a second device 2100. For example, the communications apparatus 2100 may be a communications device, for example, a terminal device, or may be a chip system. The communications apparatus 2100 includes a processor 2110. Optionally, the communications apparatus 2100 may further include a memory 2120. Optionally, the communications apparatus 2100 may further include a transceiver 2130. The memory 2120 stores a computer instruction or program, and the processor 2110 may execute the computer instruction or program stored in the memory 2120. When the computer instruction or program stored in the memory 2120 is executed, the processor 2110 is configured to perform an operation performed by the processing module 2010 in the foregoing embodiment, and the transceiver 2130 is configured to perform an operation performed by the transceiver module 2020 in the foregoing embodiment. Alternatively, the communications apparatus 2100 may not include the memory 2120. For example, the memory is located outside the communications apparatus 2100. When a computer instruction or program stored in the external memory is executed, the processor 2110 is configured to perform an operation performed by the processing module 2010 in the foregoing embodiment, and the transceiver 2130 is configured to perform an operation performed by the transceiver module 2020 in the foregoing embodiment.

The transceiver 2130 may be one function unit. The function unit can implement both a sending operation and a receiving operation. For example, the transceiver 2130 may be configured to perform all sending operations and receiving operations performed by the second device in the embodiment shown in FIG. 13. For example, when a sending operation is performed, it may be considered that the transceiver 2130 is a transmitter, and when a receiving operation is performed, it may be considered that the transceiver 2130 is a receiver. Alternatively, the transceiver 2130 may be a general term of two function units. The two function units are a transmitter and a receiver. The transmitter is configured to implement a sending operation. For example, the transmitter may be configured to perform all sending operations performed by the second device in the embodiment shown in FIG. 13. The receiver is configured to implement a receiving operation. For example, the receiver may be configured to perform all receiving operations performed by the second device in the embodiment shown in FIG. 13.

In addition, if the communications apparatus 2100 is a chip system, the transceiver 2130 may also be implemented by using a communications interface of the chip system. The communications interface is connected to a radio frequency transceiver component in the communications device, to implement information receiving and sending through the radio frequency transceiver component. The communications interface may be one function unit. The function unit can implement both a sending operation and a receiving operation. For example, the communications interface may be configured to perform all sending operations and receiving operations performed by the second device in the embodiment shown in FIG. 13. For example, when a sending operation is performed, it may be considered that the communications interface is a sending interface, and when a receiving operation is performed, it may be considered that the communications interface is a receiving interface. Alternatively, the communications interface may be a general term of two function units. The two function units are a sending interface and a receiving interface. The sending interface is configured to implement a sending operation. For example, the sending interface may be configured to perform all sending operations performed by the second device in the embodiment shown in FIG. 13. The receiving interface is configured to implement a receiving operation. For example, the receiving interface may be configured to perform all receiving operations performed by the second device in the embodiment shown in FIG. 13.

It should be understood that the communications apparatus 2000 or the communications apparatus 2100 according to the embodiments of this application may implement functions of the second device in the embodiment shown in FIG. 13. In addition, operations and/or functions of the modules in the communications apparatus 2000 or the communications apparatus 2100 are separately used to implement corresponding procedures in the embodiment shown in FIG. 13. For brevity, details are not described herein again.

An embodiment of this application further provides a communications apparatus, and the communications apparatus may be a terminal device or a circuit. The communications apparatus may be configured to perform actions performed by the first device, the second device, or the third device in the foregoing method embodiments.

Figure 22:
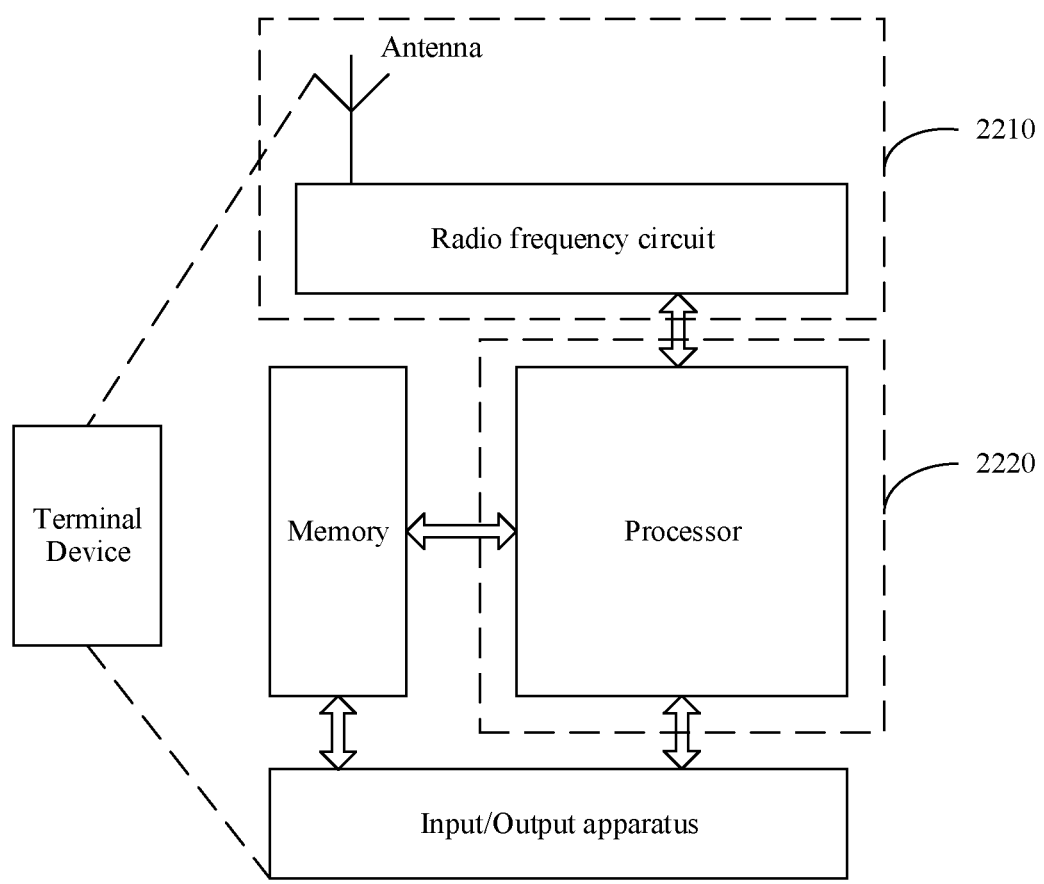
FIG. 22 is a schematic block diagram of a communications apparatus according to an embodiment of this application.

When the communications apparatus is a device, FIG. 22 is a simplified schematic structural diagram of the device. For ease of understanding and illustration, in FIG. 22, an example in which the device is a terminal device. As shown in FIG. 22, the device includes a processor, a memory, a radio frequency circuit, an antenna, and an input/output apparatus. The processor is mainly configured to: process a communications protocol and communications data, control the device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display screen, or a keyboard is mainly configured to receive data input by a user and output data to the user. It should be noted that some types of devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the device, the radio frequency circuit receives a radio frequency signal through the antenna, converts the radio frequency signal into a baseband signal, and outputs the baseband signal to the processor; and the processor converts the baseband signal into data, and processes the data. For ease of description, FIG. 22 shows only one memory and one processor. In an actual device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the device, and the processor that has a processing function may be considered as a processing unit of the device. As shown in FIG. 22, the device includes a transceiver unit 2210 and a processing unit 2220. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 2210 may be considered as a receiving unit, and a component for implementing a sending function in the transceiver unit 2210 may be considered as a sending unit. In other words, the transceiver unit 2210 includes the receiving unit and the sending unit. The transceiver unit may also be sometimes referred to as a transceiver, a transceiver machine, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like.

Alternatively, it should be understood that the transceiver unit 2210 may alternatively be configured to perform a sending operation and a receiving operation on the first device side in the foregoing method embodiments, and the processing unit 2220 is configured to perform an operation other than the receiving/sending operation of the first device in the foregoing method embodiments.

For example, in an implementation, the transceiver unit 2210 is configured to perform all sending operations and receiving operations of the first device in the embodiment shown in FIG. 2, for example, S201, S202, and S204, and/or the transceiver unit 2210 is further configured to support another process of the technology described in this specification. The processing unit 2220 is configured to perform all operations, except the receiving and sending operations, performed by the first device in the embodiment shown in FIG. 2, for example, S203, and/or the processing unit 2220 is further configured to support another process of the technology described in this specification.

For another example, in an implementation, the transceiver unit 2210 is configured to perform all sending operations and receiving operations of the first device in the embodiment shown in FIG. 3, for example, S301, S302, and S304, and/or the transceiver unit 2210 is further configured to support another process of the technology described in this specification. The processing unit 2220 is configured to perform all operations, except the receiving and sending operations, performed by the first device in the embodiment shown in FIG. 3, for example, S303, and/or the processing unit 2220 is further configured to support another process of the technology described in this specification.

For another example, in an implementation, the transceiver unit 2210 is configured to perform all sending operations and receiving operations of the first device in the embodiment shown in FIG. 4, for example, S401, S402, S403, S405 and S409, and/or the transceiver unit 2210 is further configured to support another process of the technology described in this specification. The processing unit 2220 is configured to perform all operations, except the receiving and sending operations, performed by the first device in the embodiment shown in FIG. 4, for example, S406 to S408, and/or the processing unit 2220 is further configured to support another process of the technology described in this specification.

For another example, in an implementation, the transceiver unit 2210 is configured to perform all sending operations and receiving operations of the first device in the embodiment shown in FIG. 5, for example, S501, S502, S503, S505 and S509, and/or the transceiver unit 2210 is further configured to support another process of the technology described in this specification. The processing unit 2220 is configured to perform all operations, except the receiving and sending operations, performed by the first device in the embodiment shown in FIG. 5, for example, S506 to S508, and/or the processing unit 2220 is further configured to support another process of the technology described in this specification.

For another example, in an implementation, the transceiver unit 2210 is configured to perform all sending operations and receiving operations of the T-Box in the embodiment shown in FIG. 6, for example, S601, S603, S605, S607 and S610, and/or the transceiver unit 2210 is further configured to support another process of the technology described in this specification. The processing unit 2220 is configured to perform all operations, except the receiving and sending operations, performed by the T-Box in the embodiment shown in FIG. 6, for example, S604, S608, and S609, and/or the processing unit 2220 is further configured to support another process of the technology described in this specification.

For another example, in an implementation, the transceiver unit 2210 is configured to perform all sending operations and receiving operations of the MDC in the embodiment shown in FIG. 7, for example, S701, S703, and S705, and/or the transceiver unit 2210 is further configured to support another process of the technology described in this specification. The processing unit 2220 is configured to perform all operations, except the receiving and sending operations, performed by the MDC in the embodiment shown in FIG. 7, for example, S704, and/or the processing unit 2220 is further configured to support another process of the technology described in this specification.

For another example, in an implementation, the transceiver unit 2210 is configured to perform all sending operations and receiving operations of the MDC in the embodiment shown in FIG. 8, for example, S801, S803, S805, S807, S810, and S812 and/or the transceiver unit 2210 is further configured to support another process of the technology described in this specification. The processing unit 2220 is configured to perform all operations, except the receiving and sending operations, performed by the MDC in the embodiment shown in FIG. 8, for example, S804, S808, and S809, and/or the processing unit 2220 is further configured to support another process of the technology described in this specification.

For another example, in an implementation, the transceiver unit 2210 is configured to perform all sending operations and receiving operations of the sensor in the embodiment shown in FIG. 9, for example, S901, S903, S905, S907, and S908 and/or the transceiver unit 2210 is further configured to support another process of the technology described in this specification. The processing unit 2220 is configured to perform all operations, except the receiving and sending operations, performed by the sensor in the embodiment shown in FIG. 9, for example, S904, and/or the processing unit 2220 is further configured to support another process of the technology described in this specification.

For another example, in an implementation, the transceiver unit 2210 is configured to perform all sending operations and receiving operations of the PEPS in the embodiment shown in FIG. 10, for example, S1001, S1003, S1005, S1007, and S1008 and/or the transceiver unit 2210 is further configured to support another process of the technology described in this specification. The processing unit 2220 is configured to perform all operations, except the receiving and sending operations, performed by the PEPS in the embodiment shown in FIG. 10, for example, S1004, and/or the processing unit 2220 is further configured to support another process of the technology described in this specification.

For another example, in an implementation, the transceiver unit 2210 is configured to perform all sending operations and receiving operations of the BCM in the embodiment shown in FIG. 11, for example, S1101, S1103, S1105, S1107, and S1108 and/or the transceiver unit 2210 is further configured to support another process of the technology described in this specification. The processing unit 2220 is configured to perform all operations, except the receiving and sending operations, performed by the BCM in the embodiment shown in FIG. 11, for example, S1104, and/or the processing unit 2220 is further configured to support another process of the technology described in this specification.

For another example, in an implementation, the transceiver unit 2210 is configured to perform all sending operations and receiving operations of the OBC in the embodiment shown in FIG. 12, for example, S1201, S1203, S1205, S1207, and S1208 and/or the transceiver unit 2210 is further configured to support another process of the technology described in this specification. The processing unit 2220 is configured to perform all operations, except the receiving and sending operations, performed by the OBC in the embodiment shown in FIG. 12, for example, S1204, and/or the processing unit 2220 is further configured to support another process of the technology described in this specification.

It should be understood that the transceiver unit 2210 may be configured to perform a sending operation and a receiving operation on the second device side in the foregoing method embodiments, and the processing unit 2220 is configured to perform an operation other than the receiving/sending operation of the second device in the foregoing method embodiments.

For example, in an implementation, the transceiver unit 2210 is configured to perform all sending operations and receiving operations of the second device in the embodiment shown in FIG. 2, for example, S201, S202, and S204, and/or the transceiver unit 2210 is further configured to support another process of the technology described in this specification. The processing unit 2220 is configured to perform all operations, except the receiving and sending operations, performed by the second device in the embodiment shown in FIG. 2, for example, S205 and S206, and/or the processing unit 2220 is further configured to support another process of the technology described in this specification.

For example, in an implementation, the transceiver unit 2210 is configured to perform all sending operations and receiving operations of the second device in the embodiment shown in FIG. 3, for example, S301, S302, and S304, and/or the transceiver unit 2210 is further configured to support another process of the technology described in this specification. The processing unit 2220 is configured to perform all operations, except the receiving and sending operations, performed by the second device in the embodiment shown in FIG. 3, for example, S305 and S306, and/or the processing unit 2220 is further configured to support another process of the technology described in this specification.

For another example, in an implementation, the transceiver unit 2210 is configured to perform all sending operations and receiving operations of the second device in the embodiment shown in FIG. 4, for example, S401, S402, S403, S405 and S409, and/or the transceiver unit 2210 is further configured to support another process of the technology described in this specification. The processing unit 2220 is configured to perform all operations, except the receiving and sending operations, performed by the second device in the embodiment shown in FIG. 4, for example, S404, S410, and S411, and/or the processing unit 2220 is further configured to support another process of the technology described in this specification.

For another example, in an implementation, the transceiver unit 2210 is configured to perform all sending operations and receiving operations of the second device in the embodiment shown in FIG. 5, for example, S501, S502, S503, S505 and S509, and/or the transceiver unit 2210 is further configured to support another process of the technology described in this specification. The processing unit 2220 is configured to perform all operations, except the receiving and sending operations, performed by the second device in the embodiment shown in FIG. 5, for example, S504, S510, and S511, and/or the processing unit 2220 is further configured to support another process of the technology described in this specification.

For another example, in an implementation, the transceiver unit 2210 is configured to perform all sending operations and receiving operations of the MDC in the embodiment shown in FIG. 6, for example, S601, S603, S605, S607, and S610, and/or the transceiver unit 2210 is further configured to support another process of the technology described in this specification. The processing unit 2220 is configured to perform all operations, except the receiving and sending operations, performed by the MDC in the embodiment shown in FIG. 6, for example, S602, S606, and S611, and/or the processing unit 2220 is further configured to support another process of the technology described in this specification.

For another example, in an implementation, the transceiver unit 2210 is configured to perform all sending operations and receiving operations of the VCU in the embodiment shown in FIG. 7, for example, S701, S703, and S705, and/or the transceiver unit 2210 is further configured to support another process of the technology described in this specification. The processing unit 2220 is configured to perform all operations, except the receiving and sending operations, performed by the VCU in the embodiment shown in FIG. 7, for example, S702 and S706, and/or the processing unit 2220 is further configured to support another process of the technology described in this specification.

For another example, in an implementation, the transceiver unit 2210 is configured to perform all sending operations and receiving operations of the HMI in the embodiment shown in FIG. 8, for example, S801, S803, S805, S807, S810, and S812, and/or the transceiver unit 2210 is further configured to support another process of the technology described in this specification. The processing unit 2220 is configured to perform all operations, except the receiving and sending operations, performed by the HMI in the embodiment shown in FIG. 8, for example, S802, S806, and S811, and/or the processing unit 2220 is further configured to support another process of the technology described in this specification.

For another example, in an implementation, the transceiver unit 2210 is configured to perform all sending operations and receiving operations of the MDC in the embodiment shown in FIG. 9, for example, S901, S903, S905, S907, and S908, and/or the transceiver unit 2210 is further configured to support another process of the technology described in this specification. The processing unit 2220 is configured to perform all operations, except the receiving and sending operations, performed by the MDC in the embodiment shown in FIG. 9, for example, S902 and S906, and/or the processing unit 2220 is further configured to support another process of the technology described in this specification.

For another example, in an implementation, the transceiver unit 2210 is configured to perform all sending operations and receiving operations of the BCM in the embodiment shown in FIG. 10, for example, S1001, S1003, S1005, S1007, and S1008, and/or the transceiver unit 2210 is further configured to support another process of the technology described in this specification. The processing unit 2220 is configured to perform all operations, except the receiving and sending operations, performed by the BCM in the embodiment shown in FIG. 10, for example, S1002 and S1006, and/or the processing unit 2220 is further configured to support another process of the technology described in this specification.

For another example, in an implementation, the transceiver unit 2210 is configured to perform all sending operations and receiving operations of the VCU in the embodiment shown in FIG. 11, for example, S1101, S1103, S1105, S1107, and S1108, and/or the transceiver unit 2210 is further configured to support another process of the technology described in this specification. The processing unit 2220 is configured to perform all operations, except the receiving and sending operations, performed by the VCU in the embodiment shown in FIG. 11, for example, S1102 and S1106, and/or the processing unit 2220 is further configured to support another process of the technology described in this specification.

For another example, in an implementation, the transceiver unit 2210 is configured to perform all sending operations and receiving operations of the VCU in the embodiment shown in FIG. 12, for example, S1201, S1203, S1205, S1207, and S1208, and/or the transceiver unit 2210 is further configured to support another process of the technology described in this specification. The processing unit 2220 is configured to perform all operations, except the receiving and sending operations, performed by the VCU in the embodiment shown in FIG. 12, for example, S1202 and S1206, and/or the processing unit 2220 is further configured to support another process of the technology described in this specification.

For example, in an implementation, the transceiver unit 2210 is configured to perform all sending operations and receiving operations of the second device in the embodiment shown in FIG. 13, for example, S1303, and/or the transceiver unit 2210 is further configured to support another process of the technology described in this specification. The processing unit 2220 is configured to perform all operations, except the receiving and sending operations, performed by the second device in the embodiment shown in FIG. 13, for example, S1301 to S1303, and/or the processing unit 2220 is further configured to support another process of the technology described in this specification.

Alternatively, it should be understood that the transceiver unit 2210 may alternatively be configured to perform a sending operation and a receiving operation on the third device side in the foregoing method embodiments, and the processing unit 2220 is configured to perform an operation other than the receiving/sending operation of the third device in the foregoing method embodiments.

For example, in an implementation, the transceiver unit 2210 is configured to perform all sending operations and receiving operations of the third device in the embodiment shown in FIG. 2, for example, S201, S202, and S204, and/or the transceiver unit 2210 is further configured to support another process of the technology described in this specification. The processing module 2220 is configured to perform all operations, except the receiving and sending operations, performed by the third device in the embodiment shown in FIG. 2, for example, an operation of searching for a second device based on first information or an operation of performing filtering based on first information, and/or the processing module 2220 is further configured to support another process of the technology described in this specification.

For another example, in an implementation, the transceiver unit 2210 is configured to perform all sending operations and receiving operations of the third device in the embodiment shown in FIG. 4, for example, S401, S402, S403, S405 and S409, and/or the transceiver unit 2210 is further configured to support another process of the technology described in this specification. The processing module 2220 is configured to perform all operations, except the receiving and sending operations, performed by the third device in the embodiment shown in FIG. 4, for example, an operation of searching for a second device based on first information or an operation of performing filtering based on first information, and/or the processing module 2220 is further configured to support another process of the technology described in this specification.

For another example, in an implementation, the transceiver unit 2210 is configured to perform all sending operations and receiving operations of the gateway in the embodiment shown in FIG. 6, for example, S601, S603, S605, S607, and S610, and/or the transceiver unit 2210 is further configured to support another process of the technology described in this specification. The processing module 2220 is configured to perform all operations, except the receiving and sending operations, performed by the gateway in the embodiment shown in FIG. 6, for example, an operation of searching for a second device based on first information or an operation of performing filtering based on first information, and/or the processing module 2220 is further configured to support another process of the technology described in this specification.

For another example, in an implementation, the transceiver unit 2210 is configured to perform all sending operations and receiving operations of the gateway in the embodiment shown in FIG. 7, for example, S701, S703, and S705, and/or the transceiver unit 2210 is further configured to support another process of the technology described in this specification. The processing module 2220 is configured to perform all operations, except the receiving and sending operations, performed by the gateway in the embodiment shown in FIG. 7, for example, an operation of searching for a second device based on first information or an operation of performing filtering based on first information, and/or the processing module 2220 is further configured to support another process of the technology described in this specification.

For another example, in an implementation, the transceiver unit 2210 is configured to perform all sending operations and receiving operations of the gateway in the embodiment shown in FIG. 8, for example, S801, S803, S805, S807, S810, and S812, and/or the transceiver unit 2210 is further configured to support another process of the technology described in this specification. The processing module 2220 is configured to perform all operations, except the receiving and sending operations, performed by the gateway in the embodiment shown in FIG. 8, for example, an operation of searching for a second device based on first information or an operation of performing filtering based on first information, and/or the processing module 2220 is further configured to support another process of the technology described in this specification.

For another example, in an implementation, the transceiver unit 2210 is configured to perform all sending operations and receiving operations of the gateway in the embodiment shown in FIG. 11, for example, S1101, S1103, S1105, S1107, and S1108, and/or the transceiver unit 2210 is further configured to support another process of the technology described in this specification. The processing module 2220 is configured to perform all operations, except the receiving and sending operations, performed by the gateway in the embodiment shown in FIG. 11, for example, an operation of searching for a second device based on first information or an operation of performing filtering based on first information, and/or the processing module 2220 is further configured to support another process of the technology described in this specification.

When the communications apparatus is a chip apparatus or a circuit, the apparatus may include a transceiver unit and a processing unit. The transceiver unit may be an input/output circuit and/or a communications interface. The processing unit is an integrated processor or a microprocessor, or an integrated circuit.

Figure 23:
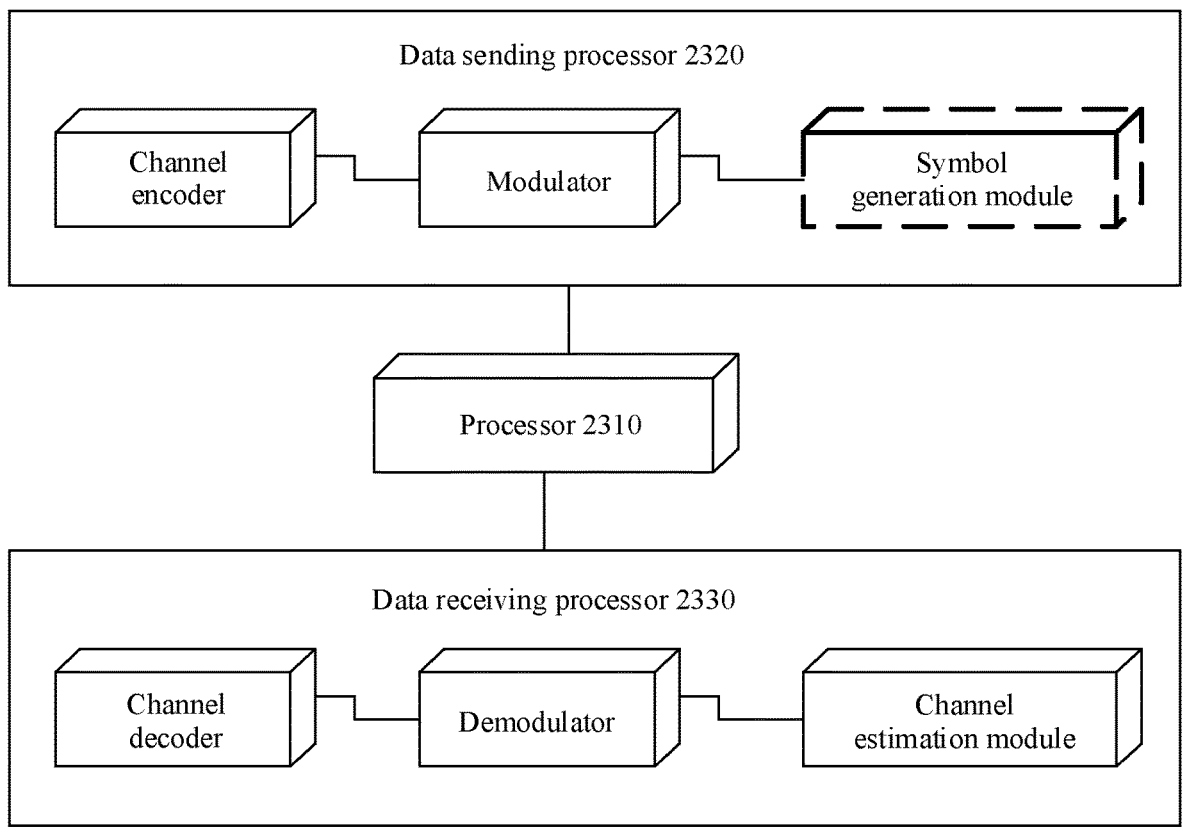
FIG. 23 is another schematic block diagram of a communications apparatus according to an embodiment of this application.

When the communications apparatus in this embodiment is a terminal device, refer to a device shown in FIG. 23. In an example, the device may implement a function similar to a function of the processor 1510 in FIG. 15. Alternatively, in an example, the device may implement a function similar to a function of the processor 1710 in FIG. 17. Alternatively, in an example, the device may implement a function similar to a function of the processor 1910 in FIG. 19. Alternatively, in an example, the device may implement a function similar to a function of the processor 2110 in FIG. 21. In FIG. 23, the device includes a processor 2310, a data sending processor 2320, and a data receiving processor 2330. The processing module 1410 in the foregoing embodiment may be the processor 2310 in FIG. 23, and completes a corresponding function. The transceiver module 1420 in the foregoing embodiment may be the data sending processor 2320 and/or the data receiving processor 2330 in FIG. 23. Alternatively, the processing module 1610 in the foregoing embodiment may be the processor 2310 in FIG. 23, and completes a corresponding function. The transceiver module 1620 in the foregoing embodiment may be the data sending processor 2320 and/or the data receiving processor 2330 in FIG. 23. Alternatively, the processing module 1810 in the foregoing embodiment may be the processor 2310 in FIG. 23, and completes a corresponding function. The transceiver module 1820 in the foregoing embodiment may be the data sending processor 2320 and/or the data receiving processor 2330 in FIG. 23. Alternatively, the processing module 2010 in the foregoing embodiment may be the processor 2310 in FIG. 23, and completes a corresponding function. The transceiver module 2020 in the foregoing embodiment may be the data sending processor 2320 and/or the data receiving processor 2330 in FIG. 23. Although FIG. 23 shows a channel encoder and a channel decoder, it may be understood that these modules are merely examples, and do not constitute a limitation on this embodiment.

Figure 24:
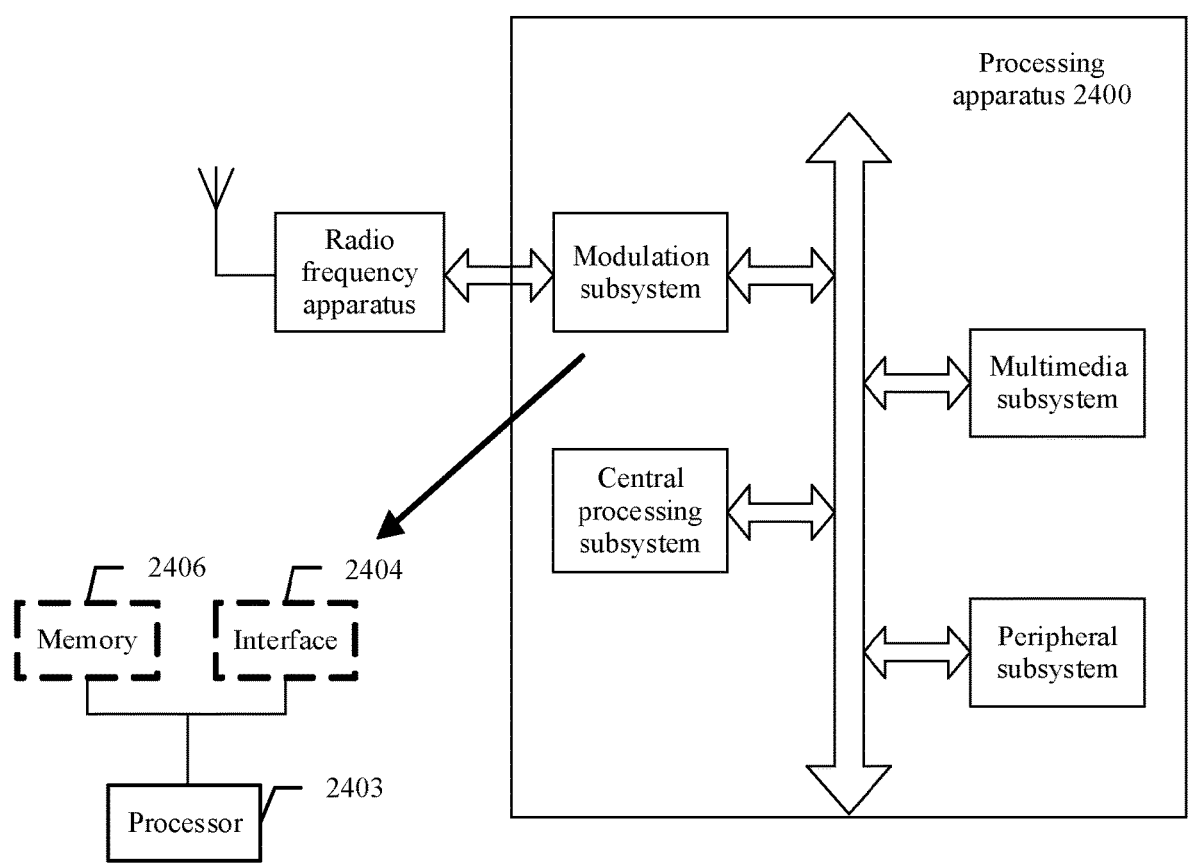
FIG. 24 is still another schematic block diagram of a communications apparatus according to an embodiment of this application.

FIG. 24 shows another form of this embodiment. A processing apparatus 2400 includes modules such as a modulation subsystem, a central processing subsystem, and a peripheral subsystem. The communications apparatus in this embodiment may be used as the modulation subsystem in the processing apparatus. Specifically, the modulation subsystem may include a processor 2403 and an interface 2404. The processor 2403 implements a function of the processing module 1410, and the interface 2404 implements a function of the transceiver module 1420. Alternatively, the processor 2403 implements a function of the processing module 1610, and the interface 2404 implements a function of the transceiver module 1620. Alternatively, the processor 2403 implements a function of the processing module 1810, and the interface 2404 implements a function of the transceiver module 1820. Alternatively, the processor 2403 implements a function of the processing module 2010, and the interface 2404 implements a function of the transceiver module 2020. In another variation, the modulation subsystem includes a memory 2406, a processor 2403, and a program that is stored in the memory 2406 and that can be run on the processor. When executing the program, the processor 2403 implements the method on the first device side, the second device side, or the third device side in the foregoing method embodiments. It should be noted that the memory 2406 may be a non-volatile memory, or may be a volatile memory. The memory 2406 may be located in the modulation subsystem, or may be located in the processing apparatus 2400, provided that the memory 2406 can be connected to the processor 2403.

An embodiment of this application provides a first communications system. The first communications system may include at least one first device in any one of the embodiments shown in FIG. 2 to FIG. 12, and includes at least one second device in any one of the embodiments shown in FIG. 2 to FIG. 12. The first device is, for example, the communications apparatus 1400 in FIG. 14 or the communications apparatus 1500 in FIG. 15. For example, the first device may be configured to perform all operations performed by the first device in any one of the embodiments shown in FIG. 2 to FIG. 12, for example, S201 to S204 in the embodiment shown in FIG. 2, and/or configured to support another process of the technology described in this specification; or S301 to S304 in the embodiment shown in FIG. 3, and/or configured to support another process of the technology described in this specification; or S401 to S403 and S405 to S409 in the embodiment shown in FIG. 4, and/or configured to support another process of the technology described in this specification; or S501 to S503 and S505 to S509 in the embodiment shown in FIG. 5, and/or configured to support another process of the technology described in this specification; or S601, S603 to S606, and S607 to S610 in the embodiment shown in FIG. 6, and/or configured to support another process of the technology described in this specification; or S701, S703, S704, and S705 in the embodiment shown in FIG. 7, and/or configured to support another process of the technology described in this specification; or S801, S803, S805, S807, S810, S812, S804, S808, and S809 in the embodiment shown in FIG. 8, and/or configured to support another process of the technology described in this specification; or S901, S903, S904, S905, S907, and S908 in the embodiment shown in FIG. 9, and/or configured to support another process of the technology described in this specification; or S1001, S1003, S1004, S1005, S1007, and S1008 in the embodiment shown in FIG. 10, and/or configured to support another process of the technology described in this specification; or S1101, S1103, S1104, S1105, S1107, and S1108 in the embodiment shown in FIG. 11, and/or configured to support another process of the technology described in this specification; or S1201, S1203, S1204, S1205, S1207, and S1208 in the embodiment shown in FIG. 12, and/or configured to support another process of the technology described in this specification.

The second device is, for example, the communications apparatus 1600 in FIG. 16 or the communications apparatus 1700 in FIG. 17. The second device may be configured to perform all operations performed by the second device in any one of the embodiments shown in FIG. 2 to FIG. 12, for example, S201, S202, S204, S205, and S206 in the embodiment shown in FIG. 2, and/or configured to support another process of the technology described in this specification; or S301, S302, S304, S305, and S306 in the embodiment shown in FIG. 3, and/or configured to support another process of the technology described in this specification; or S401, S402, S403, S405, S409, S404, S410, and S411 in the embodiment shown in FIG. 4, and/or configured to support another process of the technology described in this specification; or S501, S502, S503, S505, S509, S504, S510, and S511 in the embodiment shown in FIG. 5, and/or configured to support another process of the technology described in this specification; or S601, S603, S605, S607, S610, S602, S606, and S611 in the embodiment shown in FIG. 6, and/or configured to support another process of the technology described in this specification; or S701, S703, S705, S702, and S706 in the embodiment shown in FIG. 7, and/or configured to support another process of the technology described in this specification; or S801, S803, S805, S807, S810, S812, S802, S806, and S811 in the embodiment shown in FIG. 8, and/or configured to support another process of the technology described in this specification; or S901, S903, S905, S907, S908, S902, and S906 in the embodiment shown in FIG. 9, and/or configured to support another process of the technology described in this specification; or S1001, S1003, S1005, S1007, S1008, S1002, and S1006 in the embodiment shown in FIG. 10, and/or configured to support another process of the technology described in this specification; or S1101, S1103, S1105, S1107, S1108, S1102, and S1106 in the embodiment shown in FIG. 11, and/or configured to support another process of the technology described in this specification; or S1201, S1203, S1205, S1207, S1208, S1202, and S1206 in the embodiment shown in FIG. 12, and/or configured to support another process of the technology described in this specification.

Optionally, the first communications system may further include at least one third device in any one of the embodiments shown in FIG. 2 to FIG. 12. The third device is, for example, the communications apparatus 1800 in FIG. 18 or the communications apparatus 1900 in FIG. 19. The third device may be configured to perform all operations performed by the third device in any one of the embodiments shown in FIG. 2 to FIG. 12, for example, S201, S202, and S204 in the embodiment shown in FIG. 2, an operation of searching for a second device based on first information, or an operation of performing filtering based on the first information, and/or configured to support another process of the technology described in this specification; or S401, S402, S403, S405, and S409 in the embodiment shown in FIG. 4, an operation of searching for a second device based on first information, or an operation of performing filtering based on the first information, and/or configured to support another process of the technology described in this specification; or S601, S603, S605, S607, and S610 in the embodiment shown in FIG. 6, an operation of searching for a second device based on first information, or an operation of performing filtering based on the first information, and/or configured to support another process of the technology described in this specification; or S701, S703, and S705 in the embodiment shown in FIG. 7, an operation of searching for a second device based on first information, or an operation of performing filtering based on the first information, and/or configured to support another process of the technology described in this specification; or S801, S803, S805, S807, S810, and S812 in the embodiment shown in FIG. 8, an operation of searching for a second device based on first information, or an operation of performing filtering based on the first information, and/or configured to support another process of the technology described in this specification; or S1101, S1103, S1105, S1107, and S1108 in the embodiment shown in FIG. 11, an operation of searching for a second device based on first information, or an operation of performing filtering based on the first information, and/or configured to support another process of the technology described in this specification.

An embodiment of this application provides a second communications system. The second communications system may include at least one second device in the embodiment shown in FIG. 13. The second device is, for example, the communications apparatus 2000 in FIG. 20 or the communications apparatus 2100 in FIG. 21. The second device may be configured to perform all operations performed by the second device in the embodiment shown in FIG. 13, for example, S1301 to S1303 in the embodiment shown in FIG. 13, and/or configured to support another process of the technology described in this specification.

Optionally, the second communications system may further include at least one first device in any one of the embodiments shown in FIG. 2 to FIG. 12.

Optionally, the second communications system may further include at least one third device in any one of the embodiments shown in FIG. 2 to FIG. 12.

The foregoing two communications systems may be a same communications system, or may be different communications systems.

An embodiment of this application further provides a computer readable storage medium. The computer readable storage medium is configured to store a computer program. When the computer program is executed by a computer, the computer may implement a procedure related to the first device provided in the method embodiment shown in FIG. 2.

An embodiment of this application further provides a computer readable storage medium. The computer readable storage medium stores a computer program. When the computer program is executed by a computer, the computer may implement a procedure related to the first device provided in the method embodiment shown in FIG. 3.

An embodiment of this application further provides a computer readable storage medium. The computer readable storage medium stores a computer program. When the computer program is executed by a computer, the computer may implement a procedure related to the first device provided in the method embodiment shown in FIG. 4.

An embodiment of this application further provides a computer readable storage medium. The computer readable storage medium stores a computer program. When the computer program is executed by a computer, the computer may implement a procedure related to the first device provided in the method embodiment shown in FIG. 5.

An embodiment of this application further provides a computer readable storage medium. The computer readable storage medium stores a computer program. When the computer program is executed by a computer, the computer may implement a procedure related to the first device provided in the method embodiment shown in FIG. 6.

An embodiment of this application further provides a computer readable storage medium. The computer readable storage medium stores a computer program. When the computer program is executed by a computer, the computer may implement a procedure related to the first device provided in the method embodiment shown in FIG. 7.

An embodiment of this application further provides a computer readable storage medium. The computer readable storage medium stores a computer program. When the computer program is executed by a computer, the computer may implement a procedure related to the first device provided in the method embodiment shown in FIG. 8.

An embodiment of this application further provides a computer readable storage medium. The computer readable storage medium stores a computer program. When the computer program is executed by a computer, the computer may implement a procedure related to the first device provided in the method embodiment shown in FIG. 9.

An embodiment of this application further provides a computer readable storage medium. The computer readable storage medium stores a computer program. When the computer program is executed by a computer, the computer may implement a procedure related to the first device provided in the method embodiment shown in FIG. 10.

An embodiment of this application further provides a computer readable storage medium. The computer readable storage medium stores a computer program. When the computer program is executed by a computer, the computer may implement a procedure related to the first device provided in the method embodiment shown in FIG. 11.

An embodiment of this application further provides a computer readable storage medium. The computer readable storage medium stores a computer program. When the computer program is executed by a computer, the computer may implement a procedure related to the first device provided in the method embodiment shown in FIG. 12.

An embodiment of this application further provides a computer readable storage medium. The computer readable storage medium is configured to store a computer program. When the computer program is executed by a computer, the computer may implement a procedure related to the second device provided in the method embodiment shown in FIG. 2.

An embodiment of this application further provides a computer readable storage medium. The computer readable storage medium stores a computer program. When the computer program is executed by a computer, the computer may implement a procedure related to the second device provided in the method embodiment shown in FIG. 3.

An embodiment of this application further provides a computer readable storage medium. The computer readable storage medium stores a computer program. When the computer program is executed by a computer, the computer may implement a procedure related to the second device provided in the method embodiment shown in FIG. 4.

An embodiment of this application further provides a computer readable storage medium. The computer readable storage medium stores a computer program. When the computer program is executed by a computer, the computer may implement a procedure related to the second device provided in the method embodiment shown in FIG. 5.

An embodiment of this application further provides a computer readable storage medium. The computer readable storage medium stores a computer program. When the computer program is executed by a computer, the computer may implement a procedure related to the second device provided in the method embodiment shown in FIG. 6.

An embodiment of this application further provides a computer readable storage medium. The computer readable storage medium stores a computer program. When the computer program is executed by a computer, the computer may implement a procedure related to the second device provided in the method embodiment shown in FIG. 7.

An embodiment of this application further provides a computer readable storage medium. The computer readable storage medium stores a computer program. When the computer program is executed by a computer, the computer may implement a procedure related to the second device provided in the method embodiment shown in FIG. 8.

An embodiment of this application further provides a computer readable storage medium. The computer readable storage medium stores a computer program. When the computer program is executed by a computer, the computer may implement a procedure related to the second device provided in the method embodiment shown in FIG. 9.

An embodiment of this application further provides a computer readable storage medium. The computer readable storage medium stores a computer program. When the computer program is executed by a computer, the computer may implement a procedure related to the second device provided in the method embodiment shown in FIG. 10.

An embodiment of this application further provides a computer readable storage medium. The computer readable storage medium stores a computer program. When the computer program is executed by a computer, the computer may implement a procedure related to the second device provided in the method embodiment shown in FIG. 11.

An embodiment of this application further provides a computer readable storage medium. The computer readable storage medium stores a computer program. When the computer program is executed by a computer, the computer may implement a procedure related to the second device provided in the method embodiment shown in FIG. 12.

An embodiment of this application further provides a computer readable storage medium. The computer readable storage medium stores a computer program. When the computer program is executed by a computer, the computer may implement a procedure related to the second device provided in the method embodiment shown in FIG. 13.

An embodiment of this application further provides a computer readable storage medium. The computer readable storage medium is configured to store a computer program. When the computer program is executed by a computer, the computer may implement a procedure related to the third device provided in the method embodiment shown in FIG. 2.

An embodiment of this application further provides a computer readable storage medium. The computer readable storage medium stores a computer program. When the computer program is executed by a computer, the computer may implement a procedure related to the third device provided in the method embodiment shown in FIG. 4.

An embodiment of this application further provides a computer readable storage medium. The computer readable storage medium stores a computer program. When the computer program is executed by a computer, the computer may implement a procedure related to the third device provided in the method embodiment shown in FIG. 6.

An embodiment of this application further provides a computer readable storage medium. The computer readable storage medium stores a computer program. When the computer program is executed by a computer, the computer may implement a procedure related to the third device provided in the method embodiment shown in FIG. 7.

An embodiment of this application further provides a computer readable storage medium. The computer readable storage medium stores a computer program. When the computer program is executed by a computer, the computer may implement a procedure related to the third device provided in the method embodiment shown in FIG. 8.

An embodiment of this application further provides a computer readable storage medium. The computer readable storage medium stores a computer program. When the computer program is executed by a computer, the computer may implement a procedure related to the third device provided in the method embodiment shown in FIG. 11.

An embodiment of this application further provides a computer program product. The computer program product is configured to store a computer program. When the computer program is executed by a computer, the computer may implement a procedure related to the first device provided in the method embodiment shown in FIG. 2.

An embodiment of this application further provides a computer program product. The computer program product is configured to store a computer program. When the computer program is executed by a computer, the computer may implement a procedure related to the first device provided in the method embodiment shown in FIG. 3.

An embodiment of this application further provides a computer program product. The computer program product is configured to store a computer program. When the computer program is executed by a computer, the computer may implement a procedure related to the first device provided in the method embodiment shown in FIG. 4.

An embodiment of this application further provides a computer program product. The computer program product is configured to store a computer program. When the computer program is executed by a computer, the computer may implement a procedure related to the first device provided in the method embodiment shown in FIG. 5.

An embodiment of this application further provides a computer program product. The computer program product is configured to store a computer program. When the computer program is executed by a computer, the computer may implement a procedure related to the first device provided in the method embodiment shown in FIG. 6.

An embodiment of this application further provides a computer program product. The computer program product is configured to store a computer program. When the computer program is executed by a computer, the computer may implement a procedure related to the first device provided in the method embodiment shown in FIG. 7.

An embodiment of this application further provides a computer program product. The computer program product is configured to store a computer program. When the computer program is executed by a computer, the computer may implement a procedure related to the first device provided in the method embodiment shown in FIG. 8.

An embodiment of this application further provides a computer program product. The computer program product is configured to store a computer program. When the computer program is executed by a computer, the computer may implement a procedure related to the first device provided in the method embodiment shown in FIG. 9.

An embodiment of this application further provides a computer program product. The computer program product is configured to store a computer program. When the computer program is executed by a computer, the computer may implement a procedure related to the first device provided in the method embodiment shown in FIG. 10.

An embodiment of this application further provides a computer program product. The computer program product is configured to store a computer program. When the computer program is executed by a computer, the computer may implement a procedure related to the first device provided in the method embodiment shown in FIG. 11.

An embodiment of this application further provides a computer program product. The computer program product is configured to store a computer program. When the computer program is executed by a computer, the computer may implement a procedure related to the first device provided in the method embodiment shown in FIG. 12.

An embodiment of this application further provides a computer program product. The computer program product is configured to store a computer program. When the computer program is executed by a computer, the computer may implement a procedure related to the second device provided in the method embodiment shown in FIG. 2.

An embodiment of this application further provides a computer program product. The computer program product is configured to store a computer program. When the computer program is executed by a computer, the computer may implement a procedure related to the second device provided in the method embodiment shown in FIG. 3.

An embodiment of this application further provides a computer program product. The computer program product is configured to store a computer program. When the computer program is executed by a computer, the computer may implement a procedure related to the second device provided in the method embodiment shown in FIG. 4.

An embodiment of this application further provides a computer program product. The computer program product is configured to store a computer program. When the computer program is executed by a computer, the computer may implement a procedure related to the second device provided in the method embodiment shown in FIG. 5.

An embodiment of this application further provides a computer program product. The computer program product is configured to store a computer program. When the computer program is executed by a computer, the computer may implement a procedure related to the second device provided in the method embodiment shown in FIG. 6.

An embodiment of this application further provides a computer program product. The computer program product is configured to store a computer program. When the computer program is executed by a computer, the computer may implement a procedure related to the second device provided in the method embodiment shown in FIG. 7.

An embodiment of this application further provides a computer program product. The computer program product is configured to store a computer program. When the computer program is executed by a computer, the computer may implement a procedure related to the second device provided in the method embodiment shown in FIG. 8.

An embodiment of this application further provides a computer program product. The computer program product is configured to store a computer program. When the computer program is executed by a computer, the computer may implement a procedure related to the second device provided in the method embodiment shown in FIG. 9.

An embodiment of this application further provides a computer program product. The computer program product is configured to store a computer program. When the computer program is executed by a computer, the computer may implement a procedure related to the second device provided in the method embodiment shown in FIG. 10.

An embodiment of this application further provides a computer program product. The computer program product is configured to store a computer program. When the computer program is executed by a computer, the computer may implement a procedure related to the second device provided in the method embodiment shown in FIG. 11.

An embodiment of this application further provides a computer program product. The computer program product is configured to store a computer program. When the computer program is executed by a computer, the computer may implement a procedure related to the second device provided in the method embodiment shown in FIG. 12.

An embodiment of this application further provides a computer program product. The computer program product is configured to store a computer program. When the computer program is executed by a computer, the computer may implement a procedure related to the second device provided in the method embodiment shown in FIG. 13.

An embodiment of this application further provides a computer program product. The computer program product is configured to store a computer program. When the computer program is executed by a computer, the computer may implement a procedure related to the third device provided in the method embodiment shown in FIG. 2.

An embodiment of this application further provides a computer program product. The computer program product is configured to store a computer program. When the computer program is executed by a computer, the computer may implement a procedure related to the third device provided in the method embodiment shown in FIG. 4.

An embodiment of this application further provides a computer program product. The computer program product is configured to store a computer program. When the computer program is executed by a computer, the computer may implement a procedure related to the third device provided in the method embodiment shown in FIG. 6.

An embodiment of this application further provides a computer program product. The computer program product is configured to store a computer program. When the computer program is executed by a computer, the computer may implement a procedure related to the third device provided in the method embodiment shown in FIG. 7.

An embodiment of this application further provides a computer program product. The computer program product is configured to store a computer program. When the computer program is executed by a computer, the computer may implement a procedure related to the third device provided in the method embodiment shown in FIG. 8.

An embodiment of this application further provides a computer program product. The computer program product is configured to store a computer program. When the computer program is executed by a computer, the computer may implement a procedure related to the third device provided in the method embodiment shown in FIG. 11.

It should be understood that the processor described in the embodiments of this application may be a CPU, or may be another general purpose processor, a digital signal processor (DSP), an application specific integrated circuit (ASIC), a field programmable gate array (FPGA) or another programmable logic device, a discrete gate or transistor logic device, discrete hardware component, or the like. The general purpose processor may be a microprocessor, or the processor may be any conventional processor or the like.

It may be further understood that the memory in the embodiments of this application may be a volatile memory, or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, or another programmable logic device, a discrete gate or a transistor logic device, or discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A device authentication method, comprising:
receiving, by a second device, first information for requesting an authentication of a first service for a first device, wherein the first information includes an identity of the first service and the identity of the first service indicates the second device;
performing, by the second device, in response to the first information, the authentication on the first device having a function related to the first service;
determining, by the second device when the authentication fails, a first execution policy based on the first service, wherein the first execution policy comprises stopping using the function, or using the function and generating an alert; and
executing, by the second device, the first execution policy, or indicating, by the second device, the first execution policy to the first device for the first device to execute the first execution policy;
wherein the performing the authentication on the first device, comprises:
receiving, information of a first certificate from the first device, wherein the first certificate is a device certificate of the first device;
verifying, based on another certificate of the first device, whether the first certificate is correct;
generating, the first random number when the first certificate is correct;
sending, the first random number to the first device; and
receiving, from the first device, the first signature that is generated based on the first random number;
performing, the authentication on the first device based on the first signature, the first random number, and an identifier of the first device.

2. The method according to claim 1, wherein the information of the first certificate does not comprise subject attribute information of the first certificate.

3. The method according to claim 1, wherein the information of the first certificate comprises one or any combination of the following information:
version information of the first certificate;
signer information of the first certificate;
subject information of the first certificate;
validity information of the first certificate; or
signature information of the first certificate.

4. A communications apparatus, comprising:
a processor; and
a memory, wherein the memory is configured to store program instructions, and the processor coupled to the memory is configured to execute the instructions to:
receive, first information for requesting an authentication of a first service for a first device, wherein the first information includes an identity of the first service and the identity of the first service indicates a second device;
perform, in response to the first information, the authentication on the first device having a function related to the first service;
determine, when the authentication fails, a first execution policy based on the first service, wherein the first execution policy comprises stopping using the function, or using the function and generating an alert; and
execute, the first execution policy, or indicate, the first execution policy to the first device for the first device to execute the first execution policy;
wherein the perform the authentication on the first device, comprises:
receive, information of a first certificate from the first device, wherein the first certificate is a device certificate of the first device;
verify, based on another certificate of the first device, whether the first certificate is correct;
generate, the first random number when the first certificate is correct;
send, the first random number to the first device; and
receive, from the first device, the first signature that is generated based on the first random number;
perform, the authentication on the first device based on the first signature, the first random number, and an identifier of the first device.

5. The apparatus according to claim 4, wherein the processor is further configured to execute the instructions to:
receive, from the first device, the identifier of the first device.

6. The apparatus according to claim 4, wherein the information of the first certificate does not comprise subject attribute information of the first certificate.

7. The apparatus according to claim 4, wherein the information of the first certificate comprises one or any combination of the following information:
version information of the first certificate;
signer information of the first certificate;
subject information of the first certificate;
validity information of the first certificate; or
signature information of the first certificate.

8. A communications system, comprising:
a first device; and
a second device communicating with the first device, wherein the second device is configured to
receive, first information for requesting an authentication of a first service for the first device, wherein the first information includes an identity of the first service and the identity of the first service indicates the second device;

perform, in response to the first information, the authentication on the first device having a function related to the first service;

determine, when the authentication fails, a first execution policy based on the first service, wherein the first execution policy comprises stopping using the function, or using the function and generating an alert; and executing, the first execution policy, or indicating, by the second device, the first execution policy to the first device for the first device to execute the first execution policy;

wherein the perform the authentication on the first device, comprises:

receive, information of a first certificate from the first device, wherein the first certificate is a device certificate of the first device;

verify, based on another certificate of the first device, whether the first certificate is correct;

generate, the first random number when the first certificate is correct;

send, the first random number to the first device; and receive, from the first device, the first signature that is generated based on the first random number;

perform, the authentication on the first device based on the first signature, the first random number, and an identifier of the first device.

\* \* \* \* \*